United States Patent
Nair et al.

(10) Patent No.: US 11,599,181 B1
(45) Date of Patent: Mar. 7, 2023

(54) SYSTEMS AND METHODS FOR REDUCING POWER CONSUMPTION OF CONVOLUTION OPERATIONS OF ARTIFICIAL NEURAL NETWORKS

(71) Applicant: Meta Platforms, Inc., Menlo Park, CA (US)

(72) Inventors: Krishnakumar Narayanan Nair, Newark, CA (US); Abdulkadir Utku Diril, Menlo Park, CA (US); Yuchen Hao, Fremont, CA (US); Thomas Mark Ulrich, Mountain View, CA (US); Rakesh Komuravelli, Fremont, CA (US); Ehsan Khish Ardestani Zadeh, San Jose, CA (US); Martin Schatz, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 552 days.

(21) Appl. No.: 16/725,331

(22) Filed: Dec. 23, 2019

(51) Int. Cl.
*G06F 1/3234* (2019.01)
*G06F 12/0875* (2016.01)
*G06N 3/063* (2023.01)
*G06F 17/16* (2006.01)
*G06N 3/04* (2023.01)

(52) U.S. Cl.
CPC ........ *G06F 1/3275* (2013.01); *G06F 12/0875* (2013.01); *G06F 17/16* (2013.01); *G06N 3/04* (2013.01); *G06N 3/063* (2013.01); *G06F 2212/45* (2013.01)

(58) Field of Classification Search
None
See application file for complete search history.

(56) References Cited

U.S. PATENT DOCUMENTS

| 9,645,974 | B1 * | 5/2017 | Patil | G06F 17/16 |
| 11,120,328 | B1 * | 9/2021 | Nair | G06F 17/16 |

(Continued)

OTHER PUBLICATIONS

Hadjis et al., "Caffe con Troll: Shallow Ideas to Speed Up Deep Learning", Proc Fourth Workshop Data Anal Scale Danac, May 26, 2015, pp. 1-19.

(Continued)

*Primary Examiner* — Elias Mamo
(74) *Attorney, Agent, or Firm* — Greenberg Traurig, LLP

(57) ABSTRACT

A computer-implemented method may include (1) maintaining (a) a filter matrix in a filter cache included in a local memory device (LMD) included in a hardware accelerator, and (b) a plurality of activation matrices corresponding to different rows of an activation volume in an activation cache included in the LMD, (2) for each activation matrix, directing a matrix multiplication unit (MMU) included in the hardware accelerator to execute a matrix multiplication operation (MMO) using the filter matrix and the activation matrix, (3) loading an additional filter matrix into the filter cache, and (4) directing the MMU to execute a plurality of additional MMOs, each additional MMO using one filter matrix included in the filter cache and one activation matrix included in the activation cache, such that the MMU reuses the filter matrix for at least one additional MMO and uses the additional filter matrix for a different additional MMO.

20 Claims, 49 Drawing Sheets

(56) References Cited

U.S. PATENT DOCUMENTS

| | | | | |
|---|---|---|---|---|
| 2009/0154824 | A1* | 6/2009 | Rai | G06T 5/20 |
| | | | | 382/260 |
| 2011/0153707 | A1* | 6/2011 | Ginzburg | G06F 9/3001 |
| | | | | 708/523 |
| 2014/0365548 | A1* | 12/2014 | Mortensen | G06F 9/3001 |
| | | | | 708/523 |
| 2019/0205358 | A1* | 7/2019 | Diril | G06F 17/16 |

OTHER PUBLICATIONS

Loukadakis et al., "Accelerating Deep Neural Networks on Low Power Heterogeneous Architectures", URL: https://www.researchgate.net/publication/327070011, Jan. 24, 2018, 15 pages.

Chen et al., "Eyeriss: A Spatial Architecture for Energy-Efficient Dataflow for Convolutional Neural Networks", ACM/IEEE 43rd Annual International Symposium on Computer Architecture, Jun. 18-22, 2016, pp. 367-379.

Warden, Pete, "Why GEMM is at the heart of deep learning", URL: https://petewarden.com/2015/04/20/why-gemm-is-at-the-heart-of-deep-learning/, Apr. 20, 2015, 12 pages.

\* cited by examiner

SYSTEMS AND METHODS FOR REDUCING POWER CONSUMPTION OF CONVOLUTION OPERATIONS OF ARTIFICIAL NEURAL NETWORKS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
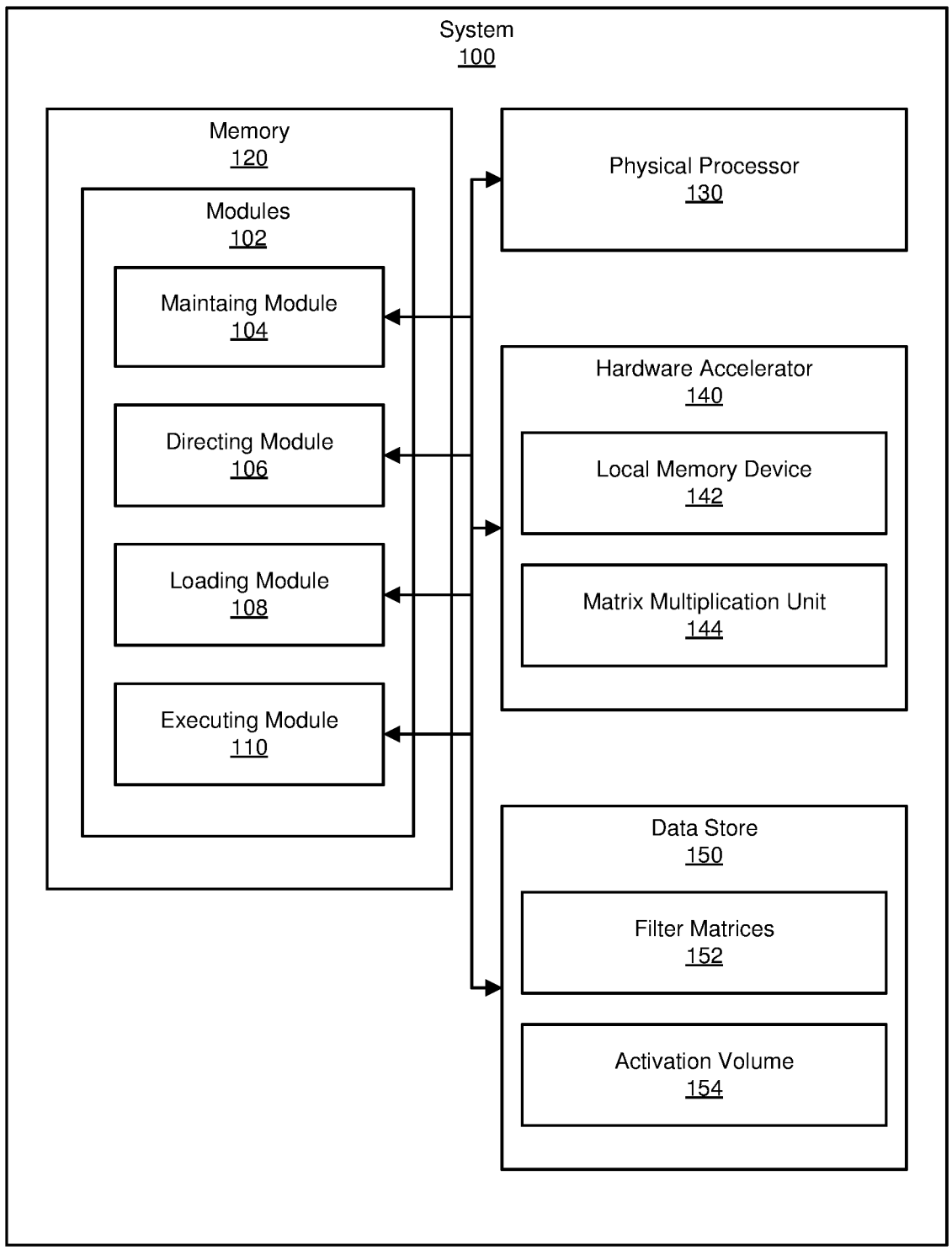
FIG. 1 is a block diagram of an example system for reducing power consumption of convolutional layers of convolutional neural networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Artificial intelligence (AI) may enable computers to perform various complicated tasks, such as those related to cognitive functions that are typically associated with humans. These functions often involve making predictions or assessments based on real-world inputs. Several approaches to AI are prevalent, including machine learning techniques. Machine learning systems, in at least some examples, may be trained using known data sets rather than employing a specific predetermined algorithm to perform a task.

One machine learning model, referred to as an artificial neural network (ANN), may be inspired by the interconnections of neurons in a biological brain. Typically, ANNs may include multiple computational nodes arranged in interconnected layers, with each node modeling a neuron that may receive one or more inputs, process the inputs, and pass an output to the next layer, with the final layer producing a desired output. One such layer that may be included in an ANN may be a convolutional layer. A convolutional layer may apply a convolution operation to an input and may pass the result to another layer.

Unfortunately, traditional approaches to performing such convolution operations may require and/or consume high amounts of computing and/or power resources. For example, traditional approaches may require and/or utilize components and/or computing techniques that may consume a high amount of power resources. Additionally, such power-hungry hardware components and/or computing techniques may complicate designs of systems that may utilize such convolutional layers. Hence, the present application identifies and addresses a need for new systems and methods for reducing power consumption of convolution operations for ANNs.

The present disclosure is generally directed to systems and methods for reducing power consumption of convolution operations for ANNs. As will be explained in greater detail below, an example embodiment may include a hardware accelerator that may include a local memory device (LMD) and an MMU.

The example embodiment may maintain a filter matrix in a filter cache included in the LMD. The filter matrix may include a set of filter vectors, each corresponding to a filter location (e.g., $w_{1,1}$, $w_{1,2}$, ... $w_{R,S}$) included in each filter included in a set of filters associated with a convolutional layer of an ANN (e.g., filters $K_1$ to $K_m$). The example embodiment may also maintain a plurality of activation matrices corresponding to different rows of an activation volume (e.g., rows of pixels of an input image) in an activation cache included in the LMD. Each activation matrix may include a set of activation vectors, where each activation vector may correspond to a location within an activation volume (e.g., $x_{1,1}$, $x_{1,2}$, ... $x_{H,W}$) such as a pixel within an image. Furthermore, each activation vector may include values corresponding to channels of the activation volume (e.g., $c_1$, $c_2$, ... $c_k$).

The example embodiment may also, for each activation matrix included in the set of activation matrices, direct an MMU included in the hardware accelerator to execute an MMO using the filter matrix (e.g., as a multiplier matrix) and the activation matrix (e.g., as a multiplicand matrix). The example embodiment may then load an additional filter matrix corresponding to a secondary filter location into the filter cache. The example embodiment may further direct the MMU to execute a plurality of additional MMOs, each additional MMO using one filter matrix included in the filter cache (e.g., the filter matrix or the additional filter matrix) and one activation matrix included in the activation cache, such that the MMU reuses the filter matrix for at least one additional MMO and uses the additional filter matrix for a different additional MMO. Based on these MMOs, the example embodiment may further determine, based on accumulating various outputs of the MMO and the plurality of additional MMOs within a set of output activation registers included in the hardware accelerator, a set of output activation values for the convolutional layer of the ANN.

As mentioned above, traditional and/or conventional options for performing convolution operations may have many drawbacks. For example, such conventional and/or traditional options for performing convolution operations may involve rearranging image blocks into columns, such as via one or more "im2col" operations. This may require steering at an element-wise level, necessitating elaborate uses of multiplexers ("muxes") that may consume power and complicate designs of such systems. Additionally, large sizes of rearranged image blocks and/or columns may lead to large data transfers between system components (e.g., between a processor and a memory device), thereby further increasing power consumption. Furthermore, such conventional and/or traditional systems may fail to take advantage of spatial reuse that may be available for convolution operations.

As will be made apparent by the following description, the systems and methods described herein may provide many benefits over conventional methods for performing convolution operations for ANNs. For example, by vastly increasing reuse of values stored in fast, power-efficient memory local to a hardware accelerator, the systems and methods described herein may provide significant power savings over conventional solutions for performing convolution operations that may require a higher number of power-consuming data access and/or transfer operations. Moreover, the systems and methods described herein may also increase reuse of filter values across multiple dimensions (e.g., a height dimension and a width dimension) of an input volume, thus providing even more efficiencies than other methods for performing convolution operations for ANNs.

Additionally, the systems and methods described herein may translate strides of convolution operations into simple line reads, thereby obviating a requirement for one or more complicated hardware and/or software muxing schemes that may be employed by conventional solutions for performing convolutions. This may enable both simplified memory organization schemes as well as reduced power consumption while performing convolution operations.

Furthermore, the systems and methods described herein may efficiently perform convolutions involving multiple filters in parallel via the hardware accelerator rather than in sequence and/or in parallel via multiple processors, which may result in more efficient (e.g., in terms of power consumption, execution time, processor usage, memory usage, etc.) computation of convolutions of multiple filters than conventional systems and methods for performing convolutions of multiple filters.

Some systems may provide for reuse of filter weights and/or activation values across a single dimension of an activation volume (e.g., a width (W) dimension of an activation volume). An example may be one or more systems and/or methods disclosed in U.S. patent application Ser. No. 16/354,665, filed Mar. 15, 2019, titled "Systems and Methods for Reducing Power Consumption of Convolution Operations for Artificial Neural Networks," and incorporated herein in its entirety by this reference. However, the systems and methods disclosed herein may provide for and/or enable reuse of filter weights and/or activation values across multiple dimensions of an activation volume (e.g., a height (H) dimension and a W dimension of an activation volume). The multi-dimensional reuse that may be enabled by the systems and methods described herein may provide additional efficiencies over conventional, traditional, or existing convolution methods.

The following will provide, with reference to FIGS. 1-2 and 4-48, detailed descriptions of systems for reducing power consumption of convolution operations for ANNs. Detailed descriptions of corresponding computer-implemented methods will also be provided in connection with FIG. 3.

FIG. 1 is a block diagram of an example system 100 for reducing power consumption of convolution operations for artificial neural networks. As illustrated in this figure, example system 100 may include one or more modules 102 for performing one or more tasks. As will be explained in greater detail below, modules 102 may include a maintaining module 104 that may maintain a filter matrix in a filter cache included in a local memory device (LMD) included in a hardware accelerator. The filter matrix may include a set of filter vectors, where each filter vector may correspond to a filter location included in each filter included in a set of filters associated with a convolutional layer of an artificial neural network. In some examples, maintaining module 104 may also maintain a plurality of activation matrices corresponding to different rows of an activation volume in an activation cache included in the LMD.

As further shown in FIG. 1, example system 100 may additionally include a directing module 106 that may, for each activation matrix included in the activation cache, direct a matrix multiplication unit (MMU) included in the hardware accelerator to execute a matrix multiplication operation (MMU) using the filter matrix (e.g., as a multiplier matrix) and the activation matrix (e.g., as a multiplicand matrix).

Example system 100 may also include a loading module 108 that may load (e.g., from a data store) an additional filter matrix corresponding to a secondary filter location into the filter cache. Furthermore, example system 100 may also include an executing module 110 that may direct the MMU to execute a plurality of additional MMOs, each additional MMO using one filter matrix included in the filter cache (e.g., the filter matrix or the additional filter matrix) and one activation matrix included in the activation cache, such that the MMU reuses the filter matrix for at least one additional MMO and uses the additional filter matrix for a different additional MMO.

In some examples, executing module 110 may further determine, for each activation matrix in the activation cache, a set of output activation values for the convolutional layer of the ANN based on accumulated outputs of the MMO and the set of additional MMOs.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate reducing power consumption of convolution operations for artificial neural networks.

Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As also shown in FIG. 1, example system 100 may also include a hardware accelerator 140. In some examples, a "hardware accelerator" may include a hardware component or device that performs one or more specialized computing tasks more efficiently, in hardware, than the computing task would be performed in software by a general-purpose central processing unit (i.e., a computing chip that is structured to execute a range of different programs as software). In some examples, "hardware acceleration" may refer to the execution of a computing task in application-specific hardware circuitry that occurs in the absence of a software module intermediary or other layer of abstraction, such that the performance of the application is more efficient than when executed otherwise.

In some examples, as shown in FIG. 1, hardware accelerator 140 may include an LMD 142. LMD 142 generally represents any type or form of volatile or non-volatile storage device or medium capable of storing data and/or computer-readable instructions and that may be included in a hardware accelerator. In one example, LMD 142 may store, load, receive, and/or maintain one or more matrices that may be local to (e.g., communicatively coupled via a high-speed, low-power, and/or low-latency bus), accessed, and/or utilized by one or more MMUs included in hardware accelerator 140. Examples of LMD 142 may include, without limitation, one or more RAM devices included in a hardware accelerator, one or more physical memory devices organized in one or more cache levels, a general cache, an instruction cache, variations or combinations of one or more of the same, and/or any other suitable storage memory device local to an MMU included in a hardware accelerator. In some examples, it may be more efficient (e.g., in terms of power usage, processing resource usage, etc.), for one or more components of system 100 and/or hardware accelerator 140 to access data and/or computer-readable instructions from LMD 142 than another data storage device that may not be included in hardware accelerator 140 (e.g., memory 120, data store 150, etc.).

In one example, hardware accelerator 140 may include application-specific hardware circuitry designed to perform a specific computing task. For example, as shown in FIG. 1, hardware accelerator 140 may include an MMU 144 (shown in FIGS. 1 and 2 as "matrix multiplication unit 144"). MMU 144 may include any hardware component designed to execute one or more MMOs. For example, as will be described in greater detail below, MMU 144 may be designed to, when provided with a multiplier matrix and a multiplicand matrix, execute an MMO using the multiplier matrix and the multiplicand matrix. Examples of MMUs may include, without limitation, programmable matrix-multiply-and-accumulate units, microprocessors that implement MMOs, FPGAs that implement MMOs, ASICs that implement MMOs, portions of one or more of the same, variations or combinations of one or more of the same, and/or or any other suitable hardware designed and/or configured to perform MMOs. In some examples, an MMO may include a generalized matrix multiplication (GEMM) operation.

In one or more examples, a multiplier matrix may be in a form of m×k and a multiplicand matrix may be in a form of n×k, where m may represent a number of rows in the multiplier matrix, k may represent a number of columns in the multiplier matrix and a number of rows in the multiplicand matrix, and n may represent a number of columns in the multiplicand matrix. In some examples, this form may be referred to as m×k×n (e.g., 8×8×8, 16×16×16, 32×32×32, 8×16×8, and so forth).

In some examples, MMU 144 may be designed to efficiently execute MMOs using multiplier and/or multiplicand matrices having predetermined and/or specified dimensions. For example, as will be described in greater detail below, MMU 144 may be designed and/or configured to efficiently execute MMOs using multiplier and multiplicand matrices with combined dimensions, in accordance with an m×k×n form as described above, of 8×8×8, 16×16×16, 32×32×32, 64×64×64, 8×16×8, 16×32×16, and so forth.

As also shown in FIG. 1, example system 100 may also include one or more data stores, such as data store 150, that may receive, store, and/or maintain data. Data store 150 may represent portions of a single data store or computing device or a plurality of data stores or computing devices. In some embodiments, data store 150 may be a logical container for data and may be implemented in various forms (e.g., a database, a file, a file system, a data structure, etc.). Examples of data store 150 may include, without limitation, files, file systems, data stores, databases, and/or database management systems such as an operational data store (ODS), a relational database, a NoSQL database, a NewSQL database, and/or any other suitable organized collection of data.

In at least one example, data store 150 may include (e.g., store, host, access, maintain, etc.) filter matrices 152. As will be explained in greater detail below, in some examples, filter matrices 152 may include information including and/or associated with one or more filters associated with a convolutional layer of an ANN. In some examples, data store 150 may additionally include (e.g., store, host, access, maintain, etc.) an activation volume 154. As will be described in greater detail below, activation volume 154 may include any set of data that may serve as input (e.g., an input volume) to a convolutional layer of an ANN, such as one or more digital images.

Figure 2A:
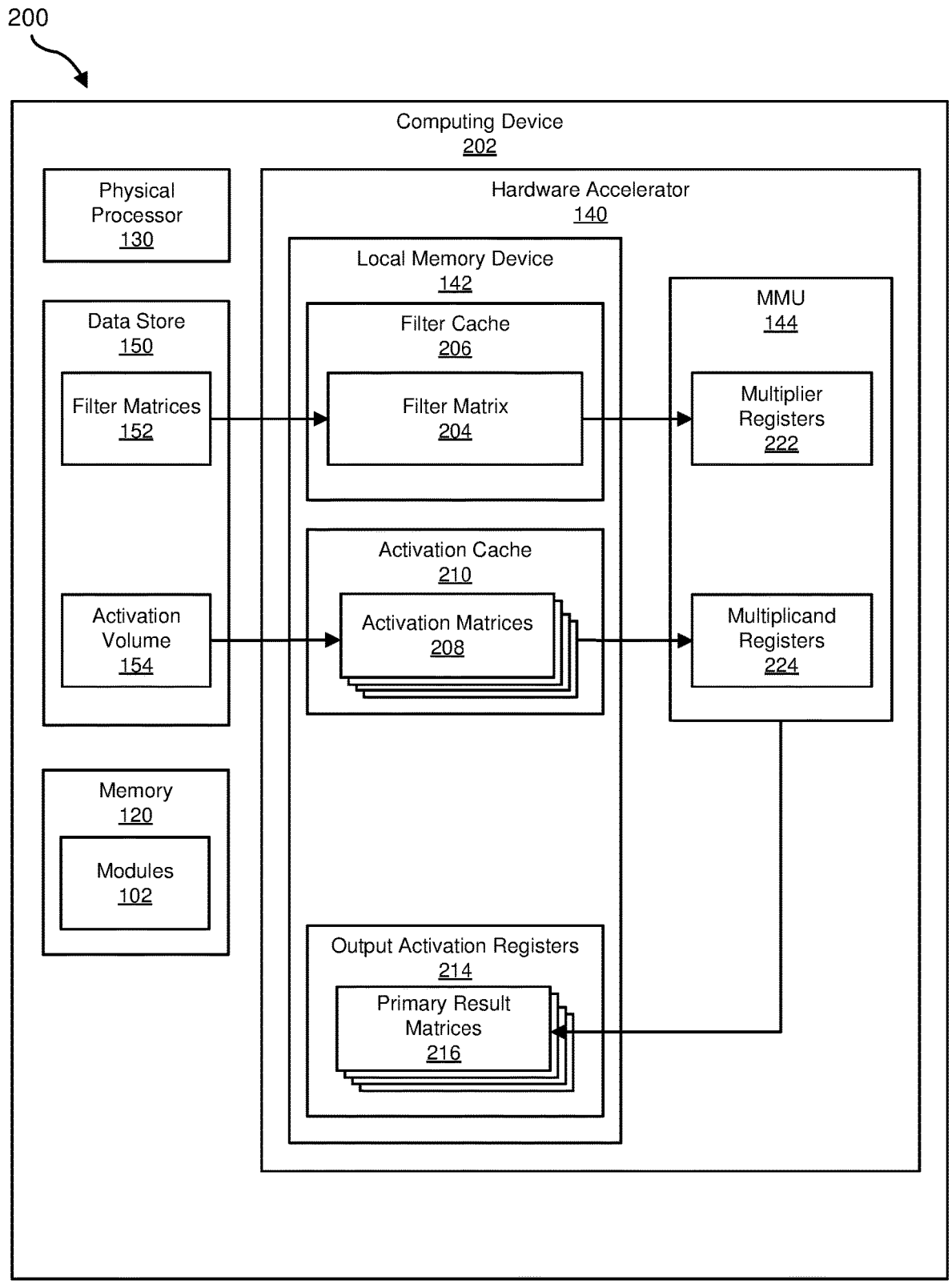
FIG. 2 is a block diagram of an example implementation of a system for reducing power consumption of convolutional layers of convolutional neural networks.
Figure 2B:
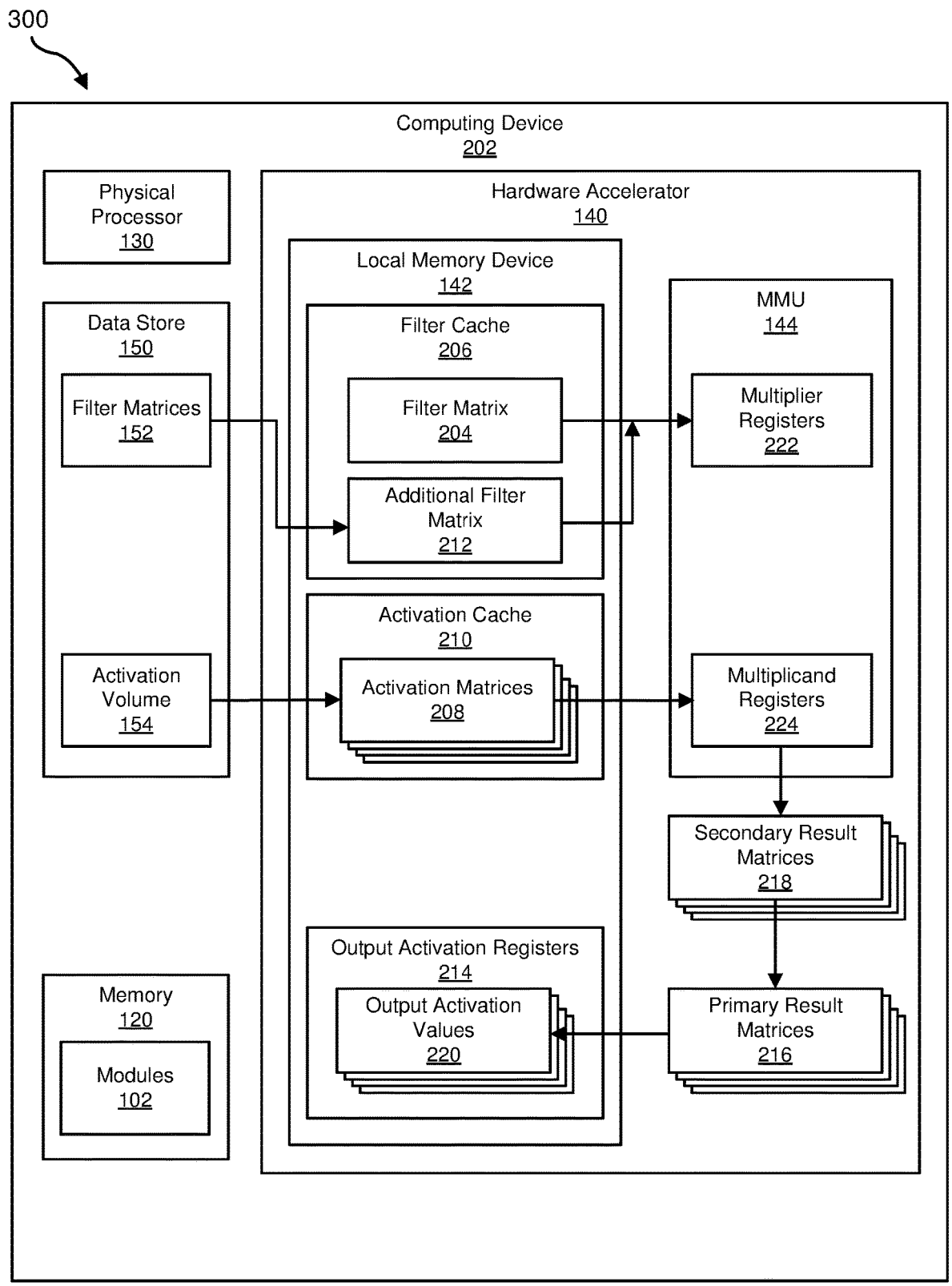

Example system 100 in FIG. 1 may be implemented in a variety of ways. For example, all or a portion of example system 100 may represent portions of an example system 200 ("system 200") in FIGS. 2A and 2B (collectively, FIG. 2). As shown in FIG. 2, system 200 may include a computing device 202. In at least one example, computing device 202 may be programmed with one or more of modules 102.

In at least one embodiment, one or more of modules 102 from FIG. 1, when executed by computing device 202, may enable computing device 202 to perform one or more operations to reduce power consumption of convolution operations as described herein. For example, as will be described in greater detail below, maintaining module 104 may, when executed by computing device 202, cause computing device 202 to maintain a filter matrix (e.g., filter matrix 204) in a filter cache (e.g., filter cache 206) included in an LMD included in a hardware accelerator. The filter matrix may include a set of filter vectors that may each correspond to a filter location (e.g., $w_{1,1}$, $w_{1,2}$, etc.) included in each filter included in a set of filters (e.g., filters $K_1$ to $K_m$) associated with a convolutional layer of an ANN.

Additionally, maintaining module 104 may, when executed by computing device 202, cause computing device 202 to maintain a plurality of activation matrices (e.g., activation matrices 208) corresponding to different rows (e.g., row $x_{1,*}$, row $x_{2,*}$, etc.) of an activation volume (e.g., activation volume 154) in an activation cache (e.g., activation cache 210) included in the LMD. In some examples, the activation cache may be sized to maintain a plurality (e.g., at least two) activation matrices.

In some examples, maintaining module 104 may maintain the filter matrix in the filter cache by loading the filter matrix into the filter cache from a data store (e.g., from filter matrices 152 included in data store 150). In at least one example, maintaining module 104 may maintain the plurality of activation matrices by loading each activation matrix included in the plurality of activation matrices into the activation cache from the data store (e.g., from activation volume 154 included in data store 150).

Furthermore, in some examples, directing module 106 may, for each activation matrix included in the plurality of activation matrices, direct an MMU included in the hardware accelerator (e.g., MMU 144 included in hardware accelerator 140) to execute an MMO using the filter matrix and the activation matrix. In at least one example, directing module 106 may, for each activation matrix included in the plurality of activation matrices, direct the MMU to execute the MMO using the filter matrix as a multiplier matrix and the activation matrix as a multiplicand matrix.

In some examples, the hardware accelerator may further include a set of output activation registers (e.g., output activation registers 214) associated with the MMU. In at least one example, directing module 106 may direct the MMU to execute the MMO using the filter matrix and the activation matrix by, for each activation matrix in the activation cache, generating a primary result matrix (e.g., a primary result matrix included in primary result matrices 216) by directing the MMU to execute the MMO using the filter matrix as a multiplier matrix and the activation matrix as a multiplicand matrix. Directing module 106 may also store each primary result matrix within the set of output activation registers.

In at least one embodiment, loading module 108 may, when executed by computing device 202, cause computing device 202 to load an additional filter matrix (e.g., additional filter matrix 212). In some examples, the filter matrix (e.g., filter matrix 204) may correspond to a primary filter location (e.g., $w_{1,1}$) and the additional filter matrix may correspond to a secondary filter location (e.g., $w_{1,2}$). In some examples, the filter cache may be sized to maintain a plurality of (e.g., at least two) filter matrices.

Additionally, executing module 110 may direct the MMU to execute a plurality of additional MMOs, each additional MMO using one filter matrix included in the filter cache and one activation matrix included in the activation cache, such that the MMU reuses the filter matrix for at least one additional MMO and uses the additional filter matrix for a different additional MMO.

In some examples, executing module 110 may direct the MMU to execute the plurality of additional MMOs by, for each additional MMO in the plurality of additional MMOs, designating a set of activation vectors loaded into the activation cache and associated with a row of the activation volume as an intermediate activation matrix. Executing module 110 may also direct the MMU to execute the plurality of additional MMOs by, for each additional MMO in the plurality of additional MMOs, producing a secondary result matrix (e.g., a secondary result matrix included in secondary result matrices 218) by directing the MMU to execute an additional MMO using the intermediate activation matrix as a multiplicand matrix and a selected filter matrix loaded into the filter cache as a multiplier matrix. Executing module 110 may also direct the MMU to execute the plurality of additional MMOs by, for each additional MMO in the plurality of additional MMOs, accumulating the secondary result matrix with at least one primary result matrix included in the set of output activation registers. Based on a result of accumulating the secondary result matrix and the at least one primary result matrix, executing module 110 may further determine a set of output activation values (e.g., output activation values 220) for a convolutional layer of an artificial neural network.

In some examples, as will be described in greater detail below, one or more of modules 102 (e.g., loading module 108, executing module 110, etc.) may further replace, prior to directing the MMU to execute at least one MMO in the set of additional MMOs, at least one of (1) at least one of the filter matrix and the additional filter matrix with a supplemental filter matrix, or (2) at least one activation vector loaded into the activation cache with an additional activation vector prior to directing the MMU to execute at least one additional MMO in the plurality of additional MMOs.

In some examples, the LMD may include a filter cache (e.g., filter cache 206) and an activation cache (e.g., activation cache 210). In some examples, maintaining module 104 may maintain the filter matrix within the filter cache by retrieving and/or loading, from a data store (e.g., from filter matrices 152 included in data store 150), the filter matrix to the filter cache. Maintaining module 104 may further maintain the set of activation matrices within the activation cache by retrieving and/or loading, from the data store (e.g., from activation volume 154 included in data store 150), the plurality of activation matrices to the filter cache.

In some examples, the LMD may further include a set of multiplier registers (e.g., multiplier registers 222) associated with the MMU and a set of multiplicand registers (e.g., multiplicand registers 224). In some examples, one or more of modules 102 (e.g., directing module 106, executing module 110, etc.) may direct MMU 144 to execute one or more MMOs using a first matrix as a multiplier matrix and a second matrix as a multiplicand matrix. In some examples, one or more of modules 102 (e.g., directing module 106, executing module 110, etc.) may direct MMU 144 to execute one or more MMOs by loading a first matrix (e.g., a filter matrix) into the set of multiplier registers and loading a second matrix (e.g., an activation matrix) into the set of multiplicand registers. Thus, when MMU 144 executes the MMO, MMU 144 may use the first matrix (e.g., the filter matrix) as a multiplier matrix and the second matrix (e.g., the activation matrix) as a multiplicand matrix.

Computing device 202 generally represents any type or form of computing device capable of reading and/or executing computer-executable instructions and/or hosting executables. Examples of computing device 202 may include, without limitation, application servers, storage servers, database servers, web servers, and/or any other suitable computing device configured to run certain software applications and/or provide various application, storage, and/or database services.

In at least one example, computing device 202 may be a computing device programmed with one or more of modules 102. All or a portion of the functionality of modules 102 may be performed by computing device 202 and/or any other suitable computing system. As will be described in greater detail below, one or more of modules 102 from FIG. 1 may, when executed by at least one processor of computing device 202, may enable computing device 202 to reduce power consumption of convolution operations for artificial neural networks.

Many other devices or subsystems may be connected to example system 100 in FIG. 1 and/or example system 200 in FIG. 2. Conversely, all the components and devices illustrated in FIGS. 1 and 2 need not be present to practice the embodiments described and/or illustrated herein. The devices and subsystems referenced above may also be interconnected in different ways from those shown in FIG. 2. Example system 100 and example system 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
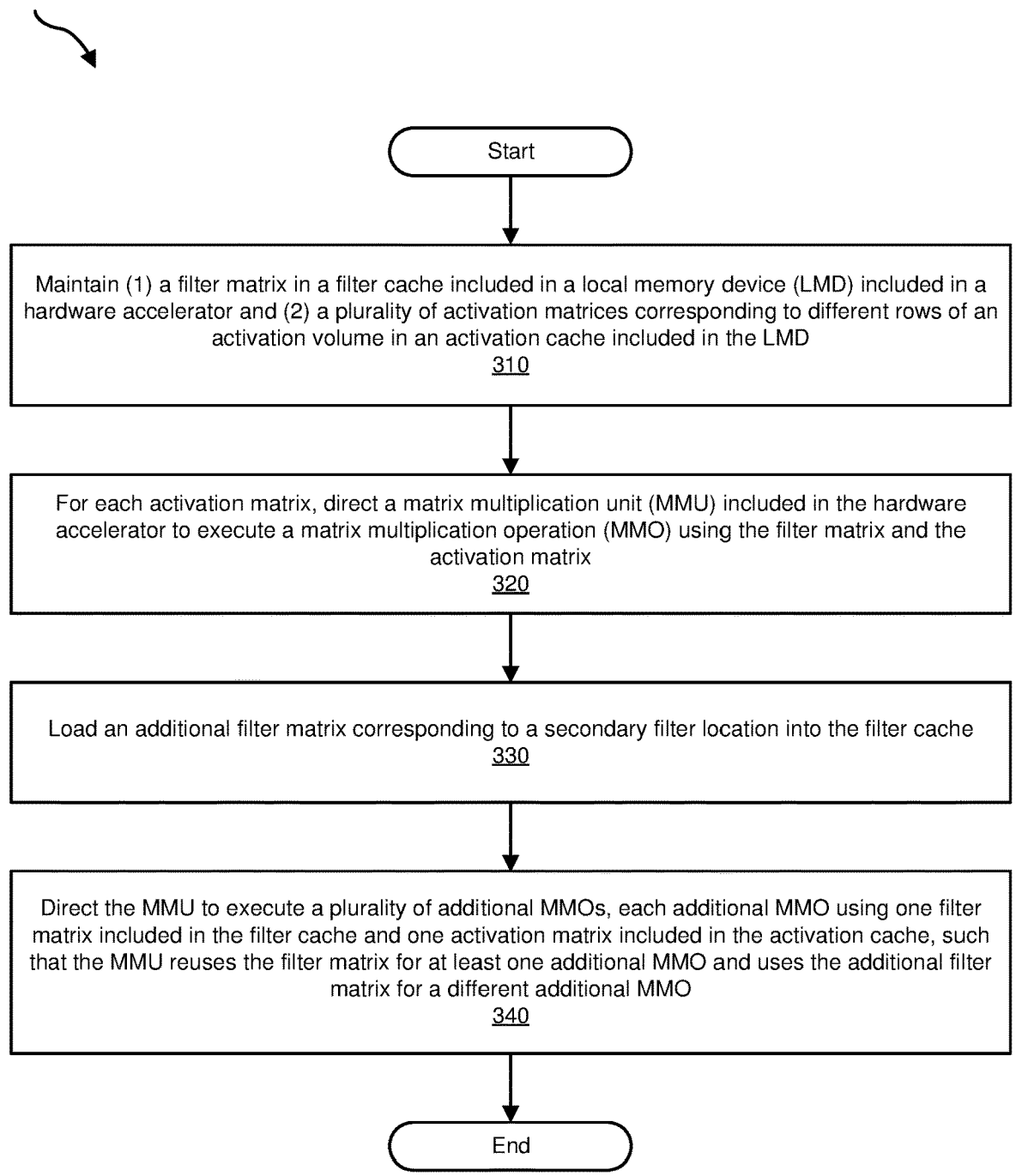
FIG. 3 is a flow diagram of an example method for reducing power consumption of convolutional layers of convolutional neural networks.

FIG. 3 is a flow diagram of an example computer-implemented method 300 for allocating shared resources in multi-tenant environments. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may maintain (1) a filter matrix in a filter cache included in an LMD included in a hardware accelerator, and (2) a plurality of activation matrices corresponding to different rows of an activation volume in an activation cache included in the LMD. For example, maintaining module 104 may, as part of computing device 202 in FIG. 2, cause computing device 202 to maintain (1) filter matrix 204 in filter cache 206 included in LMD 142 included in hardware accelerator 140, and activation matrices 208 that may correspond to different rows of activation volume 154 in activation cache 210 included in LMD 142.

In some examples, a "filter" may include an array or matrix of weight values that may, as part of a convolution operation, be convolved with an input volume (e.g., an activation volume, an image, etc.) to generate an output activation map and/or output volume associated with the filter and the input volume.

In some examples, an "activation volume" may include any set of data that may serve as input (e.g., an input volume) to a convolutional layer of an ANN as described herein. In some examples, an activation volume may include a set of data that may be represented as one or more channels or channel matrices. In some examples, a "channel" or a "channel matrix" may include data associated with a portion of a filter or a portion of an activation volume.

For example, an activation volume may include a digital image that may be represented as one or more matrices, where each matrix may correspond to a different color channel of the image. A color digital image may include a red channel, a green channel, and/or a blue channel. Likewise, a monochrome image may include only a single channel (e.g., a brightness channel). Hence, an activation volume that includes a digital representation of a color image may include a red channel matrix, a blue channel matrix, and a green channel matrix. In such examples, the red channel matrix may include data associated with a red channel of the image, the green channel matrix may include data associated with a green channel of the image, and the blue channel matrix may include data associated with the blue channel.

An activation volume may also include one or more pixels that may include one or more values corresponding to one or more channels at a particular location within the activation volume. For example, an activation volume may include a digital image that may be represented by a red channel matrix, a blue channel matrix, and a green channel matrix. A pixel at a location x within the image (e.g., $x_{1,1}$, $x_{1,2}$, $x_{1,3}$, etc.) may include a red channel value, a green channel value, and a blue channel value.

Likewise, filters may include one or more channels, where each channel may be convolved with a corresponding channel in the activation volume. In such examples, an output value may be determined by accumulating each result of a channel convolution with the results of the other channel convolutions. For example, if a convolution of a filter with a portion of an input volume resulted in a red channel value of 4, a green channel value of 3, and a red channel value of 5, an output value for the convolution of the filter with the portion of the input volume may be 12.

While examples of red, green, and blue channels of color images may be convenient for descriptive and conceptual purposes, these are examples only, and not intended to be limiting. In other examples, filters and/or activation volumes may include any number of channels and/or channel matrices.

In some examples, an activation volume and a filter that may be convolved with the activation volume may have a common channel depth. In some examples, a "channel depth" may include a number of channels shared by the activation volume and the filter. For example, an activation volume may include sixteen channels and a filter that may be convolved with the activation volume may include sixteen channels.

Figure 4:
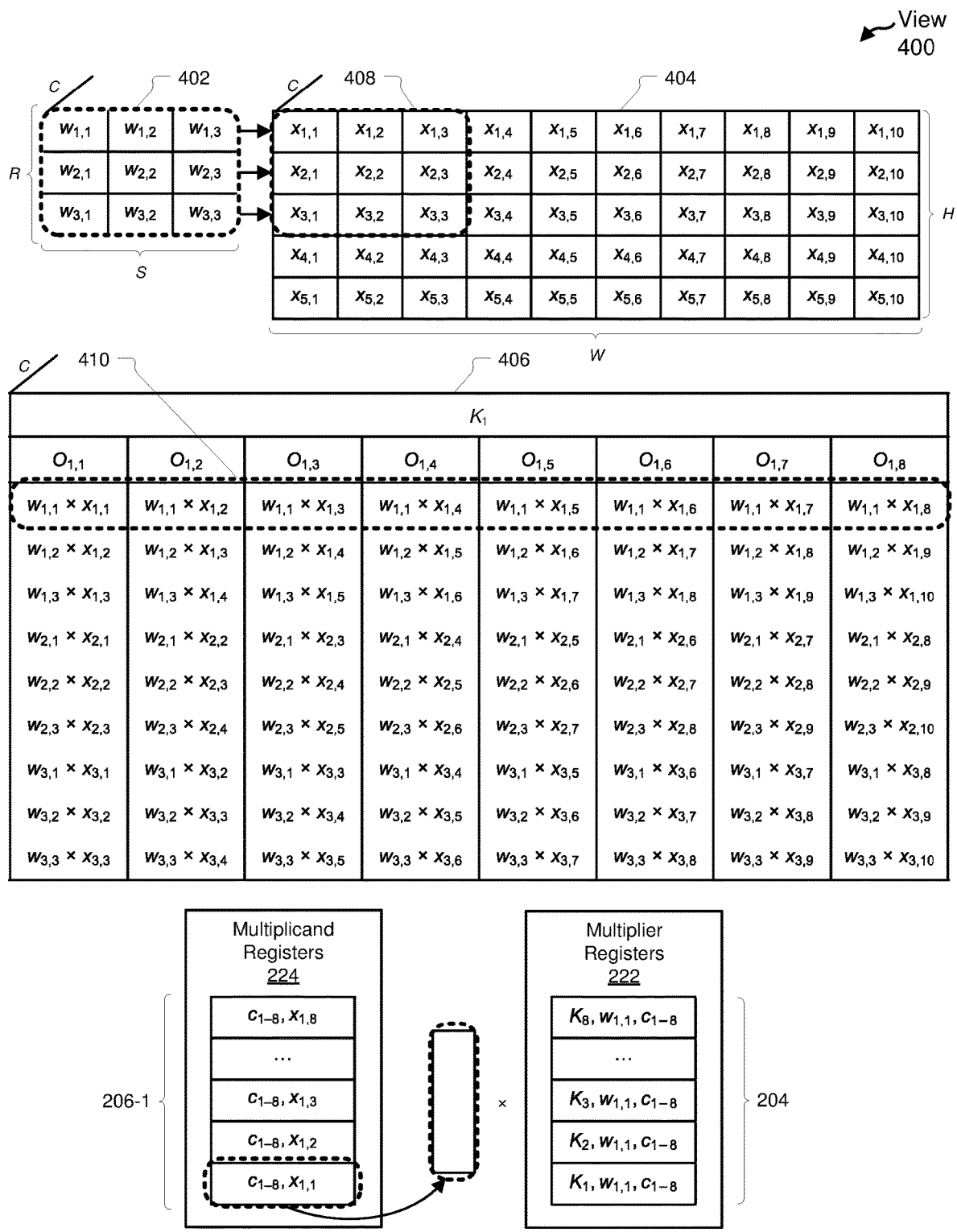
FIGS. 4-5 illustrate generating a result matrix by directing a matrix multiplication unit (MMU) included in a hardware accelerator to execute a matrix multiplication operation (MMO) using a filter matrix as a multiplier matrix and an activation matrix as a multiplicand matrix as described herein.

By way of illustration, FIG. 4 shows a view 400 of a filter 402 and an activation volume 404. As shown, filter 402 may be represented by a two-dimensional matrix having R=3 rows and S=3 columns. Each value in filter 402 may be a weight value and may be represented by its location within filter 402. For example, $w_{1,1}$ represents a weight value at a first row and first column of filter 402. Although filter 204 may only show 3×3 weight values (e.g., filter vectors) in FIG. 4, filter matrix 204 may have any suitable dimensions and/or may extend any distance in any direction.

Note that, in some examples, an ANN and/or a convolutional layer of an ANN may include and/or be associated with more than one filter. For example, filter 402 may be one of multiple filters associated with a convolutional layer of an ANN and may therefore be designated as $K_1$. Likewise, a second filter associated with a convolutional layer of the ANN may be designated as $K_2$, a third filter may be designated as $K_3$, and so forth.

Activation volume 404 may be represented by a two-dimensional matrix having H=5 rows and W=10 columns. Each value in activation volume 404 may be a pixel value and may be represented by its location within filter 402. For example, $x_{1,1}$ may represent a pixel value at a first row, first column of activation volume 404. Although activation volume 404 may only show 5×10 pixels (e.g., activation vectors) in FIG. 4, activation volume 404 may have any suitable dimensions and/or may extend any distance in any direction.

As further shown in FIG. 4, both filter 402 and activation volume 404 may also have an associated channel depth C. This may indicate that both filter 402 and activation volume 404 may include and/or are associated with C channels. For example, filter 402 and activation volume 404 may each include and/or be associated with a red channel, a green channel, and a blue channel. For simplicity of presentation and explanation, filter 402 and activation volume 404 only show one of the C channels that may be included in and/or may be associated with filter 402 and activation volume 404. Notwithstanding this appearance, a filter (e.g., filter 402) and/or an activation volume (e.g., activation volume 404) may include any suitable number of channels.

Particular values (e.g., weight values, pixel values, etc.) corresponding to locations within filters, activation volumes, and/or channels may be denoted herein in a variety of ways. For example, suppose a particular convolutional layer of an ANN is associated with eight filters (e.g., $K_1$ to $K_8$, also denoted herein as $K_{1-8}$) that may be convolved with an activation volume. Further suppose that each filter has a width R, a height S, and a channel depth of C. An upper left corner of a first channel may be referred to as ($w_{1,1}$, $c_1$), which may denote a weight value within a first row and a first column of a first channel of the filter. Likewise, a weight value within a first row and a first column of a second channel of the filter may be denoted as ($w_{1,1}$, $c_2$).

Furthermore, a pixel value in a first row and first column of an activation volume may be denoted by $x_{1,1}$. Likewise, a pixel value in a first row, first column, and first channel of an activation volume may be denoted by $x_{1,1}$, $c_1$ and/or ($x_{1,1}$, $c_1$). In some examples, an activation vector or set of pixel values associated with a first row and first column of an activation volume having eight channels may be denoted by $x_{1,1}$, $c_{1-8}$, ($x_{1,1}$, $c_{1-8}$), ($x_{1,1}$, $c_1 \ldots c_8$), and/or ($x_{1,1}$, $c_1$) to ($x_{1,1}$, $c_8$). In some examples, an "activation vector" may include a vector that includes a set of pixel values associated with a location and a set of channels included in an activation volume, such as ($x_{1,2}$, $c_{1-8}$), ($x_{10,20}$, $c_{3-10}$), and so forth.

Note that, in many examples involving matrices herein, matrix elements may be listed in a "row, column" format. Hence, when a matrix includes pixel locations arranged in rows of the matrix and channels arranged in columns of the matrix, pixel locations may be listed before channels (e.g., ($x_{1,1}$, $c_2$)). Likewise, when a matrix includes channels arranged in rows of the matrix and pixel locations arranged in columns of the matrix, channels may be listed before pixel locations (e.g., ($c_2$, $x_{1,1}$)). Furthermore, an asterisk may be used herein to refer to whole rows or columns in a matrix. For example, $a_{i,*}$ may refer to the i-th row of matrix A, $b_{*,j}$ may refer to the j-th column of matrix B, and so forth.

In some examples, a "convolution" or "convolution operation" may include an operation during which a filter (e.g., filter 402) may be virtually "placed" at a set of locations within the activation volume, and an output value may be determined for each location based on the weight values included in the filter and the pixel values that may correlate with the location of the filter. For example, at each location, element-wise products for the filter and activation volume may be calculated and summed, thereby producing an output value for the location. A 2-dimensional set of output values produced by convolving a filter and an activation volume may be referred to as a "feature map," an "activation map," an "output activation," or an "output activation value" for the filter.

In some examples, the set of locations within an activation volume that a filter may be placed during a convolution operation may be governed by a "stride" or "stride length" of the filter, which may indicate a number of pixels between each location. For example, a stride of one may indicate that the filter may be moved one pixel at a time across the input volume, with a convolution operation being executed at each location. As another example, a stride of two may indicate that the filter is moved two pixels at a time across the input volume. Hence, in some embodiments, one or more of modules 102 (e.g., maintaining module 104, directing module 106, loading module 108, executing module 110, etc.) may select activation vectors and/or filter matrices for the systems and methods described herein based on a predetermined stride length associated with a filter and/or a convolutional layer of an ANN.

By way of illustration, FIG. 4 includes an output table 406 that includes calculations corresponding to a pass of filter 402 across the W dimension of activation volume 404 with a stride of one pixel. As shown, to determine output values for a first row of activation volume 404 and filter 402 (e.g., values $O_{1,1}$ to $O_{1,8}$), filter 402 may be virtually placed at a set of locations within activation volume 404. At each location, an element-wise multiplication may be performed between the weight values included in filter 402 and a portion of activation volume 404 that corresponds to the location of filter 402. These partial products may then be summed to determine an output value corresponding to the location of filter 402 (e.g., values $O_{1,1}$ to $O_{1,8}$).

For example, when filter 402 is at location 408, output value $O_{1,1}$ may be a sum of nine values corresponding to the weight values included in filter 402: $w_{1,1} \times x_{1,1}$, $w_{1,2} \times x_{1,2}$, $w_{1,3} \times x_{1,3}$, $w_{2,1} \times x_{2,1}$, $w_{2,2} \times x_{2,2}$, $w_{2,3} \times x_{2,3}$, $w_{3,1} \times x_{3,1}$, $w_{3,2} \times x_{3,2}$, and $w_{3,3} \times x_{3,3}$. Furthermore, in examples where a filter and a corresponding activation volume include a plurality of channels, output values for each channel may be summed to determine a final output value. For example, if an output value of a particular location is {10, 20, 5}, in a red channel, green channel, and blue channel, respectively, an overall output value for the particular location (e.g., $O_{i,j}$) may be 10+20+5=35.

As shown in FIG. 4, a row 410 of constituent values of each of output values $O_{1,1}$ through $O_{1,8}$ in output table 406 is highlighted. Row 410 may indicate a set of calculations that share a common factor of $w_{1,1}$, as will be described in greater detail below.

In some examples, a "filter vector" may include a vector that includes a set of weight values corresponding to a location within a filter and to a set of channels associated with the filter. For example, a filter vector that corresponds to weight values associated with a first row and a first column of a filter having a channel depth of eight channels may be denoted by ($w_{1,1}$, $c_{1-8}$). Likewise, in a set of filters, a filter vector that corresponds to weight values associated with a first row and a first column of a first filter having a channel depth of eight channels may be denoted by ($K_1$, $w_{1,1}$, $c_{1-8}$).

In some examples, a "filter matrix" may include a set of filter vectors that each correspond to a filter location (e.g., one of $w_{1,1}$, $w_{1,2}$, $w_{1,3}$, ... $w_{R,S}$) included in a set of filters (e.g., filters $K_1$ through $K_m$). Each filter vector may include a set of weight values that each correspond to a different channel included in a set of channels associated with a filter included in the set of filters. The set of filter vectors may include up to a multiplier matrix width dimension (e.g., m) of filter vectors. Each filter vector may include a predetermined number of channel values that is at most a multiplier matrix height dimension (e.g., k).

Figure 5:

To illustrate, FIG. 5 is a view 500 that shows a filter matrix 502 with m rows and k columns. As shown, each row of filter matrix 502 may include a filter vector corresponding to a filter location $w_{1,1}$ included in each filter K included in a set of m filters. Furthermore, each filter vector in filter matrix 502 may include k weight values corresponding to each channel c included in each filter $K_1$ to $K_m$. For example, a weight value included in a first row and first column of filter matrix 502 may correspond to a filter $K_1$, a filter location $w_{1,1}$, and a channel $c_1$. Likewise, a weight value included in a last row and a last column of filter matrix 204 may correspond to a filter $K_m$, the filter location $w_{1,1}$, and a channel $c_k$.

In some examples, an "activation matrix" may include a set of activation vectors. Each activation vector may correspond to a location within an activation volume (e.g., $x_{1,1}$, $x_{1,2}$, $x_{1,3}$, . . . $x_{H,W}$) and may include a set of pixel values corresponding to a set of channels included in the activation volume. For example, an activation vector that corresponds to a location $x_{1,1}$ within an activation volume that includes up to eight channels may be expressed as ($x_{1,1}$, $c_{1-8}$). In some examples, a total number of activation vectors included in an activation matrix may be at most the multiplicand matrix width dimension (e.g., n). Likewise, in some examples, each activation vector included in an activation matrix may include at most the multiplicand matrix width dimension (e.g., k) of activation channel values.

As an illustration, FIG. 5 also includes an activation matrix 504 with n rows and k columns. As shown, each column of activation matrix 504 may correspond to an activation vector that may include a set of k activation channel values $c_1$ to $c_k$ corresponding to a location (e.g., $x_{i,j}$) included in an activation volume. For example, an activation channel value (e.g., a pixel value) included in a first row and first column of activation matrix 504 may correspond to a first channel $c_1$ and a location $x_{1,1}$ of an activation volume. Likewise, an activation channel value included in a last row and a last column of activation matrix 504 may correspond to a channel $c_k$ and a location of $x_n$ (e.g., an n-th member of ($x_{1,1}$, $x_{1,2}$, $x_{1,3}$, . . . $x_{H,W}$)) within an activation volume.

Each activation matrix included in activation matrices 208 may be associated with and/or correspond to a different row in an activation volume. For example, an activation matrix 208-1 included in activation matrices 208 may correspond to a first row in activation volume 154 (e.g., any of $x_{1,1}$ to $x_{1,W}$). Likewise, an activation matrix 208-2 included in activation matrices 208 may correspond to a second row in activation volume 154 (e.g., any of $x_{2,1}$ to $x_{2,W}$). This pattern may continue with and/or apply to all activation matrices included in activation matrices 208.

Maintaining module 104 may cause computing device 202 to maintain filter matrix 204 in filter cache 206 and activation matrices 208 in activation cache 210 in a variety of contexts. For example, in at least some embodiments, maintaining module 104 may maintain filter matrix 204 in filter cache 206 by loading filter matrix 204 from filter matrices 152 into filter cache 206. In some embodiments, maintaining module 104 may maintain activation matrices 208 in activation cache 210 by loading each activation matrix included in activation matrices 208 from activation volume 154 into activation cache 210.

In some examples, one or more of modules 102 (e.g., maintaining module 104, directing module 106, loading module 108, and/or executing module 110) may further load filter matrix 204 from filter cache 206 into a set of multiplier registers associated with MMU 144 such as multiplier registers 222. Additionally, one or more of modules 102 (e.g., maintaining module 104, directing module 106, loading module 108, and/or executing module 110) may further load one or more of activation matrices 208 into a set of multiplicand registers associated with MMU 144 such as multiplicand registers 224.

In some examples, a "multiplier register" may include one or more memory registers included in LMD 142 that may store and/or maintain data that MMU 144 may utilize as a multiplier matrix (e.g., multiplier registers 222) in an MMO. Likewise, a "multiplicand register" may include one or more registers included in LMD 142 that may store and/or maintain data that MMU 144 may utilize as a multiplicand matrix (e.g., multiplicand registers 224) in an MMO.

By way of example, FIG. 4 includes an illustration of multiplier registers 222 that may be storing and/or maintaining filter matrix 204. In this example, MMU 144 may be configured to execute MMOs in a form of 8×8×8. Hence, filter matrix 204 may include eight filter vectors, each filter vector corresponding to a filter location (e.g., $w_{1,1}$) included in each filter included in a set of eight filters (e.g., K1 through $K_8$).

Additionally, FIG. 4 also shows an illustration of multiplicand registers 224 that may be storing and/or maintaining an activation matrix 208-1 included in activation matrices 208. In this example, where MMU 144 may be configured to execute MMOs in a form of 8×8×8, activation matrix 208-1 may include eight activation vectors, each activation vector including eight activation channel values corresponding to eight different channels (e.g., $x_{1,1}$, $c_{1-8}$ to $x_{1,8}$, $c_{1-8}$).

Returning to FIG. 3, at step 320, one or more of the systems described herein may, for each activation matrix included in the plurality of activation matrices, direct an MMU included in the hardware accelerator to execute an MMO using the filter matrix (e.g., as a multiplier matrix) and the activation matrix (e.g., as a multiplicand matrix). For example, directing module 106 may, as part of computing device 202, cause computing device 202 to, for each activation matrix included in activation matrices 208 (e.g., each of activation matrix 208-1, activation matrix 208-2, and so forth), direct MMU 144 included in hardware accelerator 140 to execute an MMO using filter matrix 204 (e.g., as a multiplier matrix) and the activation matrix (e.g., as a multiplicand matrix).

Directing module 106 may cause computing device 202 to direct MMU 144 to execute MMOs using filter matrix 204 and each activation matrix included in activation matrices 208 (e.g., each of activation matrix 208-1, activation matrix 208-2, and so forth) in a variety of ways. In some embodiments, directing module 106 may cause computing device 202 to generate a plurality of primary result matrices (e.g., primary result matrices 216), each primary result matrix corresponding to a different activation matrix included in activation matrices 208, by directing MMU 144 to execute an MMO using filter matrix 204 as a multiplier matrix and an activation matrix included in activation matrices 208 (e.g., activation matrix 208-1, activation matrix 208-2, etc.) as a multiplicand matrix. For example, as noted above, MMU 144 may be configured to perform a an MMO (e.g., a GEMM) using a multiplier matrix having dimensions of m×k and a multiplicand matrix having dimensions of n×k. Hence, in some examples, directing module 106 may cause computing device 202 to generate, for each activation matrix included in activation matrices 208, a corresponding result matrix (e.g., primary result matrix 216-1, primary result matrix 216-2, etc.) by directing MMU 144 to execute an MMO (e.g., a GEMM) using filter matrix 204 as a multiplier matrix having dimensions of m×k and activation matrix included in activation matrices 208 as a multiplicand matrix having dimensions of n×k.

In some examples, a "generalized matrix multiplication operation" may include any matrix operation whereby a multiplier matrix is multiplied by a multiplicand matrix to produce a matrix product (also referred to as a result matrix herein, such as a primary result matrix included in primary result matrices 216, a secondary result matrix included in secondary result matrices 218, etc.). As further shown in FIG. 5, filter matrix 502 may be a multiplier matrix A having dimensions of m×k and activation matrix 504 may be a multiplicand matrix B having dimensions of n×k. A matrix product AB=C may be a matrix 506 having dimensions of m×n such that element $c_{i,j}$ may be obtained by multiplying, term-by-term, the entries of the i-th row of A and the j-th column of B and summing these partial products. In other words, element $c_{i,j}$ of matrix C may be a dot product of the i-th row of A and the j-th column of B. A dot product of two vectors a and b may be expressed as:

$$a \cdot b = \sum_{i=1}^{n} a_i b_i = a_1 b_1 + a_2 b_2 + \ldots + a_n b_n,$$

where Σ denotes summation and n is the dimension of the vector space.

Hence, as shown in FIG. 5, an element within the first row and first column of output matrix C may be a dot product of elements included in a first row (e.g., $a_{1,*}$) of filter matrix 502 and elements included in a first column (e.g., $b_{*,1}$) of activation matrix 504. Likewise, an element within the first row and second column of output matrix C may be a dot product of elements included in a first row $a_{1,*}$ of filter matrix 502 and elements included in a second column $b_{*,1}$ of activation matrix 504. Furthermore, an element within an m-th row and an n-th column of output matrix C may be a dot product of elements included in an m-th row $a_{m,*}$ of filter matrix 502 and elements included in an n-th column $b_{*,n}$ of activation matrix 504.

MMU 144 may execute an MMO, using a filter matrix (e.g., filter matrix 204, filter matrix 502, etc.) as a multiplier matrix and an activation matrix (e.g., activation matrix 208-1, activation matrix 208-2, activation matrix 504, etc.) as a multiplicand matrix in any suitable way. For example, returning to FIG. 4, during each cycle associated with hardware accelerator 140, MMU 144, and/or computing device 202, MMU 144 may access a set of registers included in multiplicand registers 224 that may include a row of a multiplicand matrix. During the cycle, MMU 144 may then determine (e.g., calculate), for each column of values included in the multiplier matrix, a dot product of the row of the multiplicand matrix and the column of values included in the multiplier matrix. This may be referred to as "broadcasting" a pixel (e.g., a location $x_n$ having k channels) of the activation matrix to each of the filter vectors included in the filter matrix.

This operation may be visualized as a convolution operation whereby a 1×1×k portion of an activation volume (e.g., activation volume 154, activation volume 404, etc.) is convolved with a 1×1×k portion of each filter included in a set of m filters.

To illustrate, in some examples, MMU 144 may be configured to execute GEMM operations in the form of m×k×n, where m=8, k=8, and n=8. Thus, MMU 144 may be configured to execute a GEMM using a multiplier matrix having a dimensionality of m×k such that m=8 and k=8. MMU 144 may be further configured to execute the GEMM MMO using a multiplicand matrix having a dimensionality of k×n such that k=8 and n=8. In some examples, MMU 144 may be referred to as "a matrix multiplication block of 8×8×8" or "an 8×8×8 matrix multiplication block". Note that these are examples and illustrations only, as MMU 144 may be configured to execute MMOs of any dimensionality including, without limitation, 8×8×8, 16×16×16, 32×32×32, 64×64×64, 8×16×8, 8×32×8, 16×32×16, and so forth.

FIG. 4 also shows an example of multiplier registers 222 and multiplicand registers 224. Although not shown in FIG. 4, in the example illustrated by FIG. 4, MMU 144 may include an 8×8×8 matrix multiplication block. Multiplier registers 222 may be loaded with filter matrix 204 that may include eight filter vectors, with each filter vector corresponding to one of eight filters (e.g., $K_1$ to $K_8$) and a filter location included in each of the eight filters (e.g., $w_{1,1}$). Each filter vector may include eight filter channel values (e.g., $c_1$ to $c_8$) corresponding to the filter location (e.g., $w_{1,1}$). Each row m of filter matrix 204 may correspond to a different filter (e.g., one of $K_1$ to $K_8$), and each column k of filter matrix 204 may correspond to a different filter channel (e.g., $c_1$ to $c_8$) associated with a filter location included in each filter (e.g., $w_{1,1}$).

Likewise, as further shown in FIG. 4, multiplicand registers 224 may be loaded with one of activation matrices 208 (e.g., activation matrix 208-1, activation matrix 208-2, etc.). Each of activation matrices 208 may include a total of eight activation vectors, with each activation vector corresponding to one of eight locations (e.g., $x_{1,1}$ to $x_{1,8}$) within activation volume 404. Each activation vector may include eight activation channel values (e.g., $c_1$ to $c_8$) corresponding to the location within activation volume 404. As shown, each row k of activation matrix 208-1 may correspond to a different activation channel (e.g., $c_1$ to $c_8$) and each column n may correspond to a different location within activation volume 404 (e.g., $x_{1,1}$ to $x_{1,8}$).

Thus, MMU 144 may use filter matrix 204 as a multiplier matrix and activation matrix 206 as a multiplicand matrix. Each row of the filter matrix 204 may include a filter vector, and each column of activation matrix 208-1 may include an activation vector.

In some examples, hardware accelerator 140 and/or one or more components of hardware accelerator 140 may operate in accordance with a clock or clock cycles. During each cycle, directing module 106 may direct MMU 144 to select and/or access a set of registers included in multiplicand registers 224 that may include and/or represent a column of a multiplicand matrix (e.g., an activation vector included in an activation matrix). During the cycle, directing module 106 may further direct MMU 144 to determine (e.g., calculate), for each row of values included in a multiplier matrix (e.g., for each filter vector included in filter matrix 204), a dot product of the column of activation matrix 208-1 and each row of values included in filter matrix 204. This may be referred to as "broadcasting" an activation vector (e.g., a pixel value associated with a location $x_{i,j}$ and having up to k channels) of an activation matrix to each of the filter vectors (e.g., weight values associated with a location in each of a set of filters) in filter matrix 204. This may be visualized as a convolution operation whereby a 1×1×k portion of an activation volume (e.g., activation volume 154, activation volume 404, etc.) is convolved with a 1×1×k portion of each filter included in a set of m filters.

Figure 6:
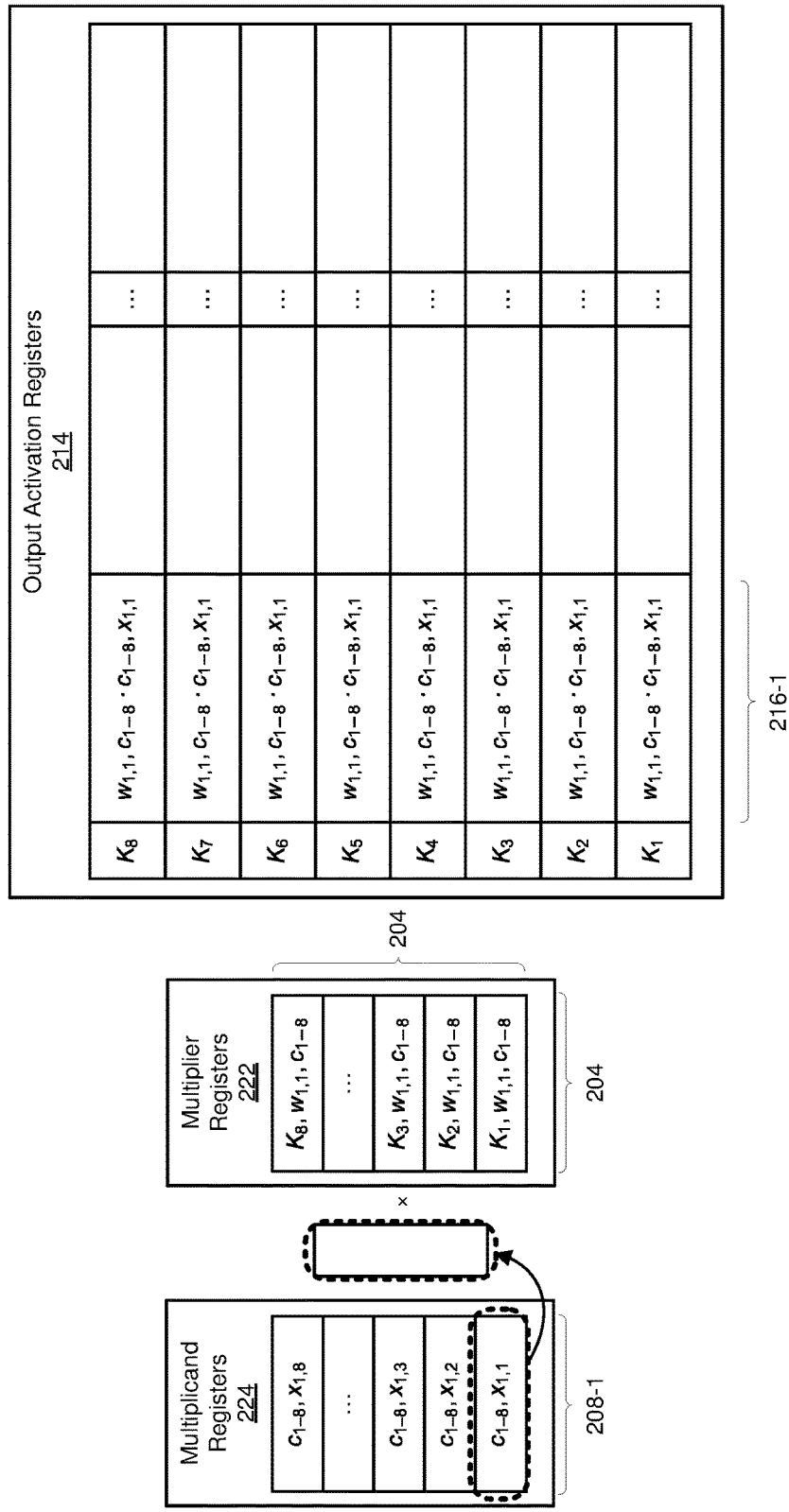
FIGS. 6-13 illustrate determining, via an MMU included in a hardware accelerator, a set of output activation values for a convolutional layer of an artificial neural network using a set of filter matrices and an activation volume as described herein.

FIG. 6 shows a view 600 of a completed first cycle of an MMO executed by an MMU 144. In this example, MMU 144 may include an 8×8×8 matrix multiplication block. As shown, maintaining module 104 may have retrieved filter matrix 204 and one of activation matrices 208 (e.g., activation matrix 208-1) into multiplier registers 222 and multiplicand registers 224, respectively.

As noted above, in some examples, one or more of modules 102 (e.g., maintaining module 104, directing module 106, and/or loading module 108) may select activation matrix 208-1 based on a predetermined stride length associated with a convolutional layer of an ANN. In the examples illustrated herein, the stride length may be 1. This is by way of example only, and the systems and methods described herein may use or employ any suitable horizontal and/or vertical stride length.

As shown in FIG. 6, directing module 106 may select and/or access an activation vector included in activation vectors 208: ($c_{1-8}$, $x_{1,1}$). The selected and/or accessed activation vector may be included as a column of an activation matrix such as activation matrix 208-1. The selected and/or accessed activation vector may further have eight channel values $c_1$ to $c_8$ associated with a location $x_{1,1}$. Directing module 106 may cause (e.g., direct) MMU 144, as part of an MMO, to "broadcast" these pixel values to each of eight filter vectors included in filter matrix 204 (e.g., $K_1$, $w_{1,1}$, $c_{1-8}$ to $K_8$, $w_{1,1}$, $c_{1-8}$). This may include determining, for each filter vector included in filter matrix 204, a dot product of the activation vector and the filter vector. For example, directing module 106 may direct MMU 144 to determine, as part of the MMO, a dot product including $K_1$, $w_{1,1}$, $c_{1-8} \cdot c_{1-8}$, $x_{1,1}$. Directing module 106 may further direct one or more components of hardware accelerator 140 (e.g., LMD 142, MMU 144, etc.) to store the result of the dot product operation as part of a primary result matrix (e.g., a primary result matrix 216-1) within output activation registers 214.

At a conclusion of the first cycle illustrated in FIG. 6, directing module 106 may have directed and/or caused MMU 144 (and/or any other component of hardware accelerator 140) to determine, and store as part of primary result matrix 216-1 within output activation registers 214, a total of eight dot products involving activation vector $c_{1-8}$, $x_{1,1}$ and each of the filter vectors included in filter matrix 204 (e.g., each of $K_1$, $w_{1,1}$, $c_{1-8}$ to $K_8$, $w_{1,1}$, $c_{1-8}$). These dot products may be indicated by the first column of primary result matrix 216-1 in FIG. 6.

Figure 7:
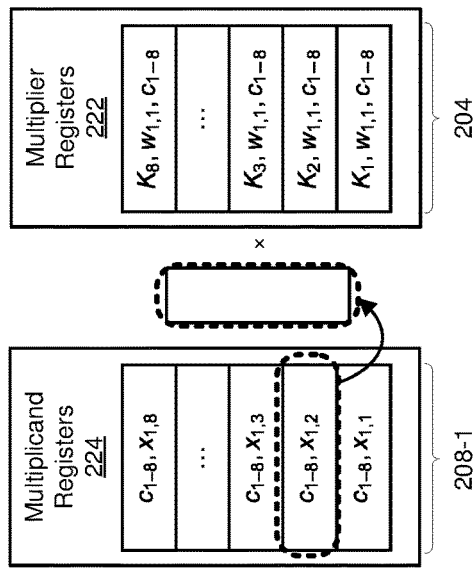

FIG. 7 shows a view 700 of a completed second cycle of an MMO executed by MMU 144. As shown, directing module 106 may have selected and/or accessed an additional activation vector included in activation matrix 208-1 (e.g., $c_{1-8}$, $x_{1,2}$), and may have caused MMU 144, as part of the continued MMO, to broadcast these pixel values to each of the eight filters included in filter matrix 204 (e.g., $K_1$, $w_{1,1}$, $c_{1-8}$ to $K_8$, $w_{1,1}$, $c_{1-8}$). This may have included determining, for each filter vector included in filter vector 204, a dot product of the activation vector and the filter vector. For example, directing module 106 may have directed MMU 144 to determine, as part of the MMO, a dot product including $K_1$, $w_{1,1}$, $c_{1-8} \cdot c_{1-8}$, $x_{1,2}$. Directing module 106 may further cause (e.g., direct) hardware accelerator 140 and/or MMU 144 to store the result of the dot product operation as part of primary result matrix 216-1 within output activation registers 214.

As further shown in FIG. 7, during the second cycle, directing module 106 may further direct MMU 144 to determine, as part of the continued MMO, dot products of the additional activation vectors and the filter vectors included in filter matrix 204. Directing module 106 may further, during the second cycle, cause (e.g., direct) hardware accelerator 140 (e.g., LMD 142, MMU 144, etc.) to store the results of the dot product operations as part of primary result matrix 216-1 within output activation registers 214. Overall, at a conclusion of the second cycle illustrated in FIG. 7, directing module 106 may have caused (e.g., directed) MMU 144 and/or hardware accelerator 140 to determine, and store as part of primary result matrix 216 within output activation registers 214, a total of eight dot products involving activation vector $c_{1-8}$, $x_{1,2}$ and each of the filter vectors included in filter matrix 204 (e.g., each of $K_1$, $w_{1,1}$, $c_{1-8}$ to $K_8$, $w_{1,1}$, $c_{1-8}$). These eight dot products may be indicated by the second column of primary result matrix 216-1 in FIG. 7.

MMU 144 may continue the MMO in this fashion until MMU 144 has broadcast all activation vectors included in activation matrix 208-1 to all the filter vectors included in filter matrix 204. This may result in a result matrix (e.g., primary result matrix 216-1) having m rows, each row corresponding to a convolution of a 1×1×k portion of each of m filters with each of n 1×1×k locations included in an activation volume, where k represents a channel depth of the filters and activation volume.

Figure 8:
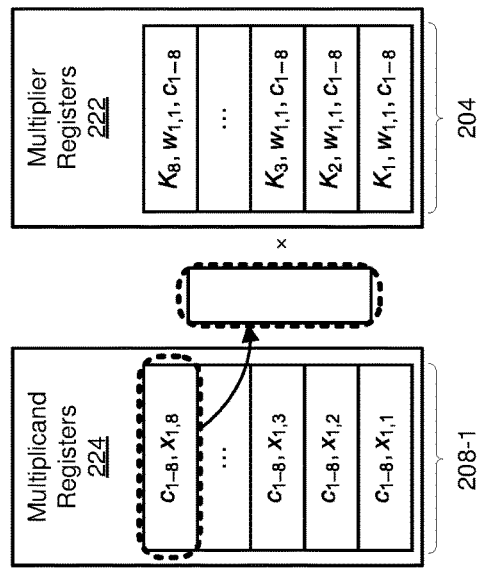

FIG. 8 shows a view 800 of a completed eighth cycle of an MMO executed by an MMU 144. As shown, directing module 106 may direct MMU 144 and/or hardware accelerator 140 to continue the MMO to an eighth cycle, selecting new activation vectors from activation matrix 208-1 until all activation vectors (e.g., $c_{1-8}$, $x_{1,1}$ to $c_{1-8}$, $x_{1,8}$) have been broadcast to all filter vectors included in filter matrix 204 (e.g., $K_1$, $w_{1,1}$, $c_{1-8}$ to $K_8$, $w_{1,1}$, $c_{1-8}$). This may result in primary result matrix 216-1 including eight rows, each row corresponding to a convolution of a 1×1×k portion of each of eight filters (e.g., $K_1$ to $K_8$) with each of 8 1×1×k locations included in an activation volume (e.g., $c_{1-8}$, $x_{1,1}$ to $c_{1-8}$, $x_{1,8}$), where k represents a common channel depth of the eight filters and the activation volume (e.g., C=8).

Figure 9:
Figure 10:
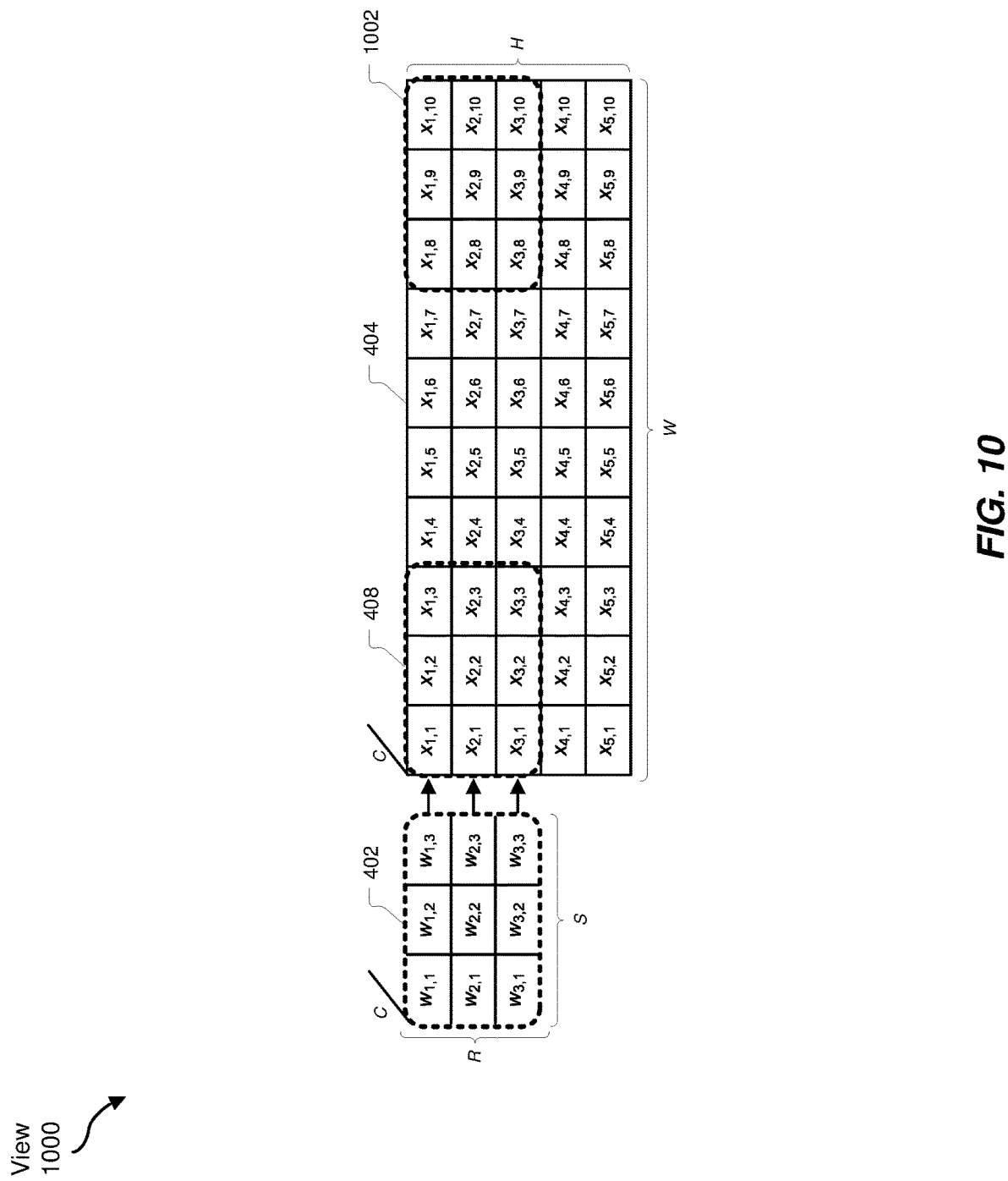

Upon a conclusion of the eighth cycle, output activation registers 214 may include a set of values (e.g., primary result matrix 216-1) that may correspond to a portion of a set of output values for a set of convolution operations. FIG. 9 shows a view 900 that includes output table 406 with row 410 of constituent or partial values of each of values $O_{1,1}$ through $O_{1,8}$. When compared with primary result matrix 216-1 in FIG. 8, it may be apparent that primary result matrix 216-1 may include values corresponding to row 410 for each filter in $K_1$ to $K_8$, up to a channel depth of C=8. In examples where the filters and activation volume may include more than k channels, one or more additional loops and/or executions of MMOs as described herein may be added to determine and accumulate additional output values associated with the additional channels.

As further shown in FIG. 9, partial row 902, a part of a second row of constituent values of each of values $O_{1,1}$ through $O_{1,7}$, includes several values that share common factors (e.g., $x_{1,2}$ to $x_{1,8}$) with entries in row 410. Indeed, apart from entry 904, corresponding to an activation vector associated with location $x_{1,9}$ in activation volume 404, each activation vector included in partial row 902 (e.g., $x_{1,2}$ to $x_{1,8}$) is repeated from row 410. Likewise, partial row 906, apart from entry 908, includes all activation values included in partial row 902 and entry 904. Collectively, these three rows of values may form a first partial product for output values $O_{1,1}$ to $O_{1,8}$, the first partial product corresponding to a first row of filter 402 (e.g., $w_{1,1}$, $w_{1,2}$, and $w_{1,3}$). As will be described in greater detail below, hardware accelerator 140 may reuse the repeated activation vectors that are already loaded into LMD 142 in subsequent MMOs during a convolution operation. This reuse may result in significant power savings over conventional systems and methods that may access and/or retrieve more activation values more often from slower and/or more power-inefficient memory and/or data storage devices while performing convolution operations.

Returning to FIG. 3, at step 330, one or more of the systems described herein may load an additional filter matrix corresponding to a secondary filter location into the filter cache. For example, loading module 108 may, as part of computing device 202 in FIG. 2, load additional filter matrix 212 corresponding to a secondary filter location into filter cache 206.

During a convolution operation, some portions of a filter may pass over the same locations within an activation volume as other portions of the filter. To illustrate, FIG. 10 includes a view 1000 of filter 402, activation volume 404, and location 408 from FIG. 4. As shown, when filter 402 is at location 408 (e.g., at the start of a convolution operation), weight value $w_{1,1}$ is positioned over activation volume location $x_{1,1}$ and weight value $w_{1,2}$ is positioned over activation volume location $x_{1,2}$. Likewise, when filter 402 is at location 1002, weight value $w_{1,1}$ is positioned over activation volume location $x_{1,8}$ and weight value $w_{1,2}$ is positioned over activation volume location $x_{1,9}$.

During a convolution operation, filter 402 may be conceptually moved across activation volume 404 one location at a time (e.g., in accordance with a stride of 1). Weight value $w_{1,1}$ may pass over locations $x_{1,1}$ to $x_{1,8}$, and weight value $w_{1,2}$ may pass over locations $x_{1,2}$ to $x_{1,9}$. In this example, the two weight values may share seven of the same activation locations within activation volume 404 (e.g., $x_{1,2}$ to $x_{1,8}$) during a convolution operation. As will be described in greater detail below, the systems and methods described herein may reuse these shared values in multiple convolution operations involving multiple filters to conserve power that may otherwise be used to access and/or transfer activation values from power-inefficient storage and/or memory devices.

However, some portions of a filter may pass over different locations within an activation volume during a convolution operation. For example, weight value $w_{1,1}$ and weight value $w_{1,2}$ may pass over eight the same activation locations during a convolution operation involving a top row of activation volume 404. However, weight value $w_{1,1}$ may never pass over or intersect with activation location $x_{1,9}$, and weight value $w_{1,2}$ may never pass over or intersect with activation location $x_{1,1}$.

Hence, in order to continue with the convolution operation, and to maximize reuse of filter and/or activation values, one or more of modules 102 (e.g., loading module 108, execution module 110, etc.) may cause computing device 202 to load an additional filter matrix (e.g., additional filter matrix 212) into filter cache 206 and/or multiplier registers 222. In some examples, one or more of modules 102 (e.g., loading module 108, execution module 110, etc.) may also load an additional activation vector (e.g., an activation vector that may correspond to activation location $x_{1,9}$) included activation volume 154 into activation cache 210 and/or multiplicand registers 224. This may be accomplished through a simple, efficient line read operation, and may not require complex muxing mechanisms of conventional solutions.

As will be described in greater detail below, one or more of modules 102 (e.g., directing module 106) may then cause MMU 144 to execute an additional MMO using additional filter matrix 212 (e.g., corresponding to weight values $w_{1,2}$) and activation matrix 208-1, reusing the activation vectors corresponding to activation locations shared by the two filter locations. This may result in a power-efficient production of further partial output values corresponding to partial row 902 and entry 904 and/or partial row 906 and entry 908.

Additional filter matrix 212 may include any filter matrix that may correspond to a different location within filters $K_1$ to $K_m$ than filter matrix 204. In some examples, additional filter matrix 212 may correspond to a location within filters $K_1$ to $K_m$ that adjoins a location within filters $K_1$ to $K_m$ corresponding to filter matrix 204. For example, when filter matrix 204 corresponds to a location $w_{1,1}$ within filters $K_1$ to $K_m$, additional filter matrix 212 may correspond to a location $w_{1,2}$ within filters $K_1$ to $K_m$.

Loading module 108 may cause computing device 202 to load additional filter matrix 212 corresponding to a secondary filter location into filter cache 206 in a variety of contexts. For example, loading module 108 may access filter matrices 152 in data store 150 and may identify additional filter matrix 212. Likewise, loading module 108 may access activation volume 154 in data store 150 and may identify additional activation vectors that may be included in a row of activation volume 154. Loading module 108 may then cause computing device 202 to transfer, via a suitable data path (e.g., a data bus that may communicatively couple LMD 142 and data store 150), additional filter matrix 212 into filter cache 206 and/or multiplier registers 222 and one or more additional activation vectors into activation cache 210 and/or multiplicand registers 224. In some examples, additional filter matrix 212 may replace filter matrix 204 within filter cache 206 and/or multiplier registers 222. In additional or alternative examples, filter cache 206 may be sized to maintain (e.g., simultaneously maintain) both filter matrix 204 and additional filter matrix 212.

As mentioned above, loading of additional activation vectors into activation cache 210 and/or multiplicand registers 224 may be accomplished via a simple line read of additional activation vectors from activation volume 154, which may be far more power-efficient than complex memory management and/or muxing schemes employed by conventional convolution solutions. In some examples, one or more of modules 102 (e.g., maintaining module 104, directing module 106, loading module 108, executing module 110, etc.) may arrange, within data store 150, values included in activation volume 154 such that loading module 106 may access and/or transfer additional activation vectors via a line read of a portion of data store 150.

Returning to FIG. 3, at step 340, one or more of the systems described herein may direct an MMU to execute a plurality of additional MMOs, each additional MMO using one filter matrix included in the filter cache and one activation matrix included in the activation cache, such that the MMU reuses the filter matrix for at least one additional MMO and uses the additional filter matrix for a different additional MMO. For example, executing module 110 may, as part of computing device 202, cause computing device 202 to direct MMU 144 to execute a plurality of additional MMOs, each additional MMO using one filter matrix included in the filter cache (e.g., filter matrix 204, additional filter matrix 212, etc.) and one activation matrix included in the activation cache (e.g., one of activation matrix 208-1, activation matrix 208-2, etc.), such that the MMU reuses filter matrix 204 for at least one additional MMO and additional filter matrix 212 for a different additional MMO.

Executing module 110 may cause computing device 202 to direct MMU 144 to execute a plurality of additional MMOs in a variety of contexts. For example, executing module 110 may direct the MMU to execute the plurality of MMOs by, for each additional MMO in the plurality of additional MMOs, (1) designating a set of activation vectors loaded into activation cache 210 and associated with a row of activation volume 154 as an intermediate activation matrix, (2) producing a secondary result matrix by directing MMU 144 to execute an additional MMO using the intermediate activation matrix as a multiplicand matrix and a selected filter matrix loaded into the filter cache as a multiplier matrix, and (3) accumulating the secondary result matrix with at least one primary result matrix included in the set of output activation registers.

Figure 11:
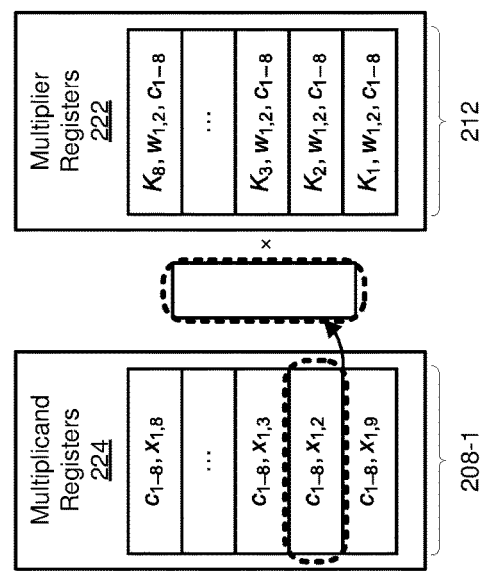

By way of illustration, FIG. 11 shows a view 1100 of a ninth cycle associated with hardware accelerator 140, MMU 144, and/or computing device 202 continuing from the eighth cycle illustrated by FIG. 8. As shown, loading module 108 has replaced filter matrix 204 within multiplier registers 222 with additional filter matrix 212. Loading module 108 has also replaced activation vector $c_{1,8}$, $x_{1,1}$ with activation vector $c_{1,8}$, $x_{1,9}$. Hence, as shown in FIG. 11, during the ninth cycle, directing module 106 has broadcast the indicated activation vector $c_{1-8}$, $x_{1,2}$ to each of filter vectors $K_{1-8}$, $w_{1,2}$, $c_{1-8}$ included in filters $K_1$ to $K_8$. At a conclusion of the ninth cycle, MMU 144 may have generated dot product values corresponding to activation vector $c_{1-8}$, $x_{1,2}$ and each of the filter vectors included in additional filter matrix 212. These values may correspond to at least a portion of secondary result matrix 218-1.

Furthermore, as shown in FIG. 11, executing module 110 may further accumulate values included in corresponding locations in secondary result matrix 218-1 and primary result matrix 216-1 to form output activation values 220-1. In some examples, an "output activation" or "output activation value" may include at least part of an output value for a particular location in an activation volume (e.g., activation volume 154, activation volume 404, etc.) that has been convolved with a filter (e.g., filter 402). For example, returning to output table 406 in FIG. 9, output value $O_{1,1}$ may be a sum of an element-wise multiplication of weight values included in filter 402 and activation vectors corresponding to location 408 when the filter is at location 408 (e.g., $w_{1,1} \times x_{1,1} + w_{1,2} \times x_{1,2} + w_{1,3} \times x_{1,3} + w_{2,1} \times x_{2,1} + w_{2,2} \times x_{2,2} + w_{2,3} \times x_{2,3} + w_{3,1} \times x_{3,1} + w_{3,2} \times x_{3,2} + w_{3,3} \times x_{3,3}$). Furthermore, as described above, the systems and methods described herein may determine values for at least row 410, partial row 902, and entry 904. The systems and methods described herein may include these values as part of a primary result matrix included in primary result matrices 216 (e.g., primary result matrix 216-1, primary result matrix 216-2, etc.) and a secondary result matrix included in secondary result matrices 218 (e.g., secondary result matrix 218-1, secondary result matrix 218-2, etc.).

Executing module 110 may determine output activation values 220 based on a result of accumulating each secondary result matrix included in secondary result matrices 218 with a corresponding primary result matrix included in primary result matrices 216. For example, executing module 110 may determine an output activation value 220-1 by accumulating secondary result matrix 218-1 with primary result matrix 216-1, output activation value 230-2 by accumulating secondary result matrix 218-1 with primary result matrix 216-2, and so forth. As noted above, each primary result matrix included in primary result matrices 216 and each secondary result matrix included in secondary result matrices 218 may each include partial products for output activations corresponding to a set of filters. Additionally, where a matrix A and a matrix B may have the same dimensions, a sum of matrix A and matrix B may be denoted by A+B, and may be determined by adding corresponding elements of A and B. Hence, corresponding elements in a primary result matrix 216 (e.g., primary result matrix 216-1, primary result matrix 216-2, etc.) and a secondary result matrix 218 (e.g., secondary result matrix 218-1, secondary result matrix 218-2, etc.) may be added together to at least partially determine a corresponding output activation value included in output activation values 220 (e.g., output activation value 220-1, output activation value 220-2, etc.).

In some examples, executing module 110 may store each secondary result matrix 218 within a set of registers included in LMD 142 that may be distinct from output activation registers 214. Once executing module 110 has produced a secondary result matrix 218 (e.g., secondary result matrix 218-1, secondary result matrix 218-2, etc.), directing module 106 may then accumulate (e.g., add) the secondary result matrix and a corresponding primary result matrix 216 (e.g., primary result matrix 216-1, primary result matrix 216-2, etc.) and store a result of accumulating the secondary result matrix and the primary result matrix within a corresponding set of output activation registers 214 (e.g., output activation registers 214-1, output activation registers 214-2, etc.).

Figure 12:
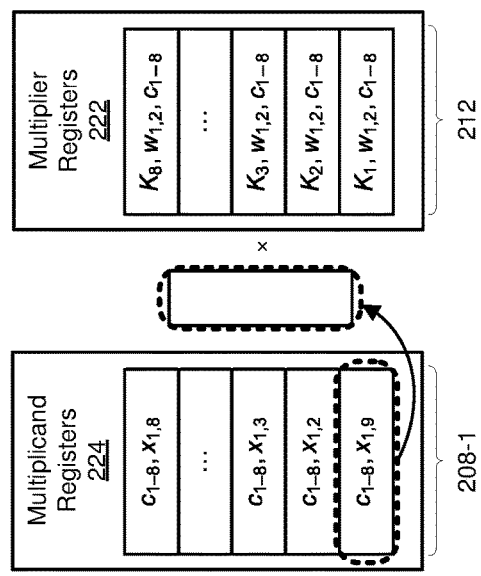

In some embodiments, executing module 110 may accumulate secondary result matrix 218-1 and primary result matrix 216-1 in-place within output activation registers 214-1. For example, as shown in FIGS. 11 and 12, as MMU 144 executes the MMO using additional filter matrix 212 as a multiplier matrix and activation matrix 208-1 as a multiplicand matrix, directing module 106 may accumulate values of secondary result matrix 218-1 with values stored in output activation registers 214 that correspond to respective values included in primary result matrix 216-1. This may conserve limited memory resources within output activation registers 214 while also efficiently and accurately accumulating partial products to at least partially determine output activation values (e.g., output activation values 220) corresponding to the filters and the activation volume.

By way of illustration, FIG. 11 includes a view 1100 that shows output activation registers 214 after directing module 106 has caused MMU 144 to broadcast activation vector ($c_{1-8}$, $x_{1,2}$) to each filter vector included in additional filter matrix 212. As shown, executing module 110 may accumulate these dot product values with respective dot product values in primary result matrix 216-1. Such an accumulation may be indicated in FIGS. 11-12 by a "+=" symbol. A "+=" symbol may be included in each cell (e.g., register or set of registers) of output activation registers 214 that includes a dot product value included in a secondary result matrix (e.g., secondary result matrix 218-1, secondary result matrix 218-2, etc.) that has been or may be accumulated with a corresponding dot product value included in a corresponding primary result matrix (e.g., primary result matrix 216-1, primary result matrix 216-2, etc.) to form a corresponding output activation value (e.g., output activation value 220-1, output activation value 220-2, etc.) in output activation registers 214.

For example, as shown in FIG. 8, at a conclusion of the MMO (e.g., the MMO involving filter matrix 204 and activation matrix 208-1), a set of registers included in output activation registers 214 may include a value corresponding to an eighth column and eighth row in primary result matrix 216-1. This value may correspond to ($K_1$, $w_{1,1}$, $c_{1-8} \cdot c_{1-8}$, $x_{1,8}$). At the conclusion of the additional MMO (e.g., an MMO involving additional filter matrix 212 and activation matrix 208-1), as shown in FIG. 12, that set of registers may include a value that corresponds to a value of ($K_1$, $w_{1,1}$, $c_{1-8} \cdot c_{1-8}$, $x_{1,8}$)+($K_1$, $w_{1,2}$, $c_{1-8} \cdot C_{1-8}$, $x_{1,9}$).

Hence, executing module 110 may accumulate each value included in secondary result matrices 218 with a corresponding value in primary result matrices 216 in-place within output activation registers 214, and may store a result within output activation registers 214. Thus, at a conclusion of the MMO based on additional filter matrix 212 and activation matrix 208-1, output activation registers 214 may include output activation values 220-1.

During cycles subsequent to the ninth cycle illustrated by FIG. 11, executing module 110 may cause MMU 144 to further broadcast at least one of the remaining activation vectors included in activation matrix 208-1 to each of the filter vectors included in additional filter matrix 212. Thus, after seven cycles of the additional MMO, MMU 144 may have broadcast all the activation vectors included in activation matrix 208-1 to all the filter vectors included in additional filter matrix 212.

To illustrate, FIG. 12 includes a view 1200 that illustrates a sixteenth cycle associated with hardware accelerator 140, MMU 144, and/or computing device 202. As shown, executing module 110 may have caused MMU 144 to broadcast (e.g., during one or more of a tenth cycle through a fifteenth cycle) each activation vector included in activation matrix 208-1 to each filter vector included in additional filter matrix 212, thereby producing seven columns of output activation values 220-1 (e.g., by accumulating values included in secondary result matrix 218-1 with corresponding values in primary result matrix 216-1).

Figure 13:
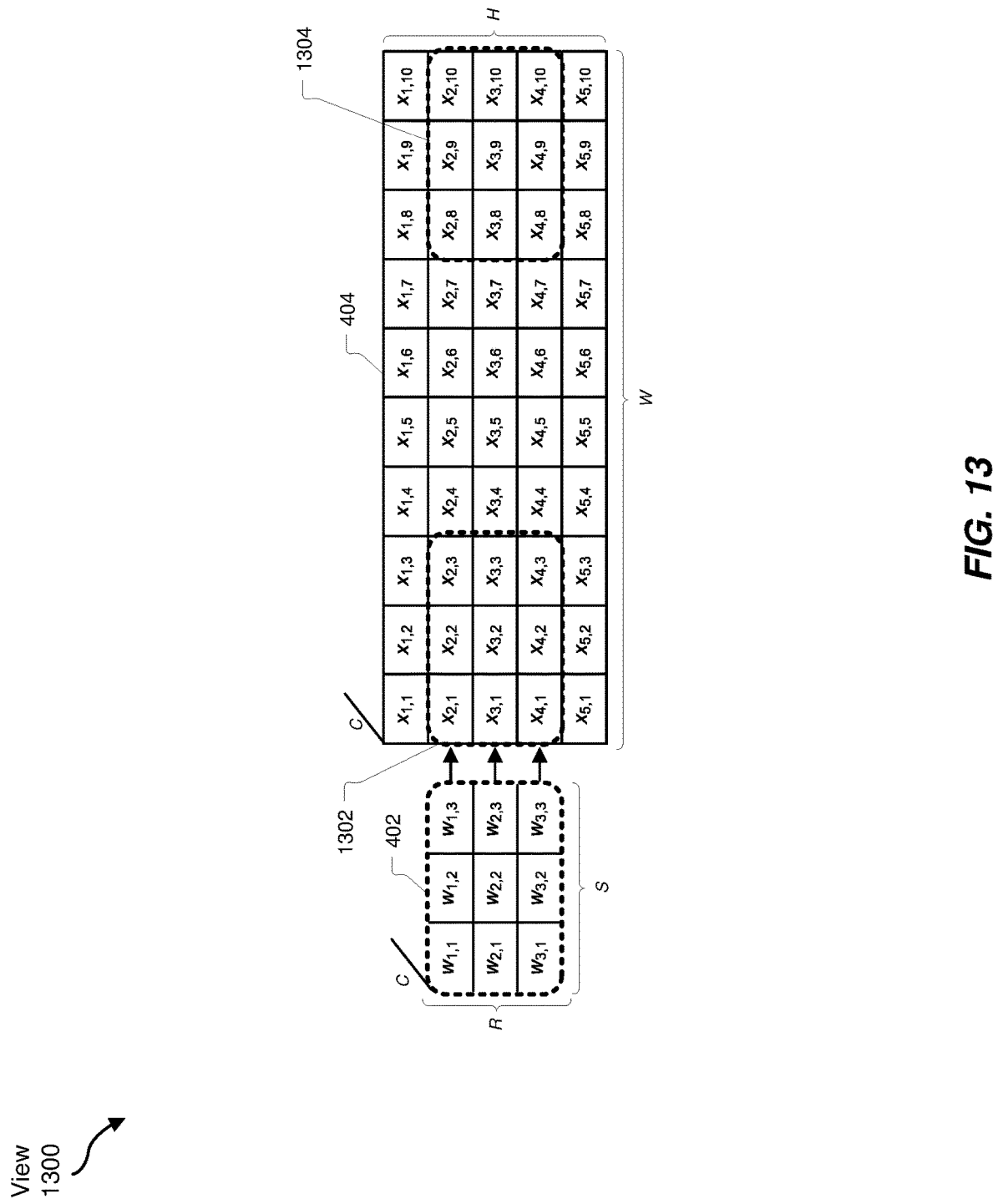

The foregoing examples have focused on convolving a filter matrix with an activation matrix corresponding to at least part of a single row of an activation volume (e.g., activation values $x_{1,1}$ to $x_{1,W}$). However, it may be apparent that these principles may be expanded to also provide reuse of activation values and/or filter weight values across multiple rows of the activation volume. For example, FIG. 13 shows a view 1300 of filter 402 being convolved with a second row of activation volume 404, moving from location 1302 to location 1304. Many values used in convolving filter 402 across the first row of activation volume 404 may also be used in convolving filter 402 across the second row of activation volume 404. FIGS. 14-47 illustrate a sequence of operations that the systems and methods described herein may execute in order to perform a convolution of a filter across multiple rows of an activation volume while maximizing reuse of values stored in high-speed, power-efficient cache memory (e.g., filter cache 206 and/or activation cache 210) local to MMU 144 (e.g., onboard LMD 142) and minimizing retrieval and/or loading of values (e.g., filter values and/or activation values) from slower and/or less power-efficient data storage devices (e.g., memory 120, data store 150, etc.).

Figure 14:
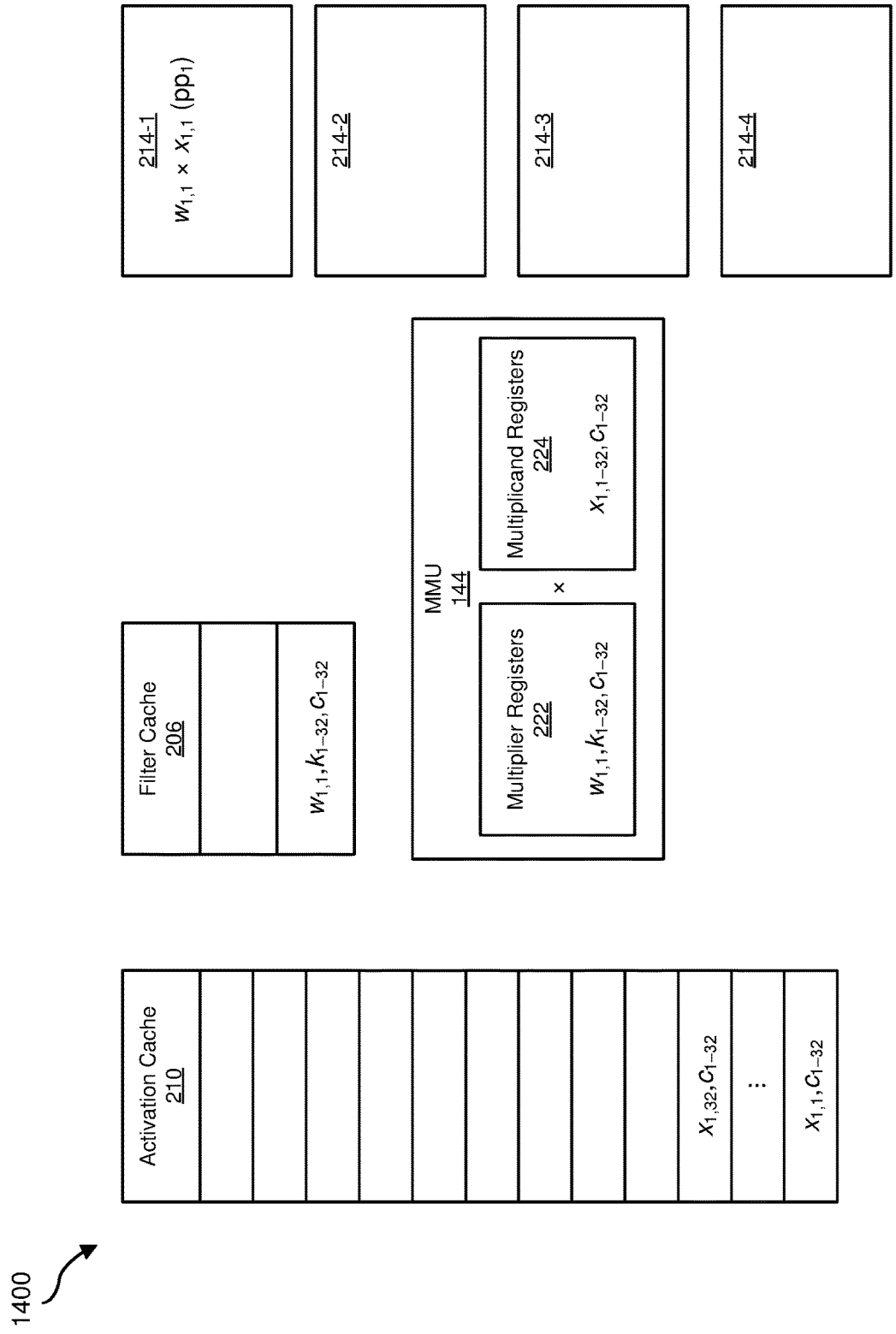
FIGS. 14-47 illustrate a sequence of operations for determining, via an MMU included in a hardware accelerator, a set of output activation values for a convolutional layer of an artificial neural network using a set of filter matrices and an activation volume as described herein.

Each of FIGS. 14-47 may include views of components and/or elements that may be included in a hardware accelerator (e.g., hardware accelerator 140). Taking FIG. 14 as an example, FIG. 14 shows a view 1400 of a hardware accelerator (e.g., hardware accelerator 140). As shown, view 1400 includes MMU 144 that may include a set of multiplier registers 222 and a set of multiplicand registers 224. View 1400 also includes views of components that may be included in LMD 142, such as filter cache 206, activation cache 210, and four sets of output activation registers 214 (e.g., output activation registers 214-1, output activation registers 214-2, output activation registers 214-3, and output activation registers 214-4). As noted above, filter cache 206 may be sized to maintain a plurality of filter matrices and activation cache 210 may be sized to maintain a plurality of activation matrices. As shown in FIGS. 14-47, filter cache 206 may be sized to maintain two filter matrices, each with dimensions of 32×32×32. Likewise, as further shown in FIGS. 14-47, activation cache 210 may be sized to maintain at least four activation matrices, each with dimensions of 32×32×32.

Furthermore, each of output activation registers 214 may be sized to maintain a set of output activation values for an MMO executed by MMU 144. In the examples illustrated by FIGS. 14-47, MMU 144 may be configured to execute MMOs using multiplier matrices with dimensions of 32×32×32 and multiplicand matrices with dimensions of 32×32×32. Hence, multiplier registers 222 and multiplicand registers 224 may each be configured to maintain matrices with dimensions of 32×32×32. Note that the sizes and/or capacities of all elements shown in FIGS. 14-47 are provided by way of example only and are not intended to be limit this disclosure to any particular embodiment of the systems and methods described herein.

As shown in FIG. 14, maintaining module 104 may maintain, within filter cache 206, a filter matrix (e.g., filter matrix 204) corresponding to filter location $w_{1,1}$ (i.e., $w_{1,1}$, $k_{1\text{-}32}$, $c_{1\text{-}32}$). Likewise, maintaining module 104 may maintain, within activation cache 210, an activation matrix corresponding to activation volume locations $x_{1,1}$ to $x_{1,32}$ (i.e., $x_{1,1}$, $c_{1\text{-}32}$ to $x_{1,32}$, $c_{1\text{-}32}$), which may correspond to at least part of a first row of an activation volume.

Directing module 106 may direct MMU 144 to execute an MMO using the filter matrix corresponding to filter location $w_{1,1}$ and the activation matrix corresponding to activation volume locations $x_{1,1\text{-}32}$. This may result in a first set of partial products of output activation values for the first row of the output volume (e.g., $O_{1,1}$ to $O_{1,32}$) that may correspond to a first row of the set of filters (i.e., $w_{1,1}$ to $w_{1,3}$). This first set of partial products (i.e., primary result matrix) may be stored and/or maintained within output activation registers 214-1 and may be denoted in FIG. 14 as $w_{1,1} \times x_{1,1}$ (pp1).

Figure 15:
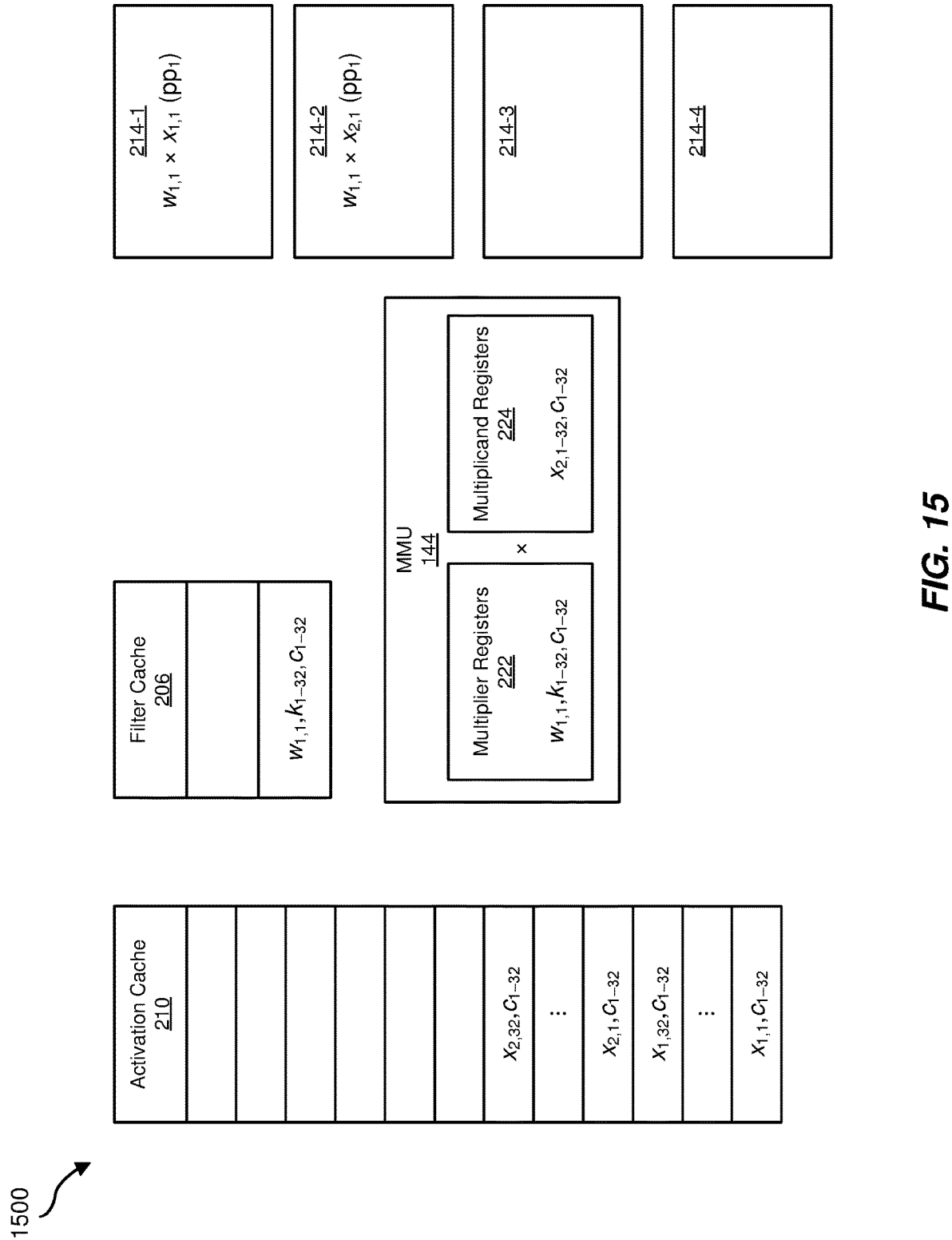

Continuing to FIG. 15, in view 1500, maintaining module 104 may maintain within and/or load into activation cache 210 an activation matrix corresponding to at least part of a second row of activation values in the activation volume: $x_{2,1}$ to $x_{2,32}$ (i.e., $x_{2,1}$, $c_{1\text{-}32}$ to $x_{2,32}$, $c_{1\text{-}32}$). Directing module 106 may direct MMU 144 to execute an MMO using the filter matrix corresponding to filter location $w_{1,1}$ and the activation matrix corresponding to activation volume locations $x_{2,1\text{-}32}$. This may result in a first set of partial products of output activation values for the second row of the output volume (e.g., $O_{2,1}$ to $O_{2,32}$) that may correspond to a first row of the set of filters (i.e., $w_{1,1}$ to $w_{1,3}$). This first set of partial products may be stored and/or maintained within output activation registers 214-2 and may be denoted in FIG. 15 as $w_{1,1} \times x_{2,1}$ (pp1).

Figure 16:
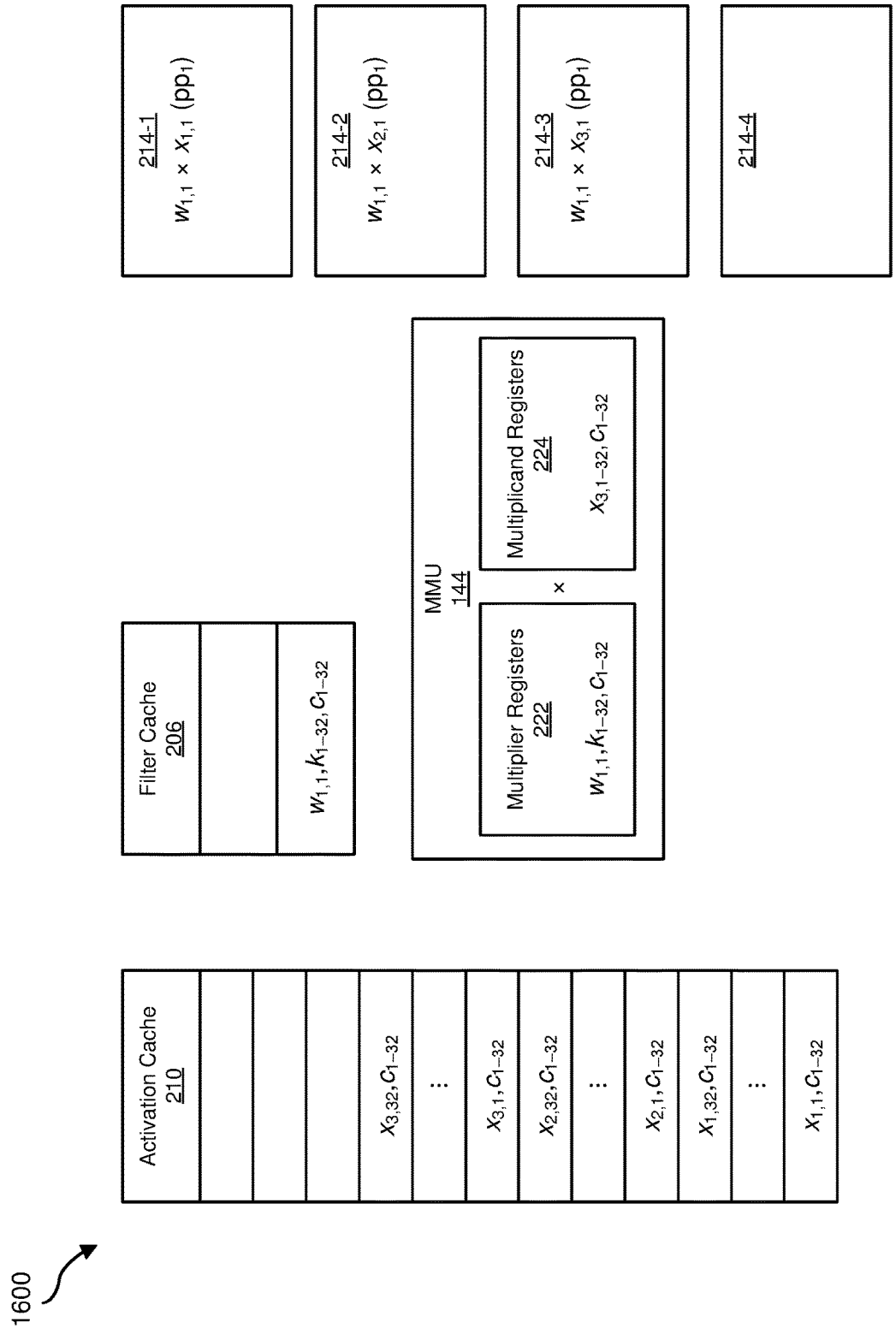

Continuing to FIG. 16, in view 1600, maintaining module 104 may maintain within and/or load into activation cache 210 an activation matrix corresponding to at least part of a third row of activation values in the activation volume: $x_{3,1}$ to $x_{3,32}$ (i.e., $x_{3,1}$, $c_{1\text{-}32}$ to $x_{3,32}$, $c_{1\text{-}32}$). Directing module 106 may direct MMU 144 to execute an MMO using the filter matrix corresponding to filter location $w_{1,1}$ and the activation matrix corresponding to activation volume locations $x_{3,1\text{-}32}$. This may result in a first set of partial products of output activation values for the third row of the output volume (e.g., $O_{3,1}$ to $O_{3,32}$) that may correspond to a first row of the set of filters (i.e., $w_{1,1}$ to $w_{1,3}$). This first set of partial products may be stored and/or maintained within output activation registers 214-3 and may be denoted in FIG. 16 as $w_{1,1} \times x_{3,1}$ (pp1).

Figure 17:
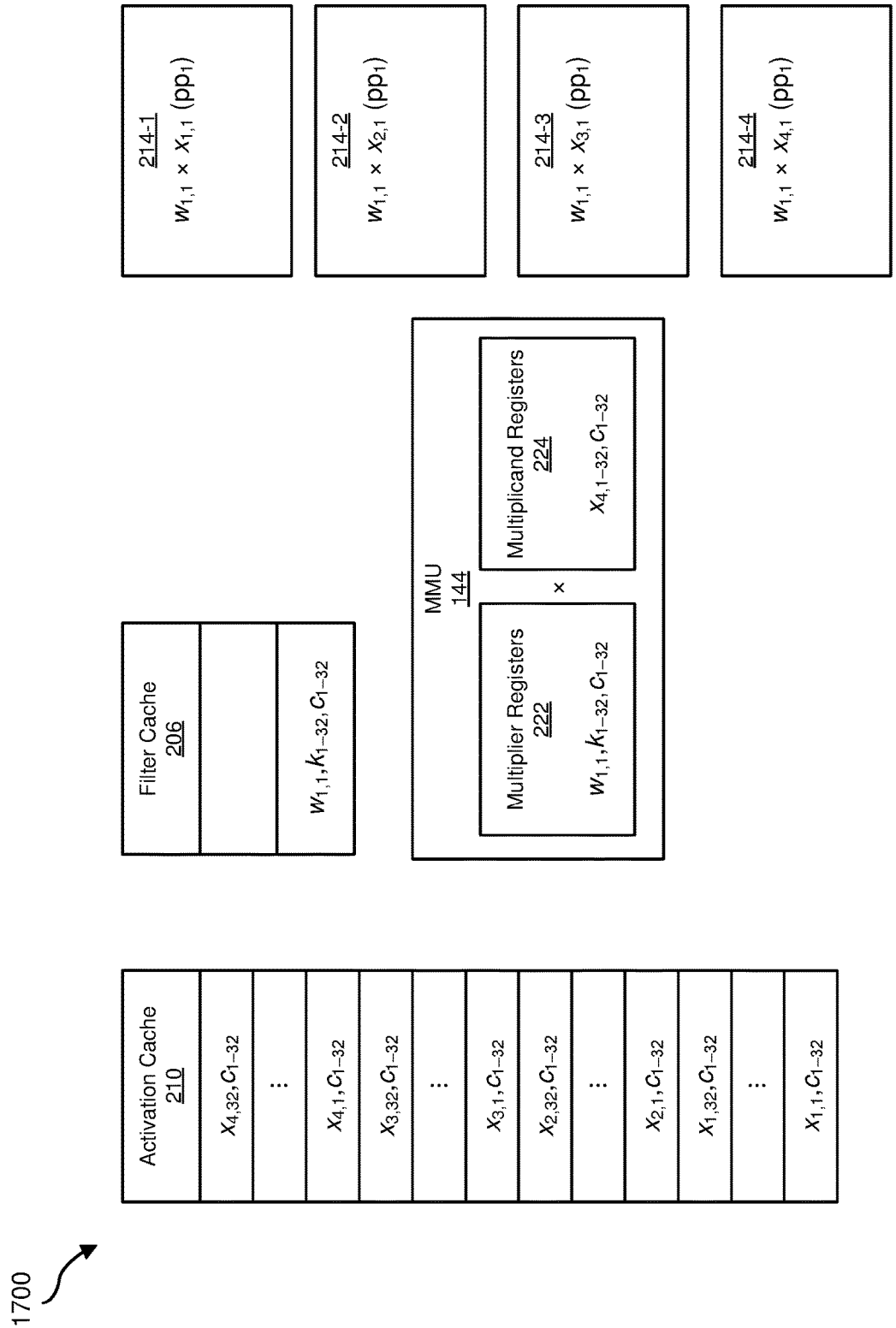

Continuing to FIG. 17, in view 1700, maintaining module 104 may maintain within and/or load into activation cache 210 an activation matrix corresponding to at least part of a fourth row of activation values in the activation volume: $x_{4,1}$ to $x_{4,32}$ (i.e., $x_{4,1}$, $c_{1\text{-}32}$ to $x_{4,32}$, $c_{1\text{-}32}$). Directing module 106 may direct MMU 144 to execute an MMO using the filter matrix corresponding to filter location $w_{1,1}$ and the activation matrix corresponding to activation volume locations $x_{4,1-32}$. This may result in a first set of partial products of output activation values for the fourth row of the output volume (e.g., $O_{4,1}$ to $O_{4,32}$) that may correspond to a first row of the set of filters (i.e., $w_{1,1}$ to $w_{1,3}$). This first set of partial products may be stored and/or maintained within output activation registers 214-4 and may be denoted in FIG. 17 as $w_{1,1} \times x_{4,1}$ (pp1).

Figure 18:
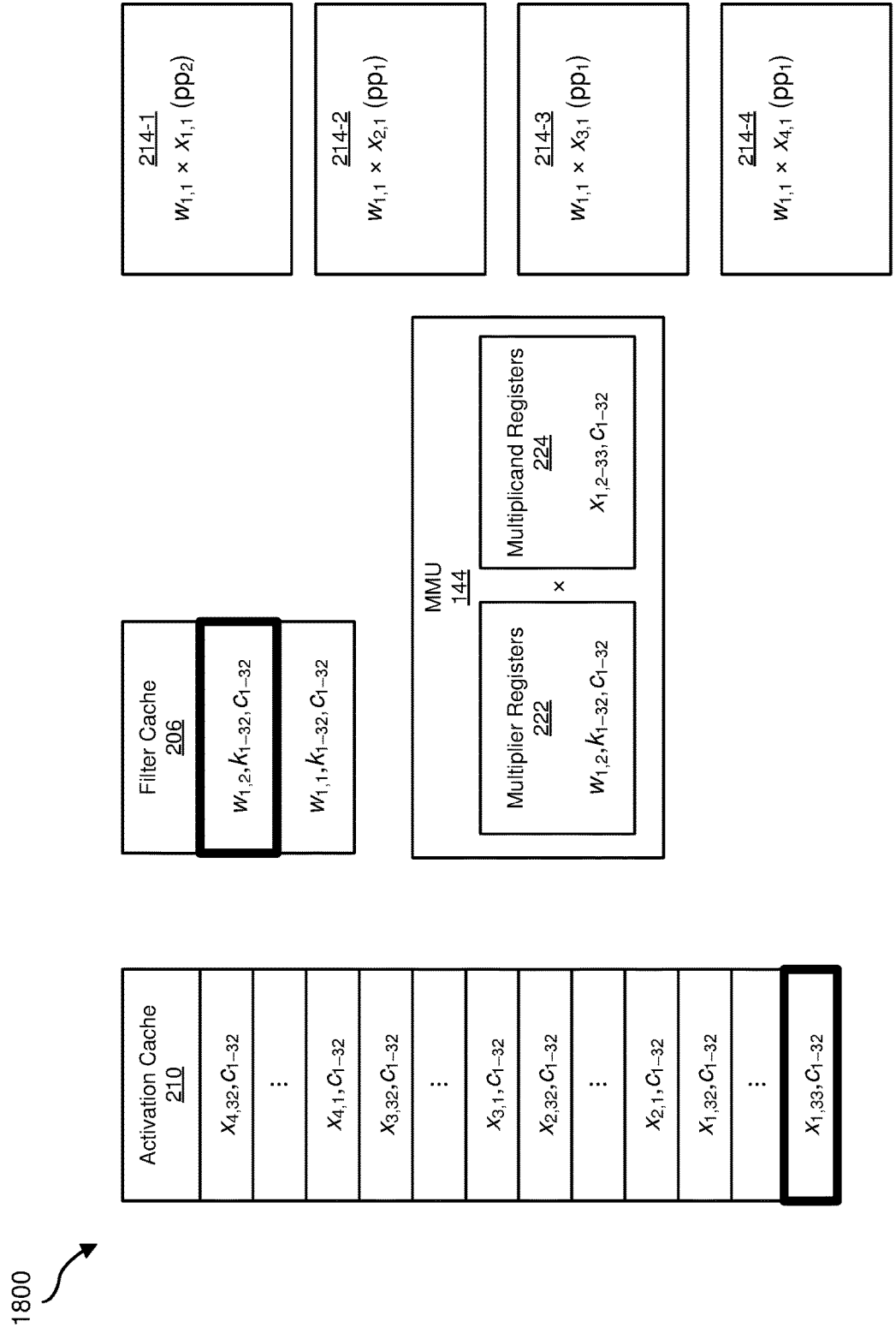

FIG. 18 shows a view 1800 wherein at least one of modules 102 (e.g., loading module 108, executing module 110, etc.) has loaded an additional filter matrix (e.g., additional filter matrix 212) corresponding to filter location $w_{1,2}$ (i.e., $w_{1,1}$, $k_{1-32}$, $c_{1-32}$) into filter cache 206. Likewise, one or more of modules 102 (e.g., loading module 108) may replace an activation vector corresponding to activation volume location $x_{1,1}$ (i.e., $x_{1,1}$, $c_{1-32}$) within activation cache 210 with an activation vector corresponding to activation volume location $x_{1,33}$. This activation vector may be a next value in the first row of the activation volume.

Executing module 110 may direct MMU 144 to execute a plurality of additional MMOs. Each additional MMO may use one filter matrix included in the filter cache and one activation matrix included in the activation cache. As filter cache 206 includes multiple filter matrices and activation cache 210 includes multiple activation matrices and/or activation vectors, the systems and methods described herein may realize a high amount of reuse of activation and/or filter values without having to fetch values from slower or less power efficient memory or storage devices.

In some embodiments, executing module 110 may execute each additional MMO in the plurality of additional MMOs by selecting, from a plurality of activation vectors included in the plurality of activation matrices loaded into the activation cache, a selected set of activation vectors associated with a row of the activation volume. Executing module 110 may further direct MMU 144 to use the selected set of activation vectors associated with the row of the activation volume as a multiplicand matrix in the additional MMO.

In some examples, executing module 110 may direct MMU 144 to execute the plurality of additional MMOs by, for each additional MMO included in the set of MMOs, selecting (1) at least one filter matrix loaded into filter cache 206 as a selected filter matrix, and (2) a set of activation vectors from a plurality of activation vectors loaded into activation cache 210 as a selected activation matrix. In the example shown in FIG. 18, executing module 110 may select the filter matrix corresponding to filter location $w_{1,2}$ as the selected filter matrix and a set of activation vectors including activation locations $x_{1,2-33}$ as the selected activation vector.

Executing module 110 may load the selected filter matrix from filter cache 206 into multiplier registers 222 and the selected activation matrix from activation cache 210 into multiplicand registers 224. Executing module 110 may then direct MMU 144 to execute an additional MMO using the selected filter matrix as a multiplier matrix and the selected activation matrix as a multiplicand matrix. Thus, executing module 110 may determine a second set of partial products of output activation values for the first row of the output volume. This second set of partial products may be accumulated with and/or maintained within output activation registers 214-1 and may be denoted in FIG. 18 as $w_{1,1} \times x_{1,1}$ (pp2).

Figure 19:
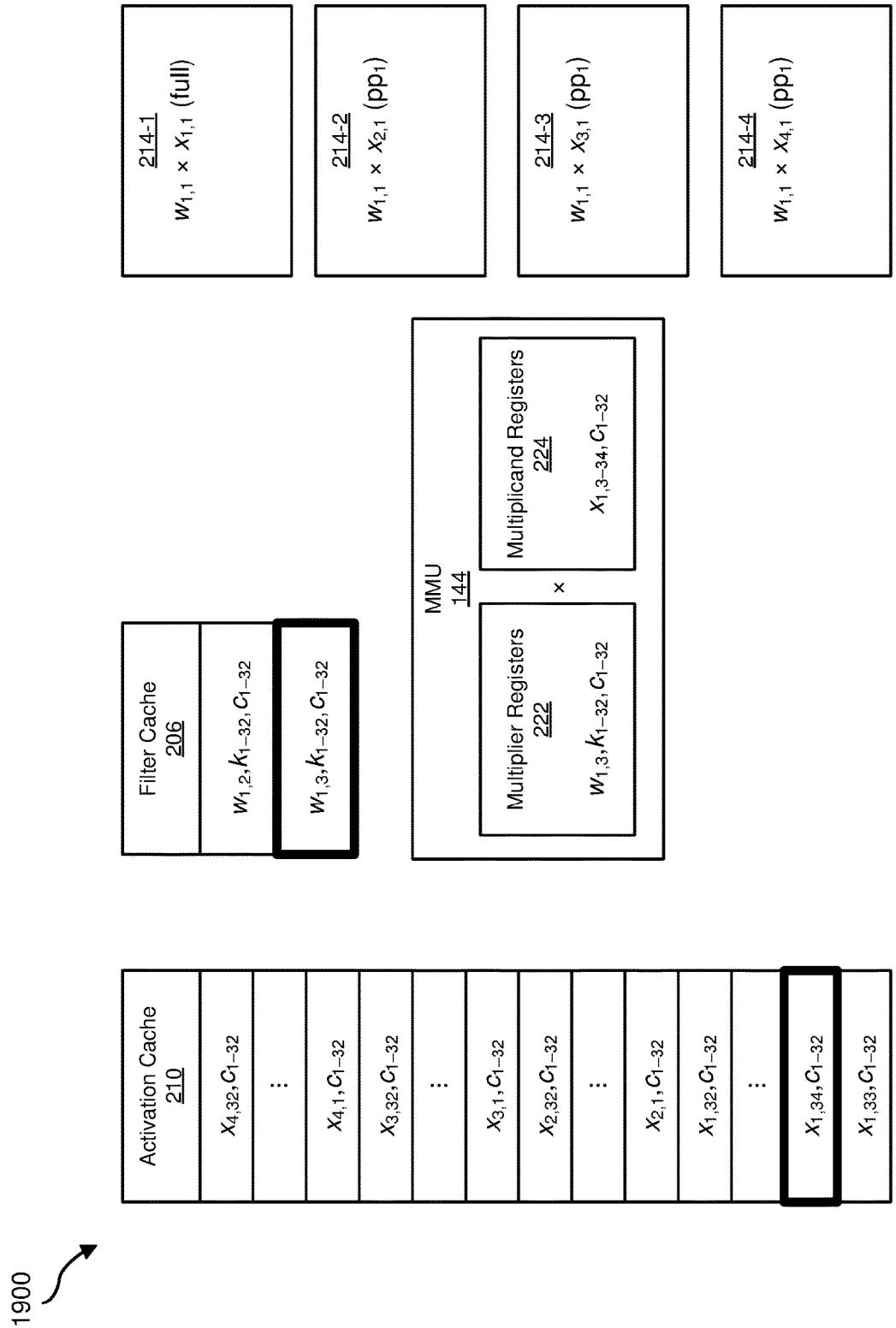

FIG. 19 shows a view 1900 wherein at least one of modules 102 (e.g., loading module 108, executing module 110, etc.) has loaded a filter matrix corresponding to filter location $w_{1,3}$ (i.e., $w_{1,1}$, $k_{1-32}$, $c_{1-32}$) into filter cache 206. As filter cache 206 may be sized to maintain only two filter matrices, this filter matrix may replace the filter matrix corresponding to filter location $w_{1,1}$ (i.e., $w_{1,1}$, $k_{1-32}$, $c_{1-32}$). Likewise, one or more of modules 102 (e.g., loading module 108) may replace an activation vector corresponding to activation volume location $x_{1,2}$ (i.e., $x_{1,2}$, $c_{1-32}$) within activation cache 210 with an activation vector corresponding to activation volume location $x_{1,34}$. This activation vector may be a next value in the second row of the activation volume.

As shown in FIG. 19, executing module 110 may direct MMU 144 to execute an MMO using the additional filter matrix corresponding to filter location $w_{1,3}$ (i.e., $w_{1,3}$, $k_{1-32}$, $c_{1-32}$) and an activation matrix that includes activation vectors corresponding to activation volume locations $x_{1,3-34}$. Thus, executing module 110 may determine a third set of partial products of output activation values for the first row of the output volume. This third set of partial products may be accumulated with and/or maintained within output activation registers 214-1. As this may be the final set of partial products associated with this row of the set of filter matrices (e.g., $w_{1,1}$ to $w_{1,3}$) and may be accumulated with the first and second sets of partial products, this set of partial products may be denoted in FIG. 19 as $w_{1,1} \times x_{1,1}$ (full).

Figure 20:
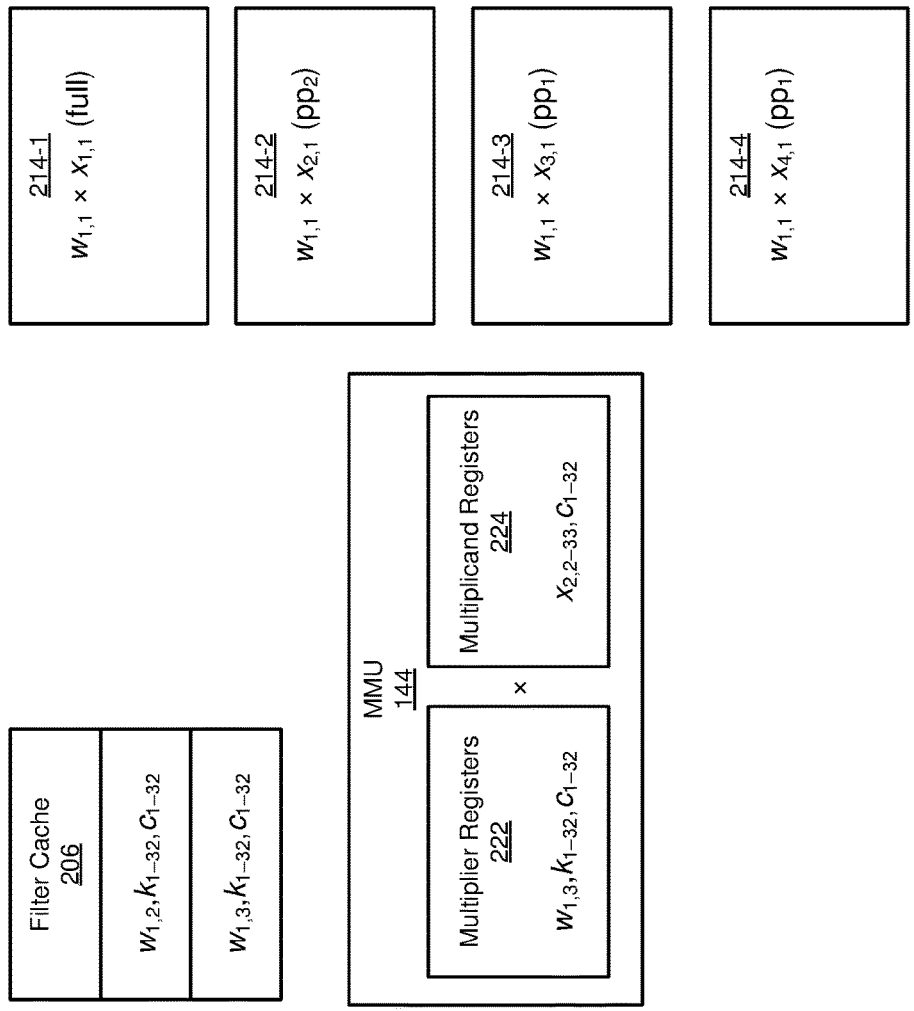

Continuing to FIG. 20, view 2000 shows that one or more of modules 102 (e.g., loading module 108, executing module 110, etc.) may load an activation vector corresponding to activation volume location $x_{2,33}$ into activation cache 210. Executing module 110 may direct MMU 144 to execute an MMO using the filter matrix corresponding to filter location $w_{1,2}$ (i.e., $w_{1,3}$, $k_{1-32}$, $c_{1-32}$) and an activation matrix that includes activation vectors corresponding to activation volume locations $x_{2,2-33}$. Thus, executing module 110 may determine a second set of partial products of output activation values for the second row of the output volume. This second set of partial products may be accumulated with and/or maintained within output activation registers 214-2 and may be denoted in FIG. 20 as $w_{1,1} \times x_{2,1}$ (pp2).

Figure 21:
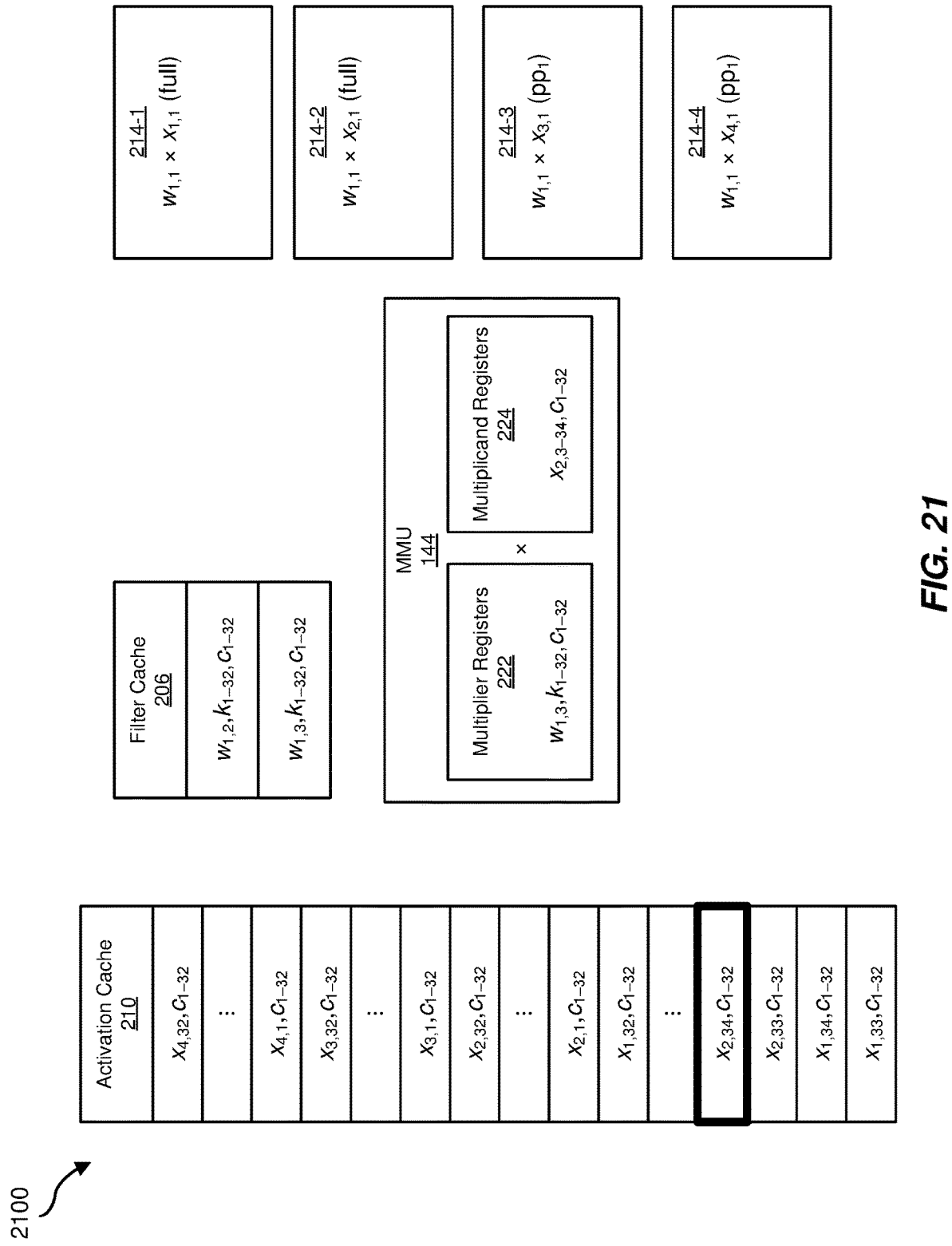

In FIG. 21, view 2100 shows that one or more of modules 102 (e.g., loading module 108, executing module 110, etc.) may load an activation vector corresponding to activation volume location $x_{2,34}$ into activation cache 210. Executing module 110 may direct MMU 144 to execute an MMO using the filter matrix corresponding to filter location $w_{1,3}$ (i.e., $w_{1,3}$, $k_{1-32}$, $c_{1-32}$) and an activation matrix that includes activation vectors corresponding to activation volume locations $x_{2,3-34}$. Thus, executing module 110 may determine a third set of partial products of output activation values for the second row of the output volume. This third set of partial products may be accumulated with and/or maintained within output activation registers 214-2. As this may be the final set of partial products associated with this row of the set of filter matrices (e.g., $w_{1,1}$ to $w_{1,3}$) and may be accumulated with the first and second sets of partial products, this set of partial products may be denoted in FIG. 21 as $w_{1,1} \times x_{2,1}$ (full).

Figure 22:
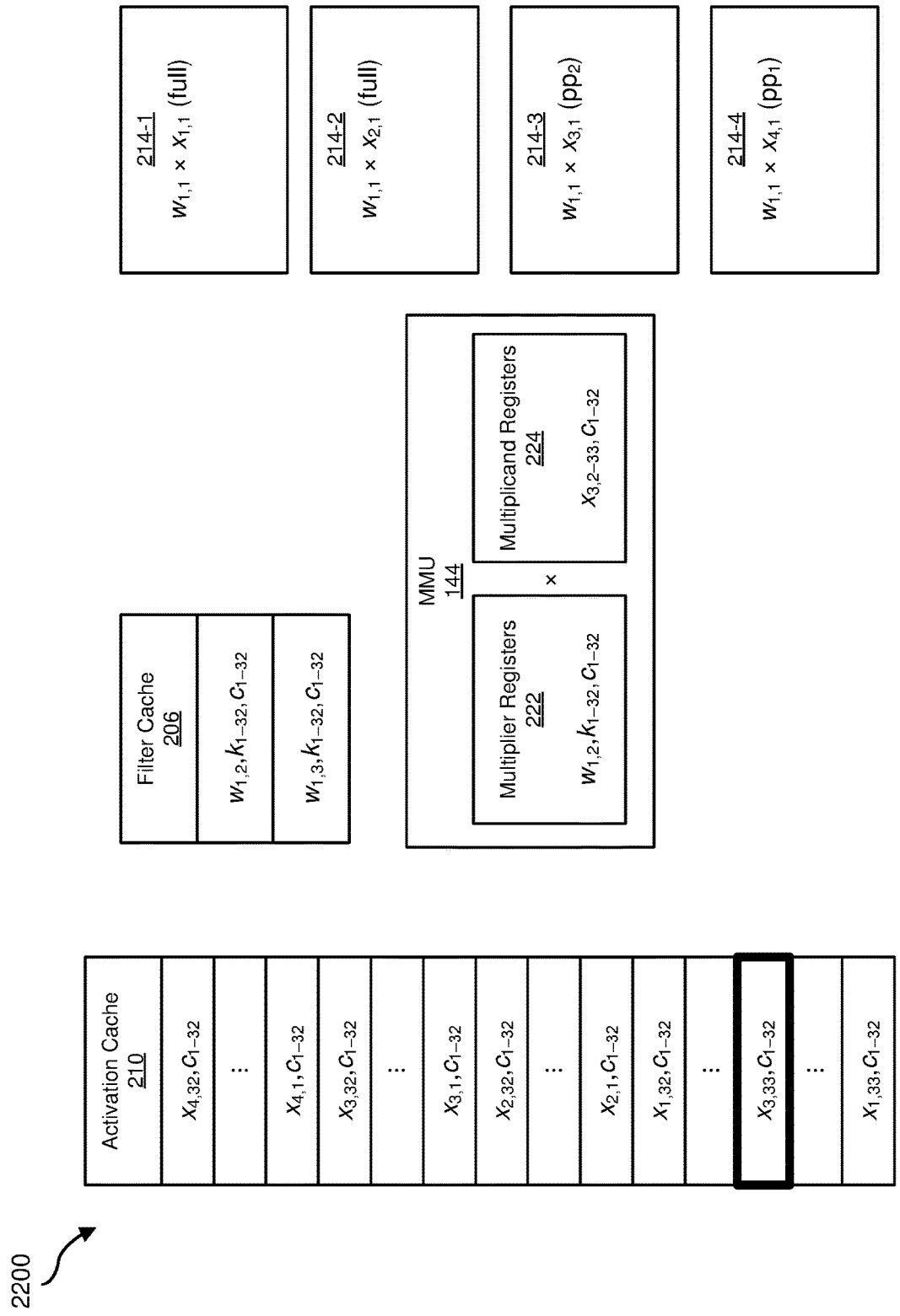

Continuing to FIG. 22, view 2200 shows that one or more of modules 102 (e.g., loading module 108, executing module 110, etc.) may load an activation vector corresponding to activation volume location $x_{3,33}$ into activation cache 210. Executing module 110 may direct MMU 144 to execute an MMO using the filter matrix corresponding to filter location $w_{1,2}$ (i.e., $w_{1,3}$, $k_{1-32}$, $c_{1-32}$) and an activation matrix that includes activation vectors corresponding to activation volume locations $x_{3,2-33}$. Thus, executing module 110 may determine a second set of partial products of output activation values for the third row of the output volume. This second set of partial products may be accumulated with and/or maintained within output activation registers 214-3 and may be denoted in FIG. 22 as $w_{1,1} \times x_{3,1}$ (pp2).

Figure 23:
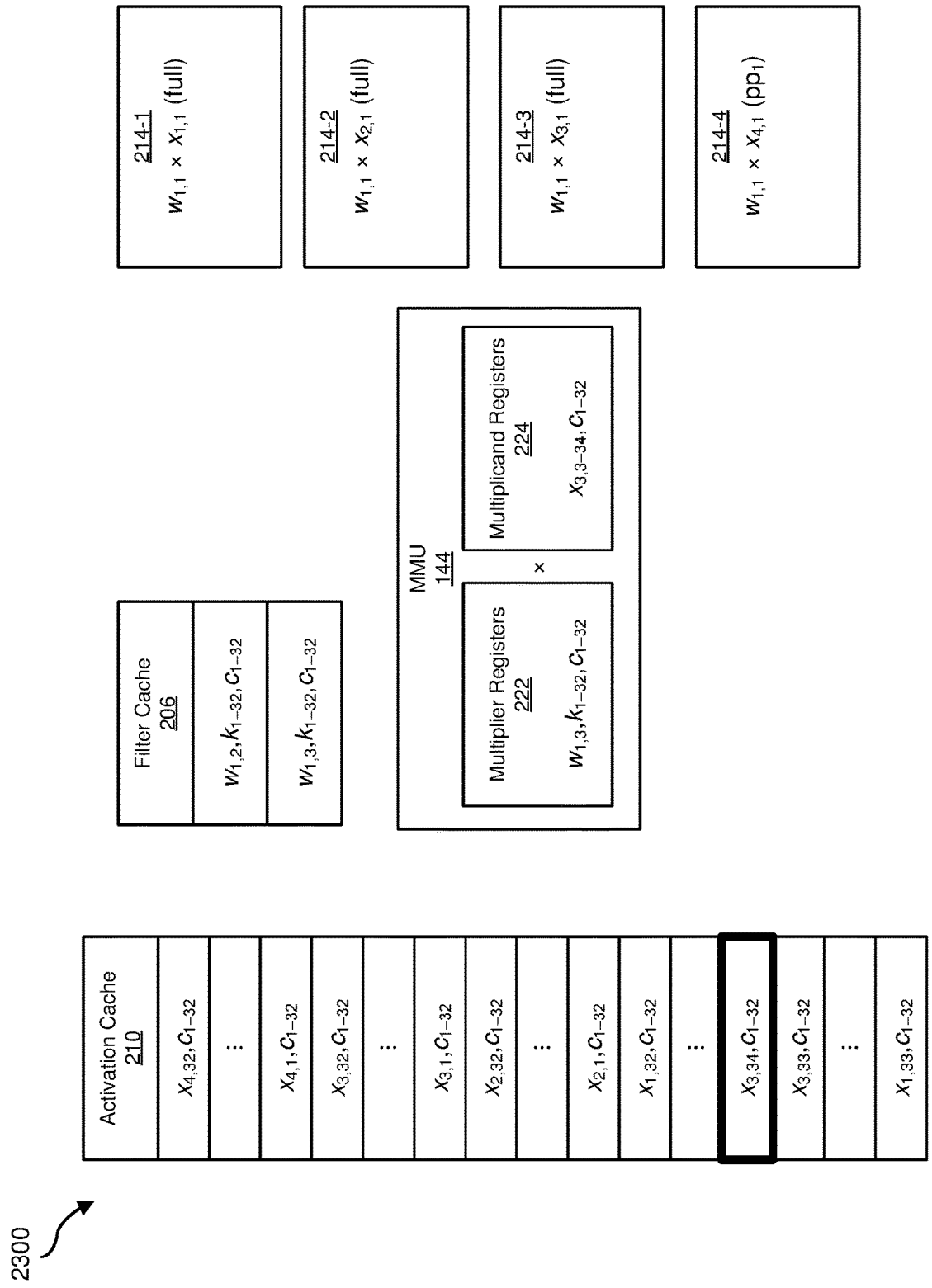

In FIG. 23, view 2300 shows that one or more of modules 102 (e.g., loading module 108, executing module 110, etc.) may load an activation vector corresponding to activation volume location $x_{3,34}$ into activation cache 210. Executing module 110 may direct MMU 144 to execute an MMO using the filter matrix corresponding to filter location $w_{1,3}$ (i.e., $w_{1,3}$, $k_{1-32}$, $c_{1-32}$) and an activation matrix that includes activation vectors corresponding to activation volume locations $x_{3,3-34}$. Thus, executing module 110 may determine a third set of partial products of output activation values for the third row of the output volume. This third set of partial products may be accumulated with and/or maintained within output activation registers 214-3. As this may be the final set of partial products associated with this row of the set of filter matrices (e.g., $w_{1,1}$ to $w_{1,3}$) and may be accumulated with the first and second sets of partial products, this set of partial products may be denoted in FIG. 23 as $w_{1,1} \times x_{3,1}$ (full).

Figure 24:
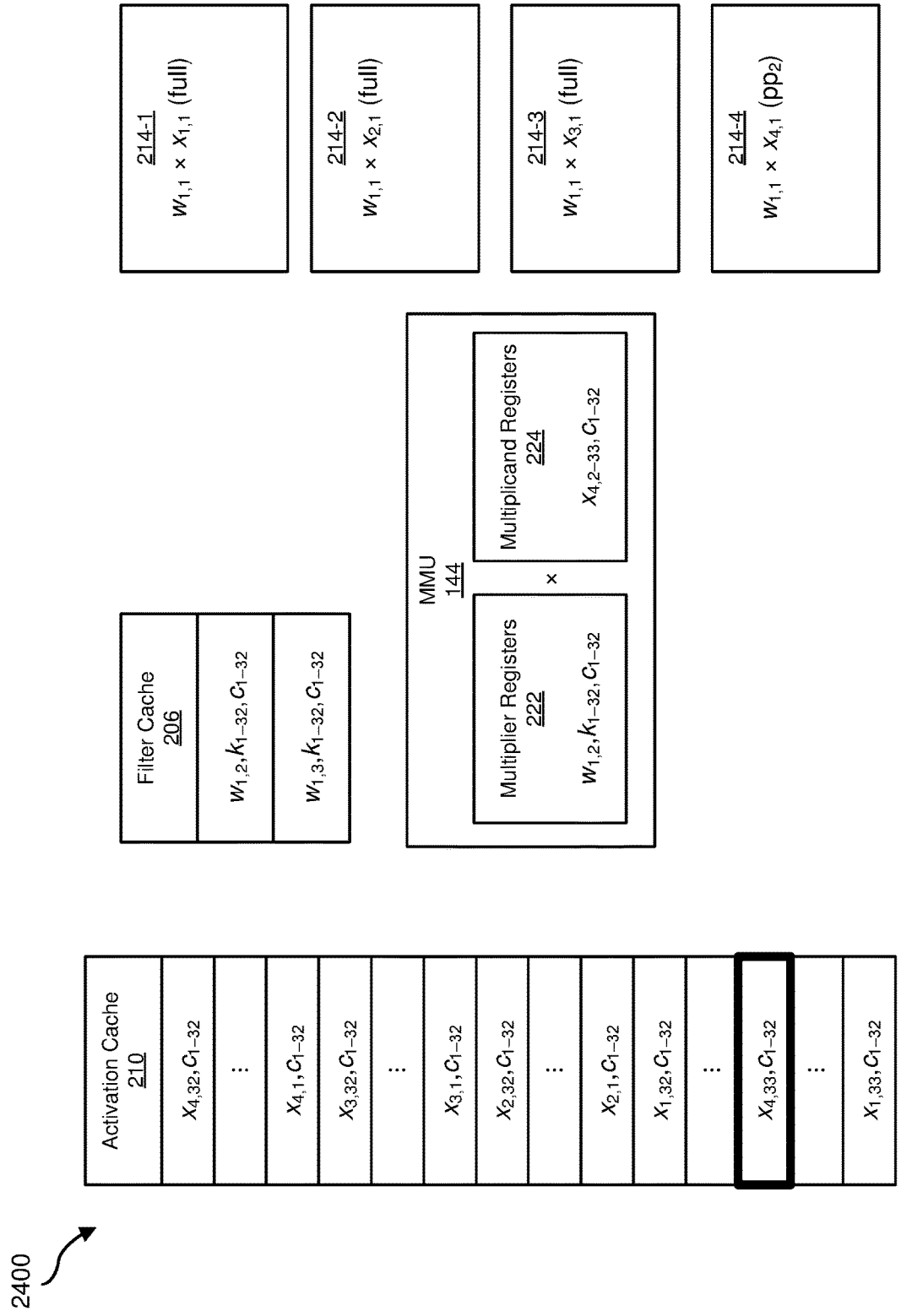

Continuing to FIG. 24, view 2400 shows that one or more of modules 102 (e.g., loading module 108, executing module 110, etc.) may load an activation vector corresponding to activation volume location $x_{4,33}$ into activation cache 210. Executing module 110 may direct MMU 144 to execute an MMO using the filter matrix corresponding to filter location $w_{1,2}$ (i.e., $w_{1,2}$, $k_{1-32}$, $c_{1-32}$) and an activation matrix that includes activation vectors corresponding to activation volume locations $x_{4,2-33}$. Thus, executing module 110 may determine a second set of partial products of output activation values for the fourth row of the output volume (e.g., $O_{4,1}$ to $O_{4,32}$). This second set of partial products may be accumulated with and/or maintained within output activation registers 214-4 and may be denoted in FIG. 24 as $w_{1,1} \times x_{4,1}$ (pp2).

Figure 25:
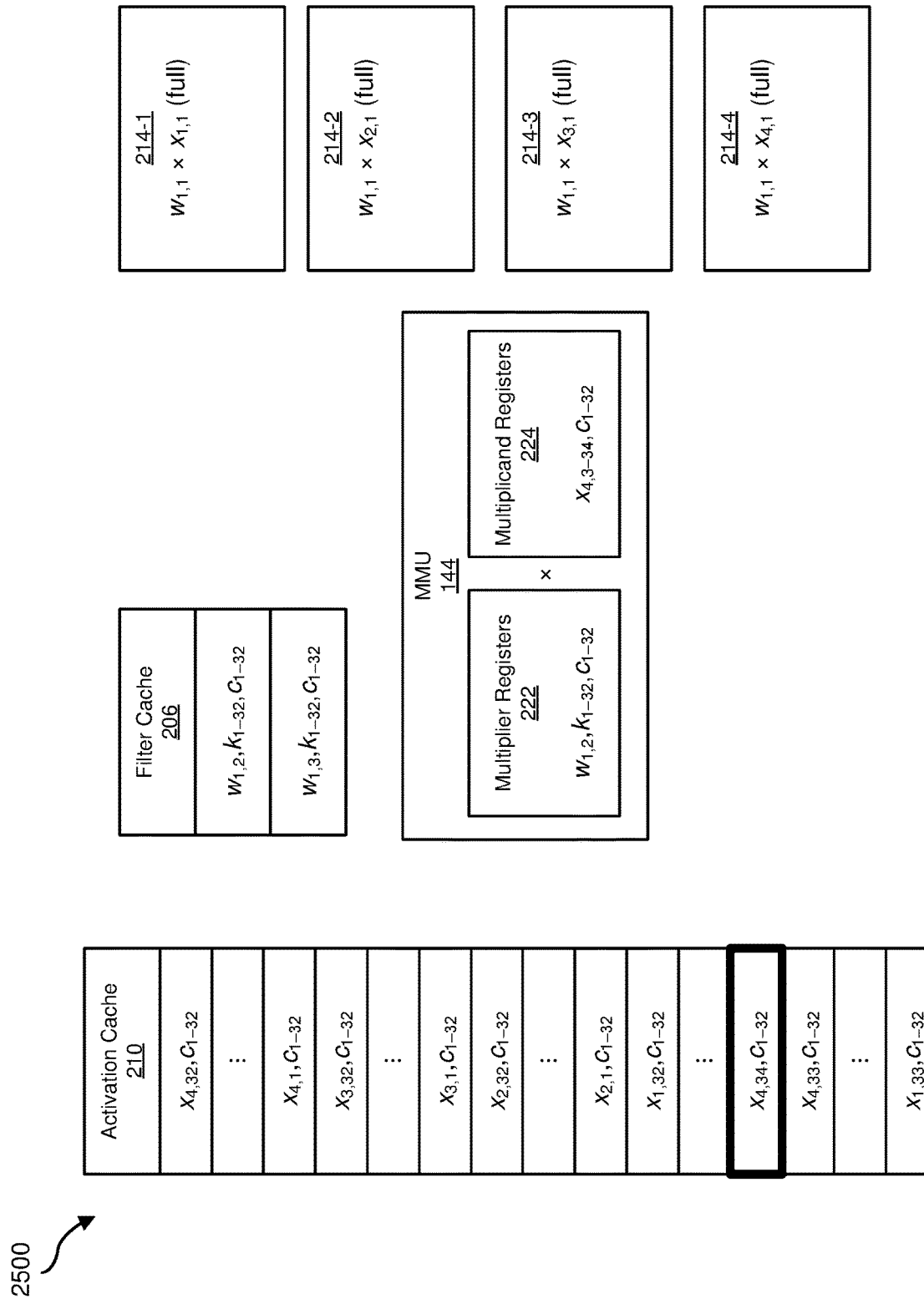

In FIG. 25, view 2500 shows that one or more of modules 102 (e.g., loading module 108, executing module 110, etc.) may load an activation vector corresponding to activation volume location $x_{4,34}$ into activation cache 210. Executing module 110 may direct MMU 144 to execute an MMO using the filter matrix corresponding to filter location $w_{1,3}$ (i.e., $w_{1,3}$, $k_{1-32}$, $c_{1-32}$) and an activation matrix that includes activation vectors corresponding to activation volume locations $x_{4,3-34}$. Thus, executing module 110 may determine a third set of partial products of output activation values for the fourth row of the output volume (e.g., $O_{4,1}$ to $O_{4,32}$). This third set of partial products may be accumulated with and/or maintained within output activation registers 214-4. As this may be the final set of partial products associated with this row of the set of filter matrices (e.g., $w_{1,1}$ to $w_{1,3}$) and may be accumulated with the first and second sets of partial products, this set of partial products may be denoted in FIG. 25 as $w_{1,1} \times x_{4,1}$ (full).

Figure 26:
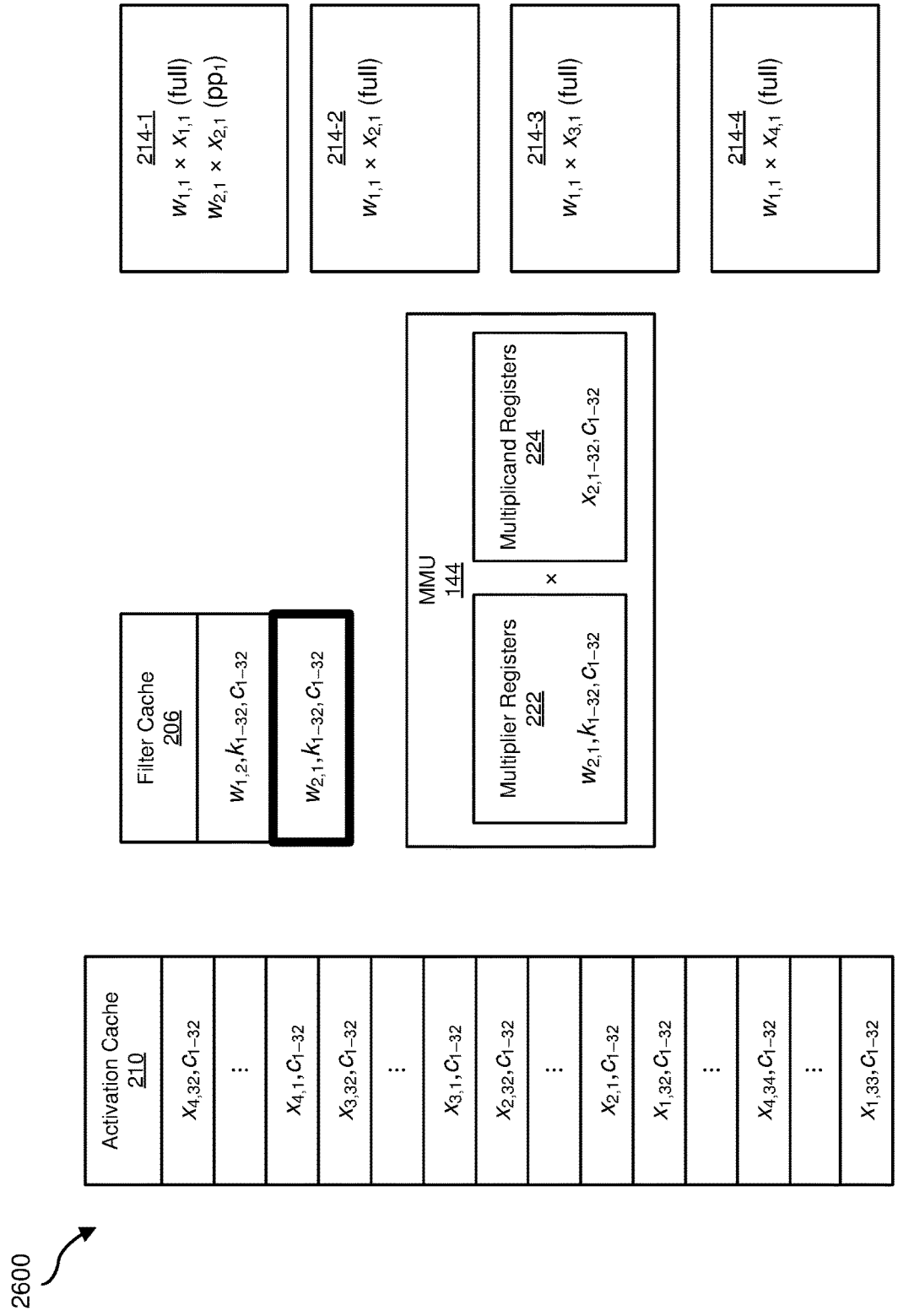

FIG. 26 shows a view 2600 wherein at least one of modules 102 (e.g., loading module 108, executing module 110, etc.) may load a filter matrix corresponding to filter location $w_{2,1}$ (i.e., $w_{2,1}$, $k_{1-32}$, $c_{1-32}$) into filter cache 206. As filter cache 206 may be sized to maintain only two filter matrices, this filter matrix may replace the filter matrix corresponding to filter location $w_{1,3}$ (i.e., $w_{1,3}$, $k_{1-32}$, $c_{1-32}$). Executing module 110 may direct MMU 144 to execute an MMO using the filter matrix corresponding to filter location $w_{2,1}$ (i.e., $w_{2,1}$, $k_{1-32}$, $c_{1-32}$) and an activation matrix that includes activation vectors corresponding to activation volume locations $x_{2,1-32}$. Thus, executing module 110 may determine a first set of partial products of output activation values for the first row of the output volume (e.g., $O_{1,1}$ to $O_{1,32}$) that may correspond to a second row of the set of filters (i.e., $w_{2,1}$ to $w_{2,3}$). This first set of partial products may be accumulated with and/or maintained within output activation registers 214-1 and may be denoted in FIG. 26 as $w_{2,1} \times x_{2,1}$ (pp1).

Figure 27:
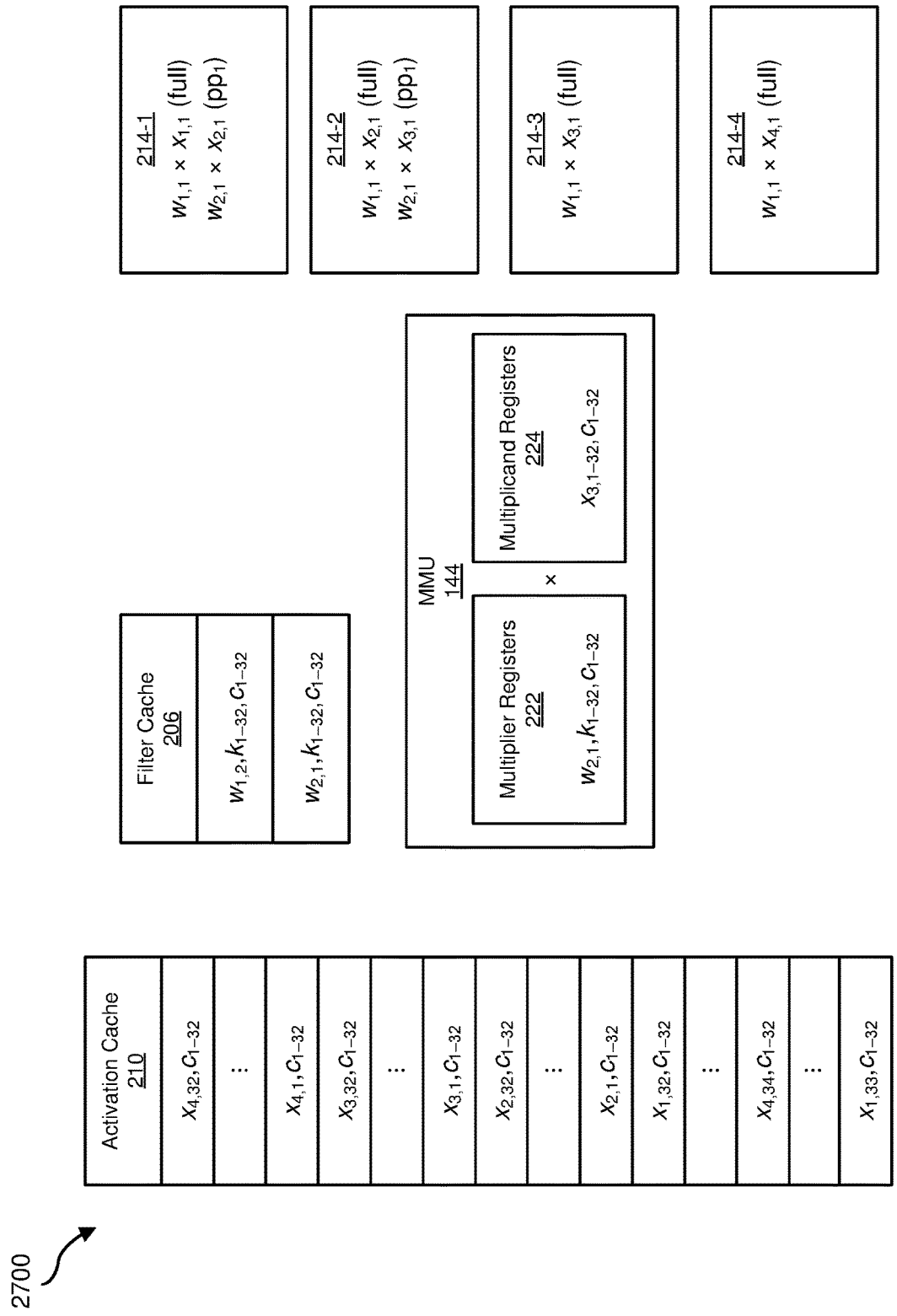

Continuing to FIG. 27, view 2700 may show that executing module 106 may direct MMU 144 to execute an MMO using the filter matrix corresponding to filter location $w_{2,1}$ (i.e., $w_{2,1}$, $k_{1-32}$, $c_{1-32}$) and an activation matrix that includes activation vectors corresponding to activation volume locations $x_{3,1-32}$. Thus, executing module 110 may determine a first set of partial products of output activation values for the second row of the output volume (e.g., $O_{2,1}$ to $O_{2,32}$) that may correspond to a second row of the set of filters (i.e., $w_{2,1}$ to $w_{2,3}$). This first set of partial products may be accumulated with and/or maintained within output activation registers 214-2 and may be denoted in FIG. 27 as $w_{2,1} \times x_{3,1}$ (pp1).

Figure 28:
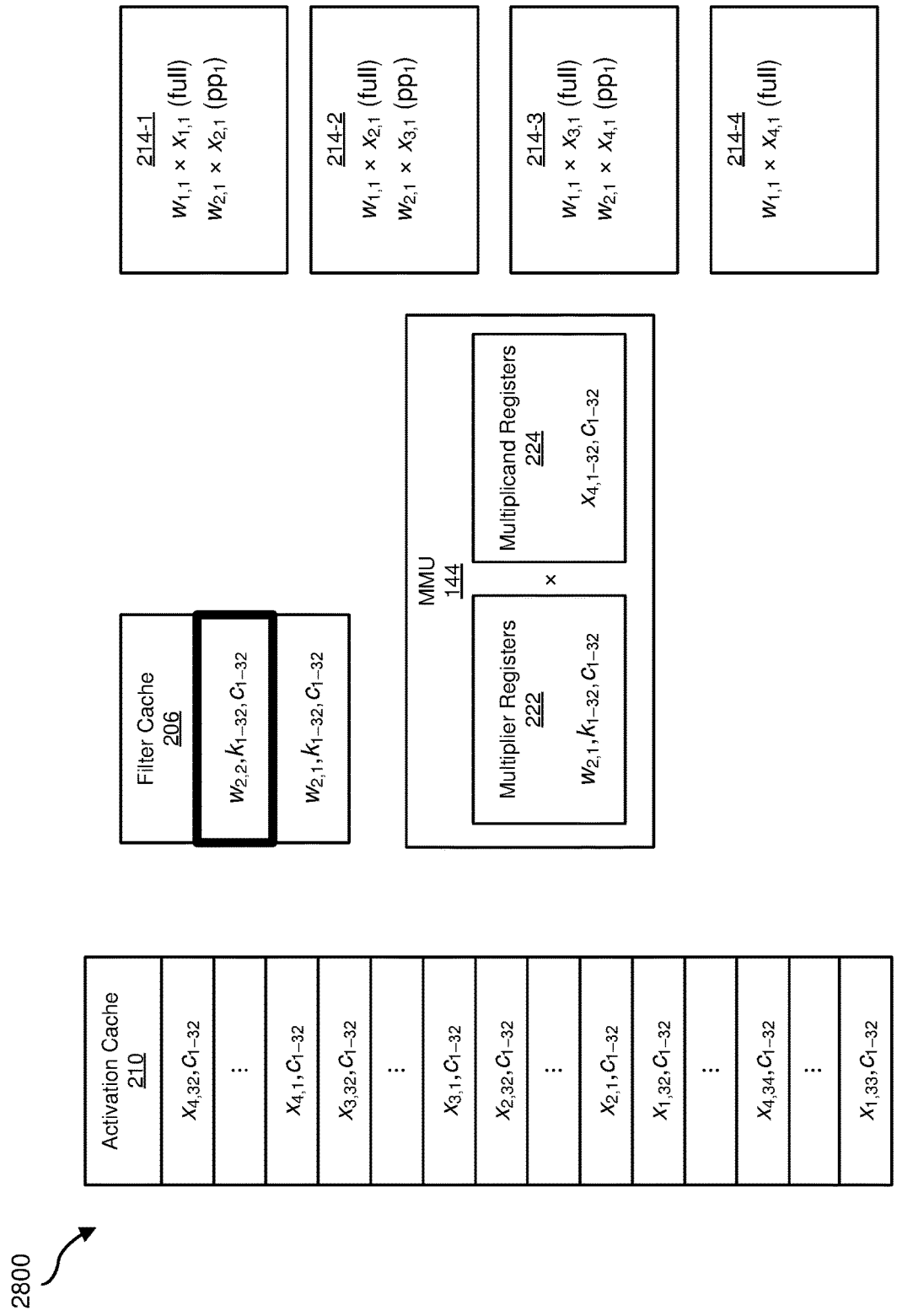

FIG. 28 shows a view 2800 wherein at least one of modules 102 (e.g., loading module 108, executing module 110, etc.) may load a filter matrix corresponding to filter location $w_{2,2}$ (i.e., $w_{2,2}$, $k_{1-32}$, $c_{1-32}$) into filter cache 206. As filter cache 206 may be sized to maintain only two filter matrices, this filter matrix may replace the filter matrix corresponding to filter location $w_{1,2}$ (i.e., $w_{1,2}$, $k_{1-32}$, $c_{1-32}$). Executing module 110 may direct MMU 144 to execute an MMO using the filter matrix corresponding to filter location $w_{2,1}$ (i.e., $w_{2,1}$, $k_{1-32}$, $c_{1-32}$) and an activation matrix that includes activation vectors corresponding to activation volume locations $x_{4,1-32}$. Thus, executing module 110 may determine a first set of partial products of output activation values for the third row of the output volume (e.g., $O_{3,1}$ to $O_{3,32}$) that may correspond to a second row of the set of filters (i.e., $w_{2,1}$ to $W_{2,3}$). This first set of partial products may be accumulated with and/or maintained within output activation registers 214-3 and may be denoted in FIG. 28 as $w_{2,1} \times x_{4,1}$ (pp1).

Figure 29:
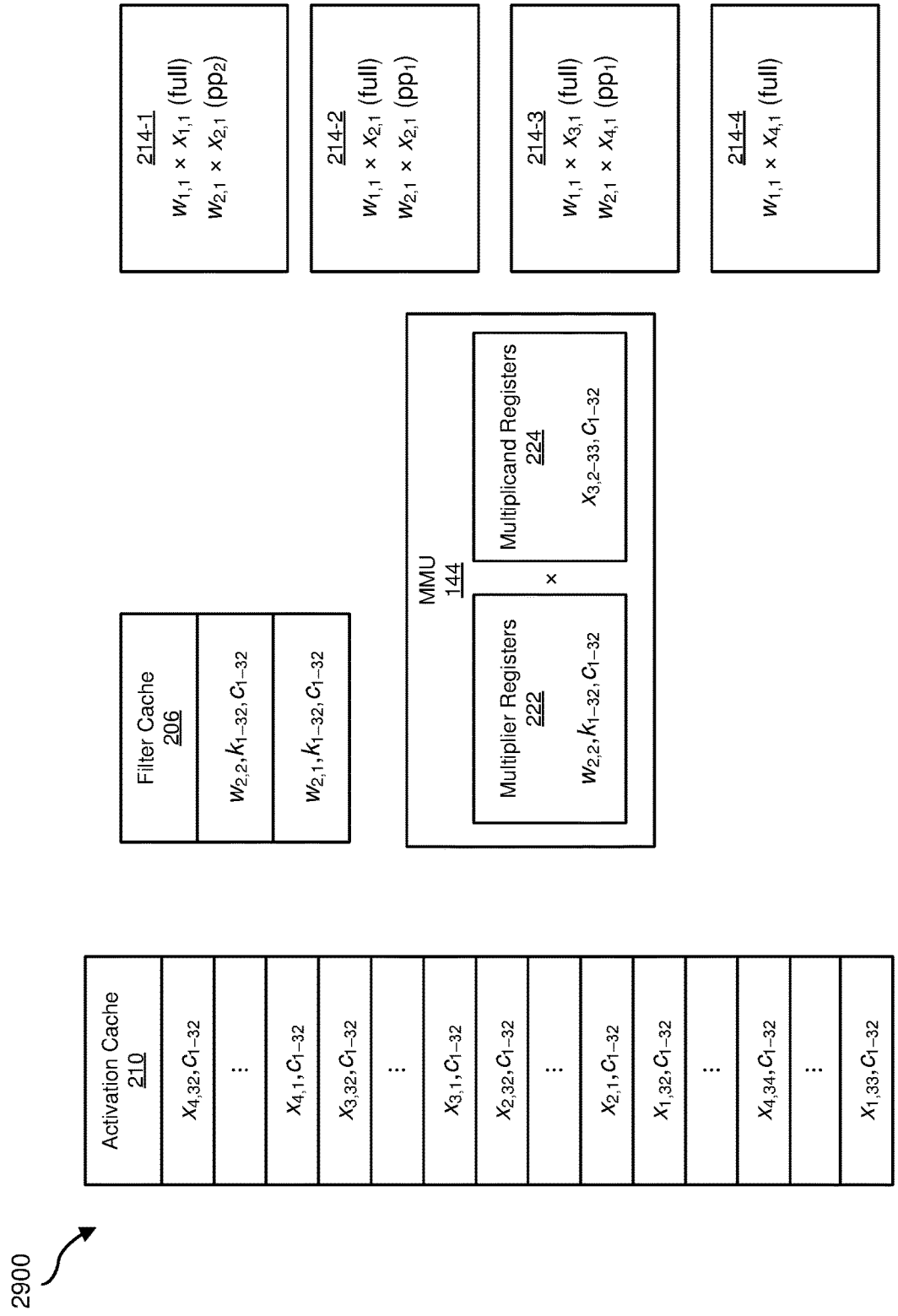

In FIG. 29, view 2900 shows that executing module 110 may direct MMU 144 to execute an MMO using the filter matrix corresponding to filter location $w_{2,2}$ (i.e., $w_{2,2}$, $k_{1-32}$, $c_{1-32}$) and an activation matrix that includes activation vectors corresponding to activation volume locations $x_{2,3-33}$. Thus, executing module 110 may determine a second set of partial products of output activation values for the first row of the output volume (e.g., $O_{1,1}$ to $O_{1,32}$) that may correspond to a second row of the set of filters (i.e., $w_{2,1}$ to $w_{2,3}$). This second set of partial products may be accumulated with and/or maintained within output activation registers 214-1 and may be denoted in FIG. 29 as $w_{2,1} \times x_{2,1}$ (pp2).

Figure 30:
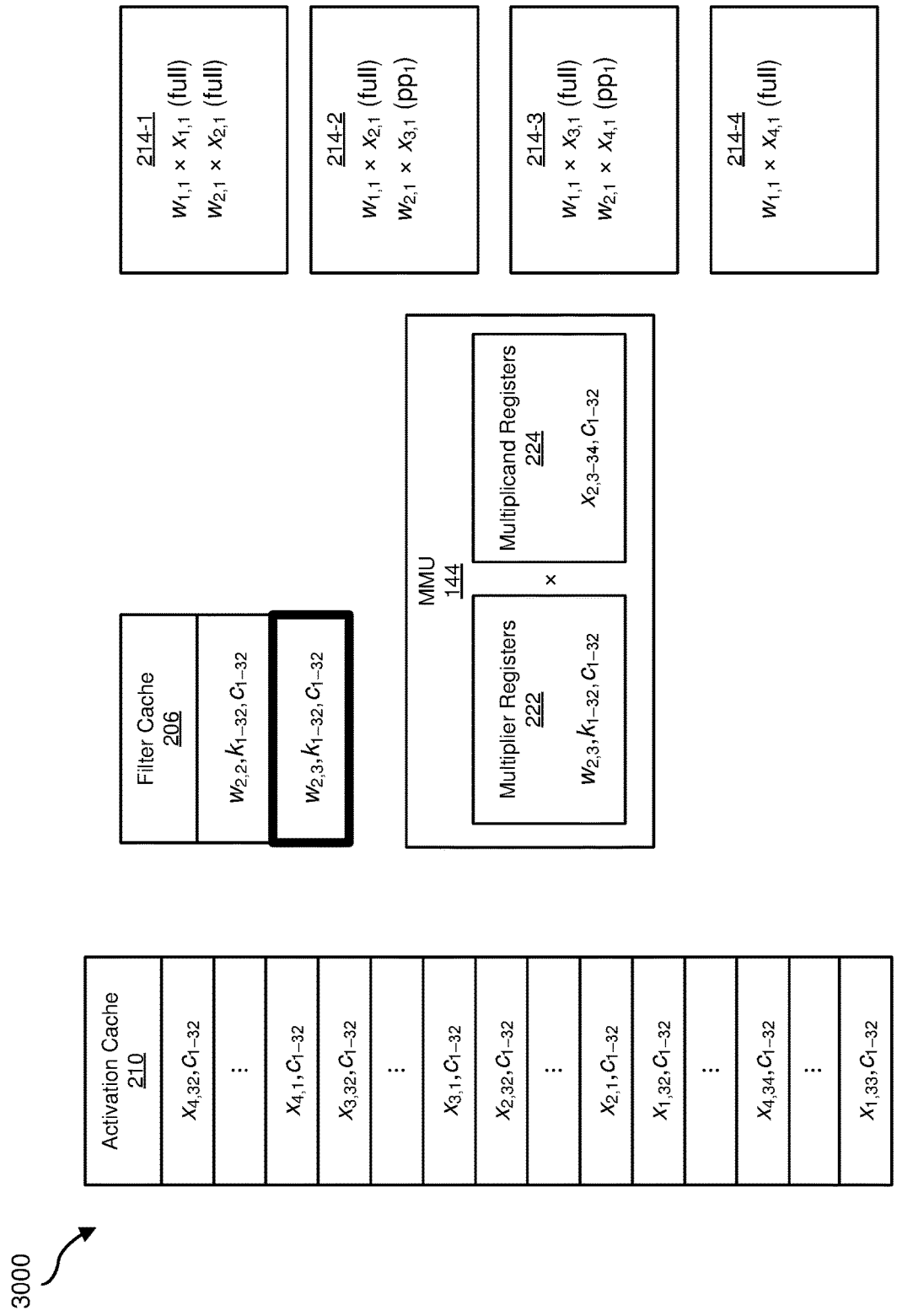

FIG. 30 shows a view 3000 wherein at least one of modules 102 (e.g., loading module 108, executing module 110, etc.) may load a filter matrix corresponding to filter location $w_{2,3}$ (i.e., $w_{2,3}$, $k_{1-32}$, $c_{1-32}$) into filter cache 206, replacing the filter matrix corresponding to filter location $w_{2,1}$ (i.e., $w_{2,1}$, $k_{1-32}$, $c_{1-32}$). Executing module 110 may direct MMU 144 to execute an MMO using the filter matrix corresponding to filter location $w_{2,3}$ (i.e., $w_{2,3}$, $k_{1-32}$, $c_{1-32}$) and an activation matrix that includes activation vectors corresponding to activation volume locations $x_{2,3-34}$. Thus, executing module 110 may determine a third set of partial products of output activation values for the first row of the output volume. This third set of partial products may be accumulated with and/or maintained within output activation registers 214-1. As this may be the final set of partial products associated with this row of the set of filter matrices (e.g., $w_{2,1}$ to $w_{2,3}$) and may be accumulated with the first and second sets of partial products, this set of partial products may be denoted in FIG. 30 as $w_{2,1} \times x_{2,1}$ (full).

Figure 31:
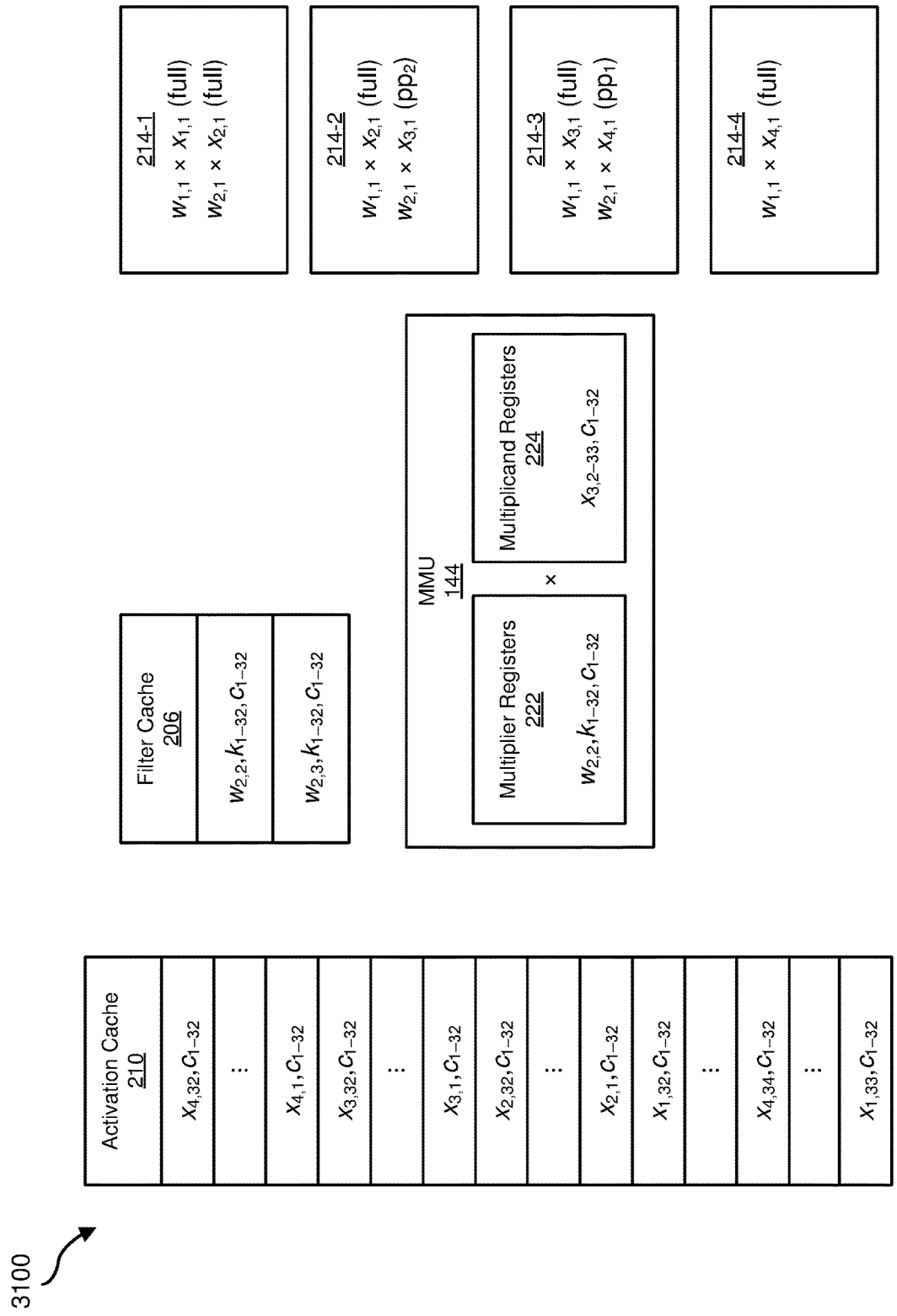

Continuing to FIG. 31, view 3100 shows that executing module 110 may direct MMU 144 to execute an MMO using the filter matrix corresponding to filter location $w_{2,2}$ (i.e., $w_{2,2}$, $k_{1-32}$, $c_{1-32}$) and an activation matrix that includes activation vectors corresponding to activation volume locations $x_{3,2-33}$. Thus, executing module 110 may determine a second set of partial products of output activation values for the second row of the output volume (e.g., $O_{2,1}$ to $O_{2,32}$) that may correspond to a second row of the set of filters (i.e., $w_{2,1}$ to $w_{2,3}$). This second set of partial products may be accumulated with and/or maintained within output activation registers 214-2 and may be denoted in FIG. 31 as $w_{2,1} \times x_{3,1}$ (pp2).

Figure 32:
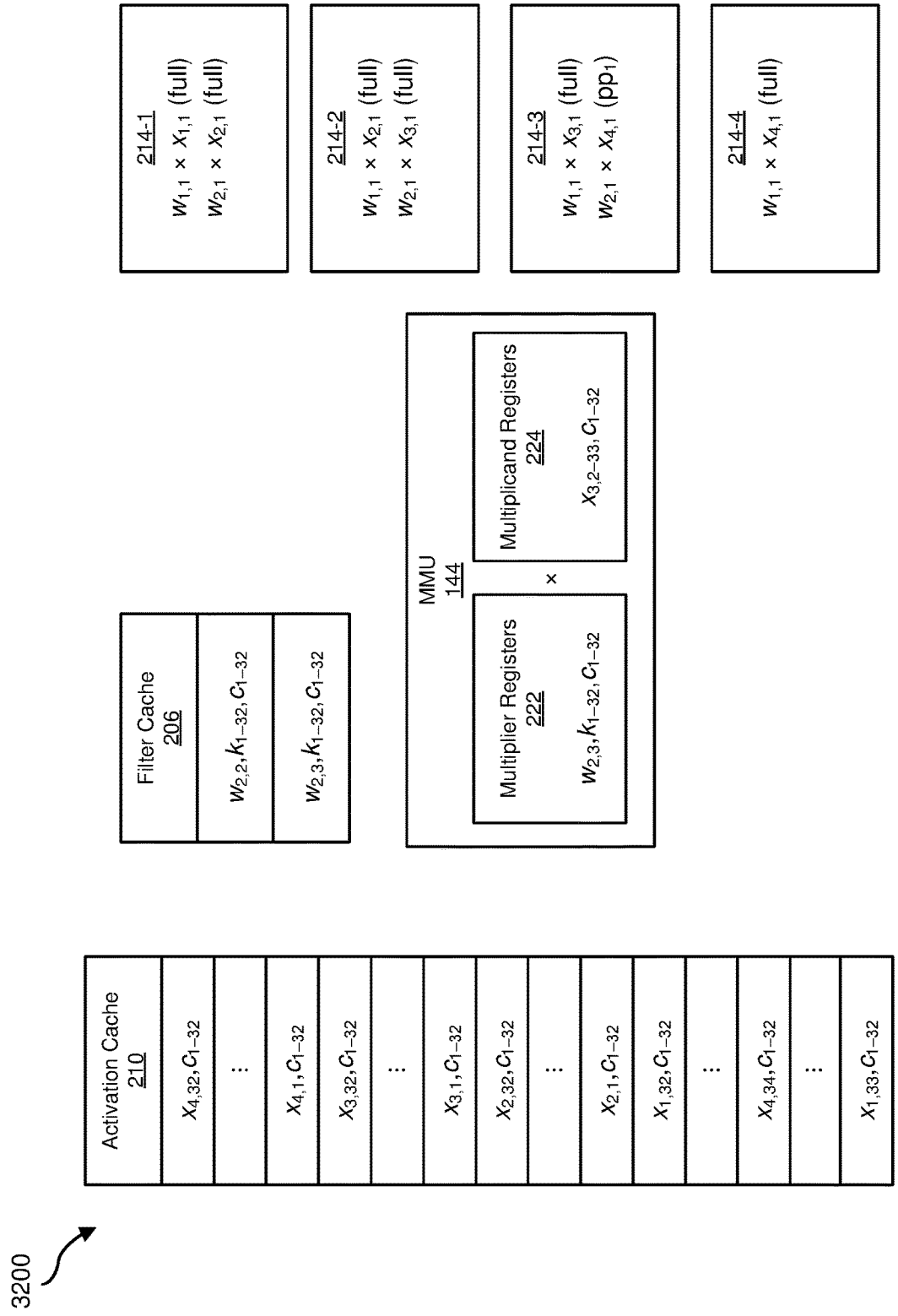

In FIG. 32, view 3200 shows that executing module 110 may direct MMU 144 to execute an MMO using the filter matrix corresponding to filter location $w_{2,3}$ (i.e., $w_{2,3}$, $k_{1-32}$, $c_{1-32}$) and an activation matrix that includes activation vectors corresponding to activation volume locations $x_{3,3-34}$. Thus, executing module 110 may determine a third set of partial products of output activation values for the second row of the output volume. This third set of partial products may be accumulated with and/or maintained within output activation registers 214-2. As this may be the final set of partial products associated with this row of the set of filter matrices (e.g., $w_{2,1}$ to $w_{2,3}$) and may be accumulated with the first and second sets of partial products, this set of partial products may be denoted in FIG. 32 as $w_{2,1} \times x_{3,1}$ (full).

Figure 33:
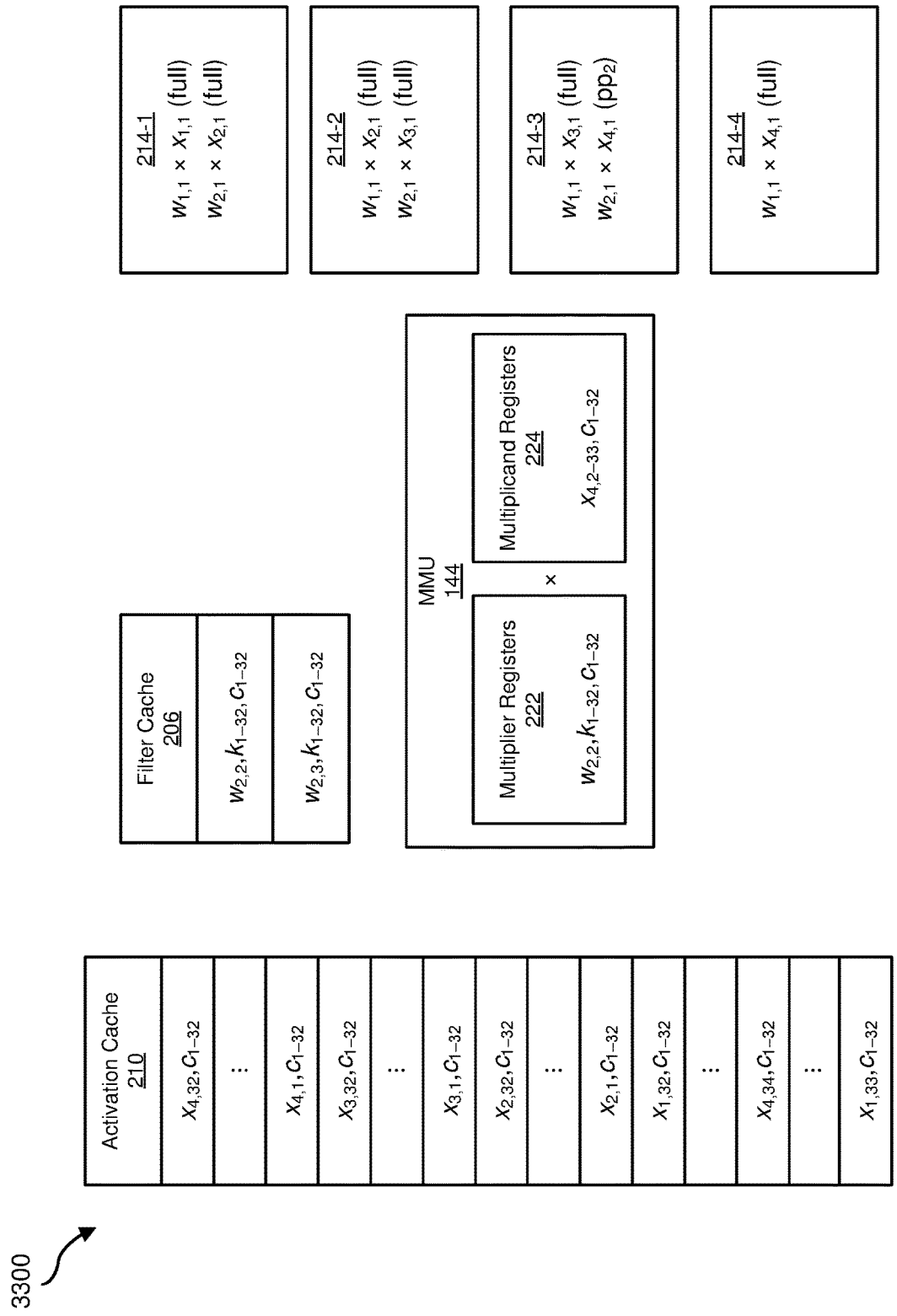

Continuing to FIG. 33, view 3300 shows that executing module may direct MMU 144 to execute an MMO using the filter matrix corresponding to filter location $w_{2,2}$ (i.e., $w_{2,2}$, $k_{1-32}$, $c_{1-32}$) and an activation matrix that includes activation vectors corresponding to activation volume locations $x_{4,2-34}$. Thus, executing module 110 may determine a second set of partial products of output activation values for the third row of the output volume (e.g., $O_{3,1}$ to $O_{3,32}$) that may correspond to a second row of the set of filters (i.e., $w_{2,1}$ to $w_{2,3}$). This second set of partial products may be accumulated with and/or maintained within output activation registers 214-3 and may be denoted in FIG. 33 as $w_{2,1} \times x_{3,1}$ (pp2).

Figure 34:
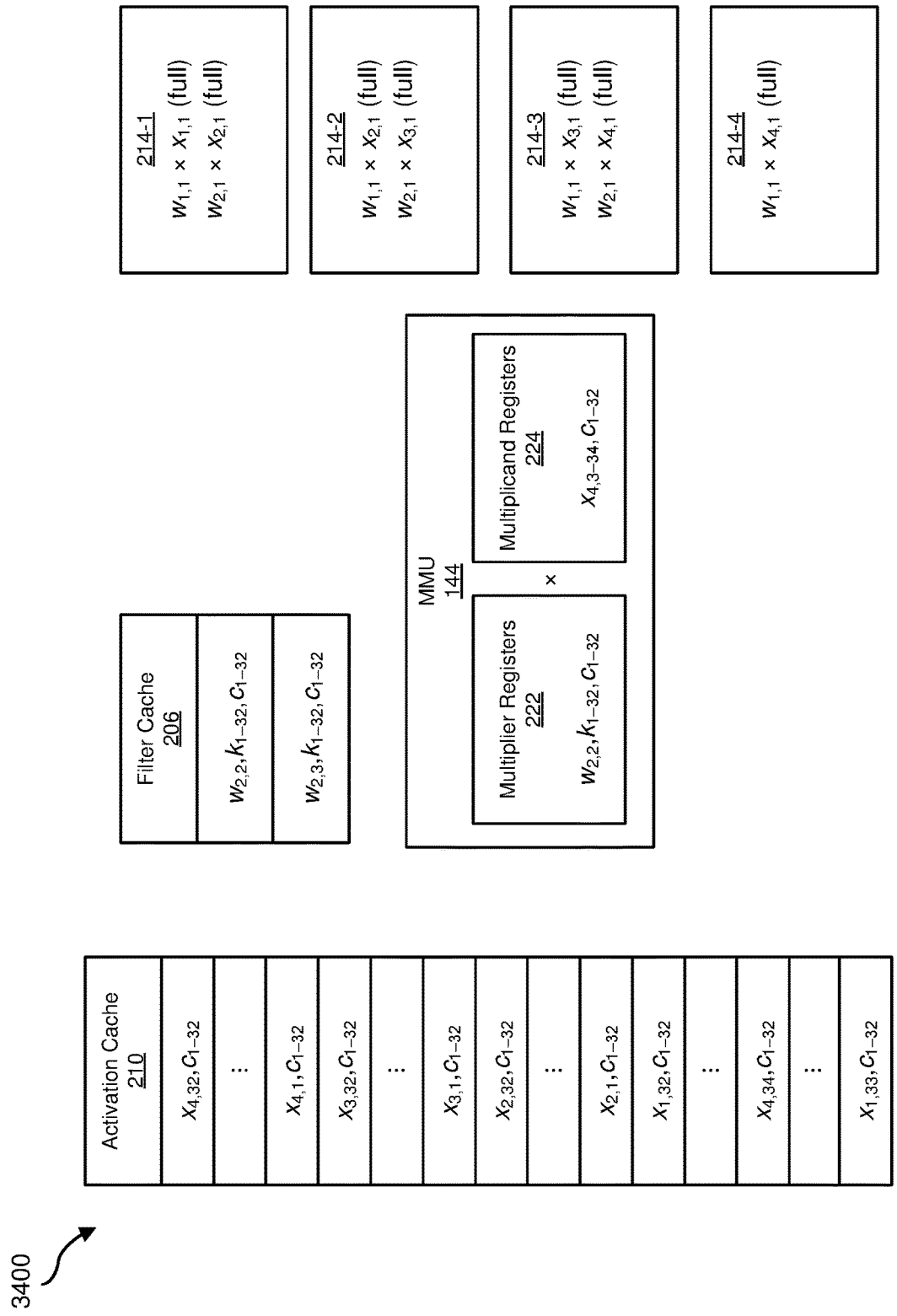

FIG. 34 shows a view 3400 wherein executing module may direct MMU 144 to execute an MMO using the filter matrix corresponding to filter location $w_{2,3}$ (i.e., $w_{2,3}$, $k_{1-32}$, $c_{1-32}$) and an activation matrix that includes activation vectors corresponding to activation volume locations $x_{4,3-34}$. Thus, executing module 110 may determine a third set of partial products of output activation values for the third row of the output volume (e.g., $O_{3,1}$ to $O_{3,32}$). This third set of partial products may be accumulated with and/or maintained within output activation registers 214-3. As this may be the final set of partial products associated with this row of the set of filter matrices (e.g., $w_{2,1}$ to $w_{2,3}$) and may be accumulated with the first and second sets of partial products, this set of partial products may be denoted in FIG. 34 as $w_{2,1} \times x_{4,1}$ (full)

Figure 35:
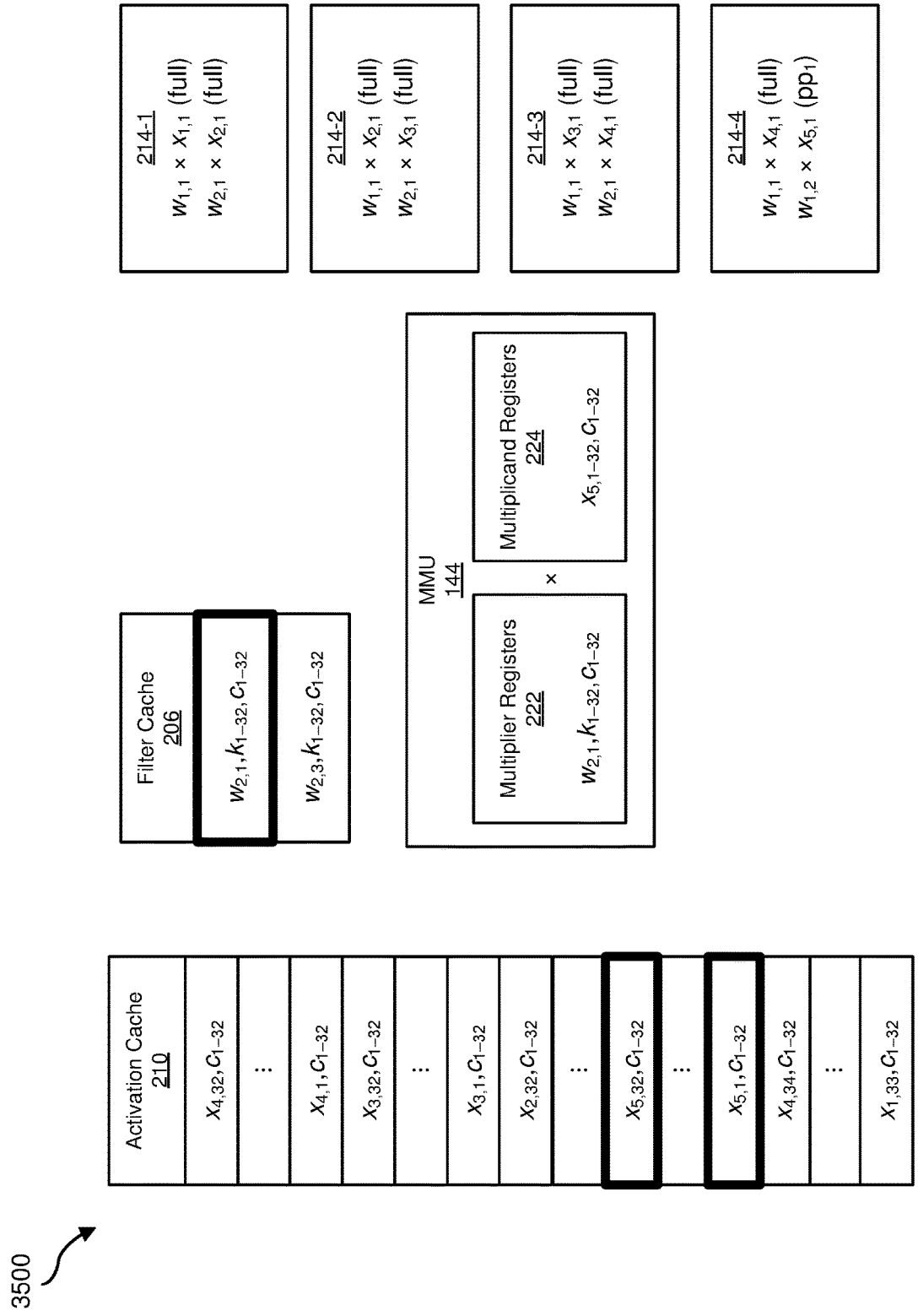

FIG. 35 shows a view 3500 wherein at least one of modules 102 (e.g., loading module 108, executing module 110, etc.) may load a filter matrix corresponding to filter location $w_{2,1}$ (i.e., $w_{2,1}$, $k_{1-32}$, $c_{1-32}$) into filter cache 206. As filter cache 206 may be sized to maintain only two filter matrices, this filter matrix may replace the filter matrix corresponding to filter location $w_{2,2}$ (i.e., $w_{2,2}$, $k_{1-32}$, $c_{1-32}$). Furthermore, one or more of modules 102 (e.g., loading module 108, executing module 110, etc.) may load activation vectors corresponding to activation volume location $x_{5,1-32}$ (i.e., $x_{5,1}$, $c_{1-32}$ to $x_{5,32}$, $c_{1-32}$) into activation cache 210. Executing module 110 may execute an MMO using the filter matrix corresponding to filter location $w_{2,1}$ (i.e., $w_{2,1}$, $k_{1-32}$, $c_{1-32}$) and an activation matrix that includes activation vectors corresponding to activation volume locations $x_{5,1-32}$. Thus, executing module 110 may determine a first set of partial products of output activation values for the fourth row of the output volume (e.g., $O_{4,1}$ to $O_{4,32}$) that may correspond to a second row of the set of filters (i.e., $w_{2,1}$ to $w_{2,3}$). This first set of partial products may be accumulated with and/or maintained within output activation registers 214-4 and may be denoted in FIG. 35 as $w_{2,1} \times x_{5,1}$ (pp1).

Figure 36:
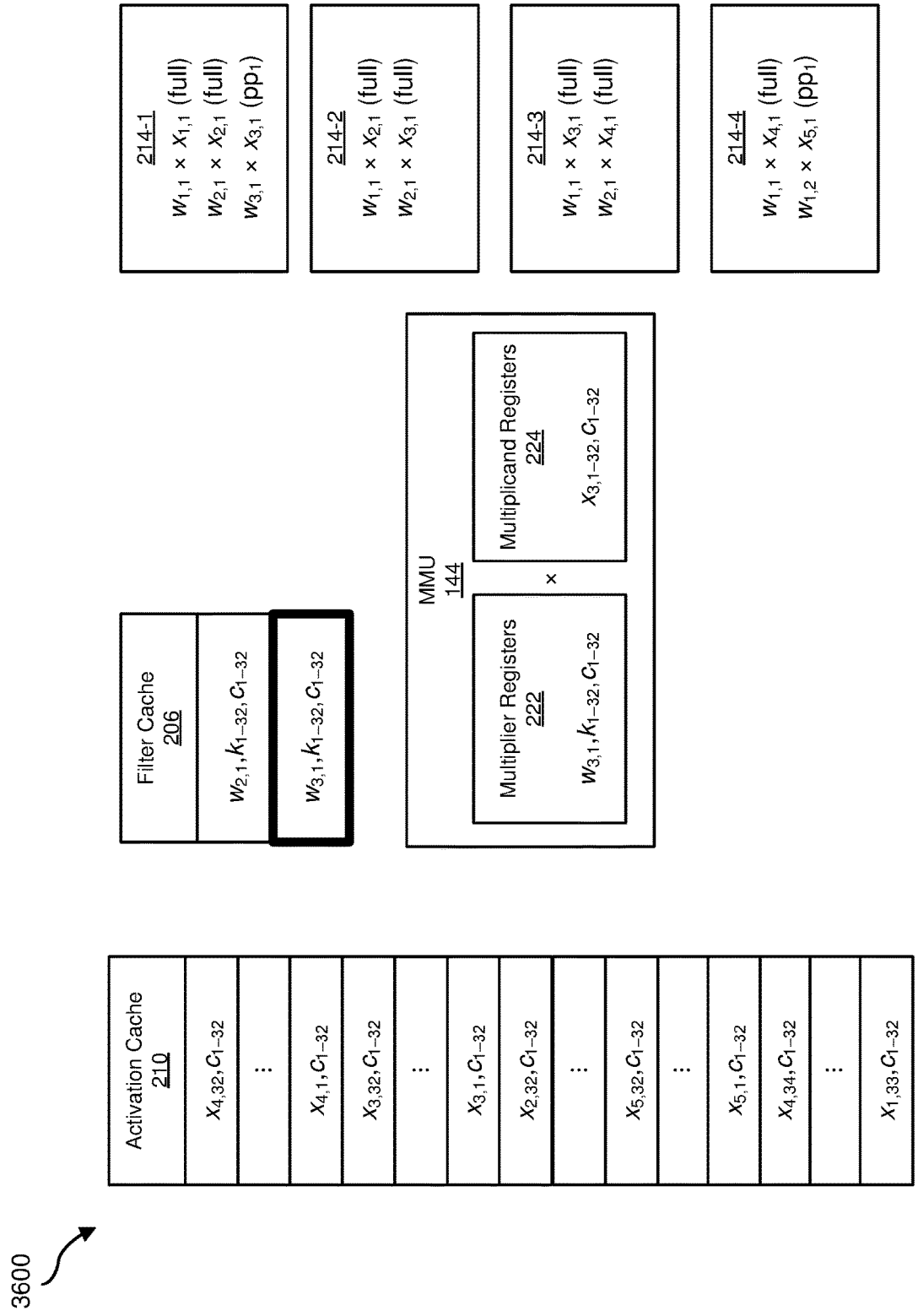

In FIG. 36, view 3600 shows that at least one of modules 102 (e.g., loading module 108, executing module 110, etc.) may load a filter matrix corresponding to filter location $w_{3,1}$ (i.e., $w_{3,1}$, $k_{1-32}$, $c_{1-32}$) into filter cache 206. As filter cache 206 may be sized to maintain only two filter matrices, this filter matrix may replace the filter matrix corresponding to filter location $w_{2,3}$ (i.e., $w_{2,3}$, $k_{1-32}$, $c_{1-32}$). Executing module 110 may execute an MMO using the filter matrix corresponding to filter location $w_{3,1}$ (i.e., $w_{3,1}$, $k_{1-32}$, $c_{1-32}$) and an activation matrix that includes activation vectors corresponding to activation volume locations $x_{3,1-32}$. Thus, executing module 110 may determine a first set of partial products of output activation values for the first row of the output volume (e.g., $O_{1,1}$ to $O_{1,32}$) that may correspond to a third row of the set of filters (i.e., $w_{3,1}$ to $W_{3,3}$). This first set of partial products may be accumulated with and/or maintained within output activation registers 214-1 and may be denoted in FIG. 36 as $w_{3,1} \times x_{3,1}$ (pp1).

Figure 37:
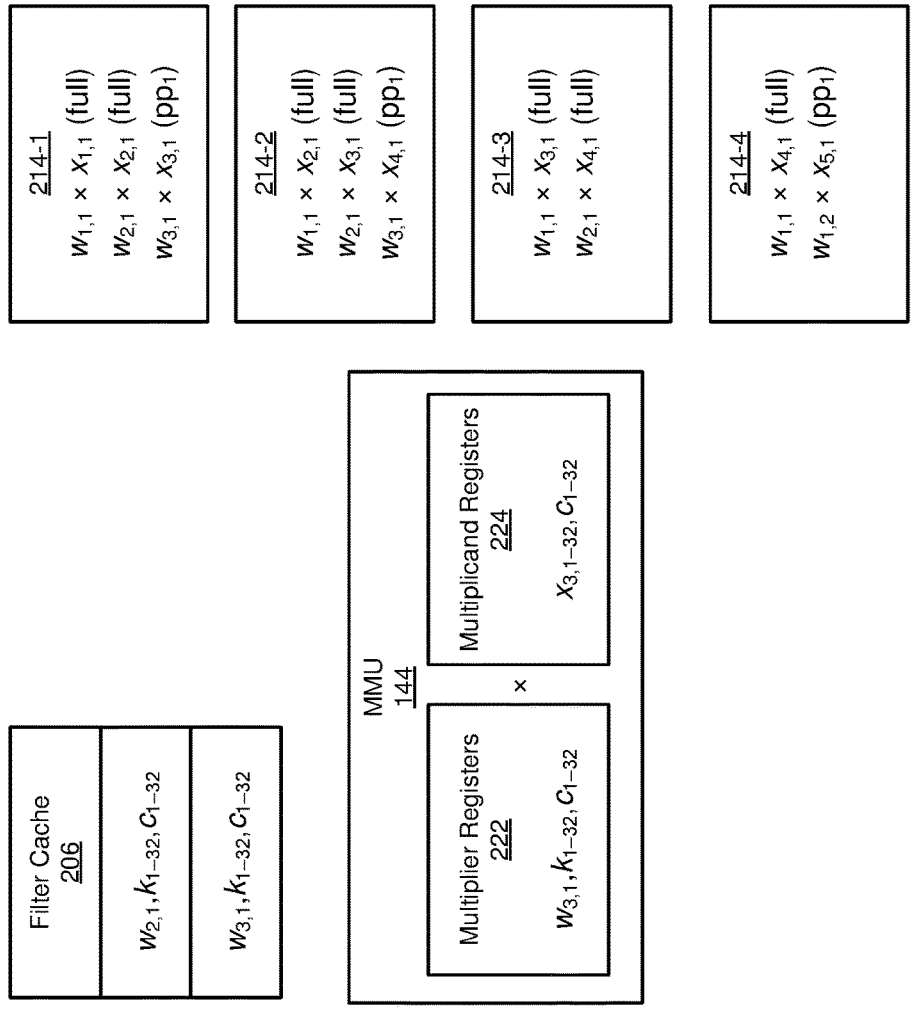

Continuing to FIG. 37, view 3700 shows that executing module may direct MMU 144 to execute an MMO using the filter matrix corresponding to filter location $w_{3,1}$ (i.e., $w_{3,1}$, $k_{1-32}$, $c_{1-32}$) and an activation matrix that includes activation vectors corresponding to activation volume locations $x_{4,1-32}$. Thus, executing module 110 may determine a first set of partial products of output activation values for the second row of the output volume (e.g., $O_{2,1}$ to $O_{2,32}$) that may correspond to a third row of the set of filters (i.e., $w_{3,1}$ to $W_{3,3}$). This first set of partial products may be accumulated with and/or maintained within output activation registers 214-2 and may be denoted in FIG. 37 as $w_{3,1} \times x_{4,1}$ (pp1).

Figure 38:
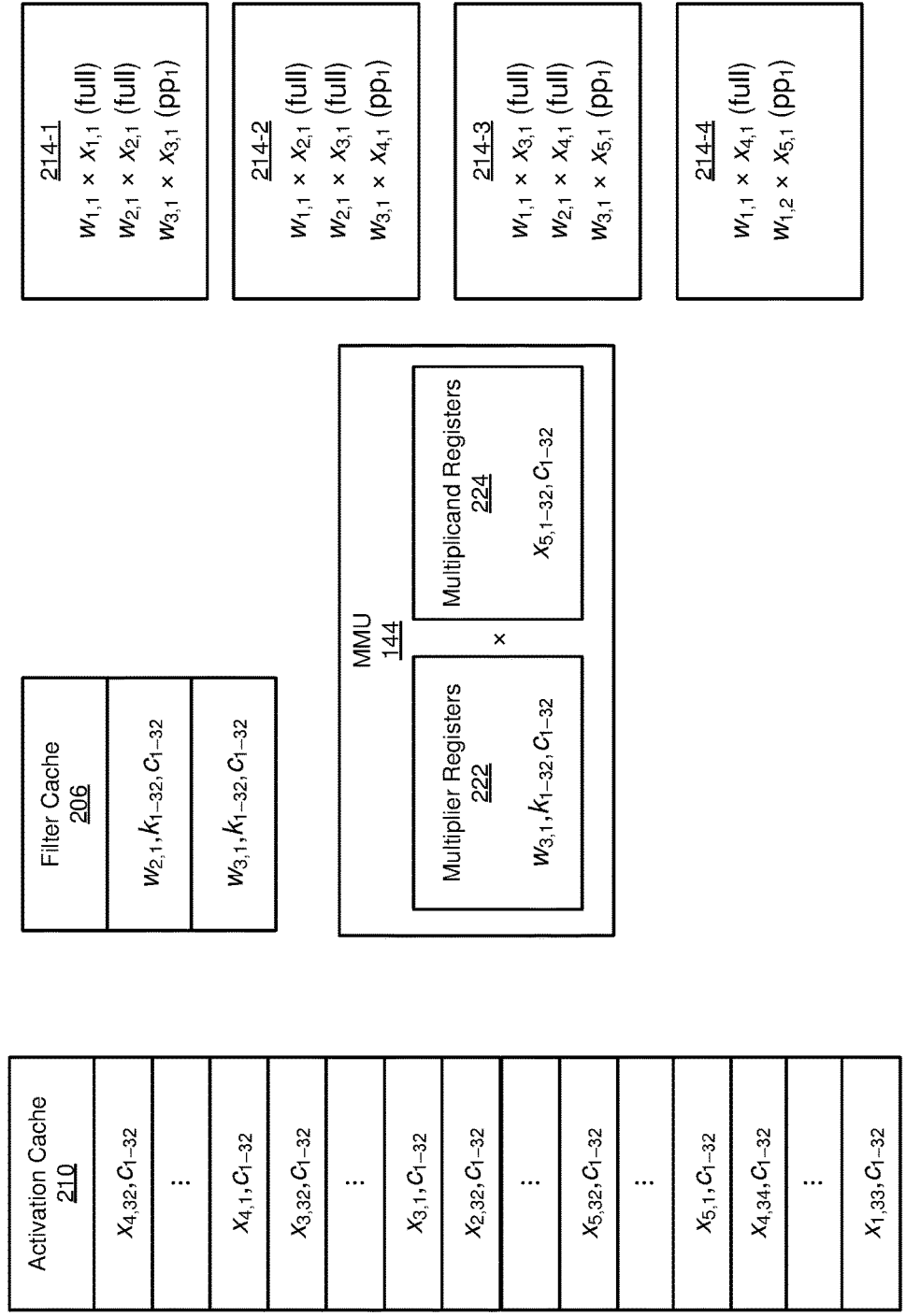

FIG. 38 shows a view 3800 wherein executing module may direct MMU 144 to execute an MMO using the filter matrix corresponding to filter location $w_{3,1}$ (i.e., $w_{3,1}$, $k_{1-32}$, $c_{1-32}$) and an activation matrix that includes activation vectors corresponding to activation volume locations $x_{5,1-32}$. Thus, executing module 110 may determine a first set of partial products of output activation values for the third row of the output volume (e.g., $O_{3,1}$ to $O_{3,32}$) that may correspond to a third row of the set of filters (i.e., $w_{3,1}$ to $W_{3,3}$). This first set of partial products may be accumulated with and/or maintained within output activation registers 214-3 and may be denoted in FIG. 37 as $w_{3,1} \times x_{5,1}$ (pp1).

Figure 39:
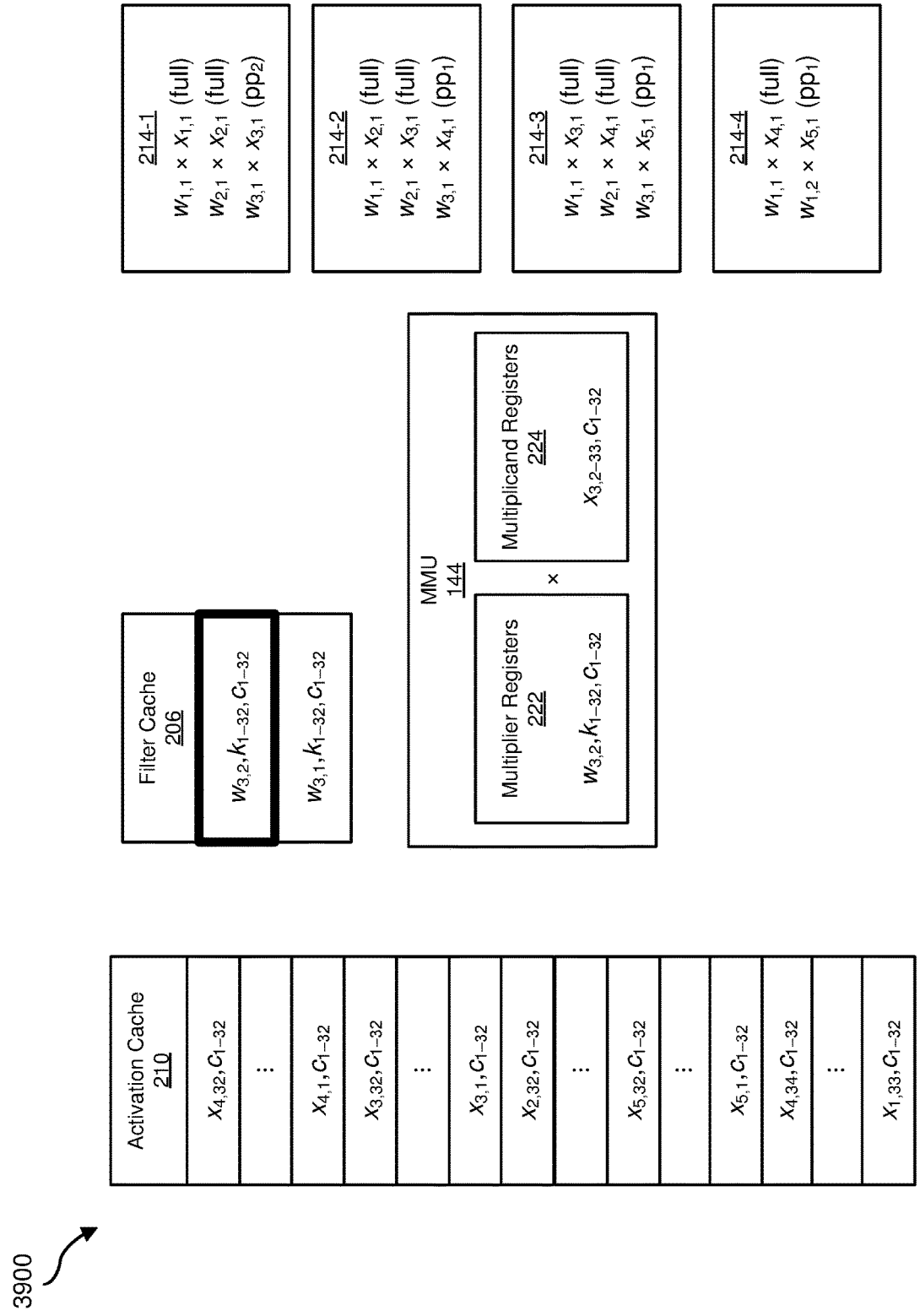

In FIG. 39, view 3900 shows that at least one of modules 102 (e.g., loading module 108, executing module 110, etc.) may load a filter matrix corresponding to filter location $w_{3,2}$ (i.e., $w_{3,2}$, $k_{1-32}$, $c_{1-32}$) into filter cache 206. As filter cache 206 may be sized to maintain only two filter matrices, this filter matrix may replace the filter matrix corresponding to filter location $w_{1,3}$ (i.e., $w_{2,1}$, $k_{1-32}$, $c_{1-32}$). Executing module may direct MMU 144 to execute an MMO using the filter matrix corresponding to filter location $w_{3,2}$ (i.e., $w_{3,2}$, $k_{1-32}$, $c_{1-32}$) and an activation matrix that includes activation vectors corresponding to activation volume locations $x_{3,2-33}$. Thus, executing module 110 may determine a second set of partial products of output activation values for the first row of the output volume (e.g., $O_{1,1}$ to $O_{1,32}$) that may correspond to a third row of the set of filters (i.e., $w_{3,1}$ to $W_{3,3}$). This second set of partial products may be accumulated with and/or maintained within output activation registers 214-1 and may be denoted in FIG. 39 as $w_{3,1} \times x_{3,1}$ (pp2).

Figure 40:
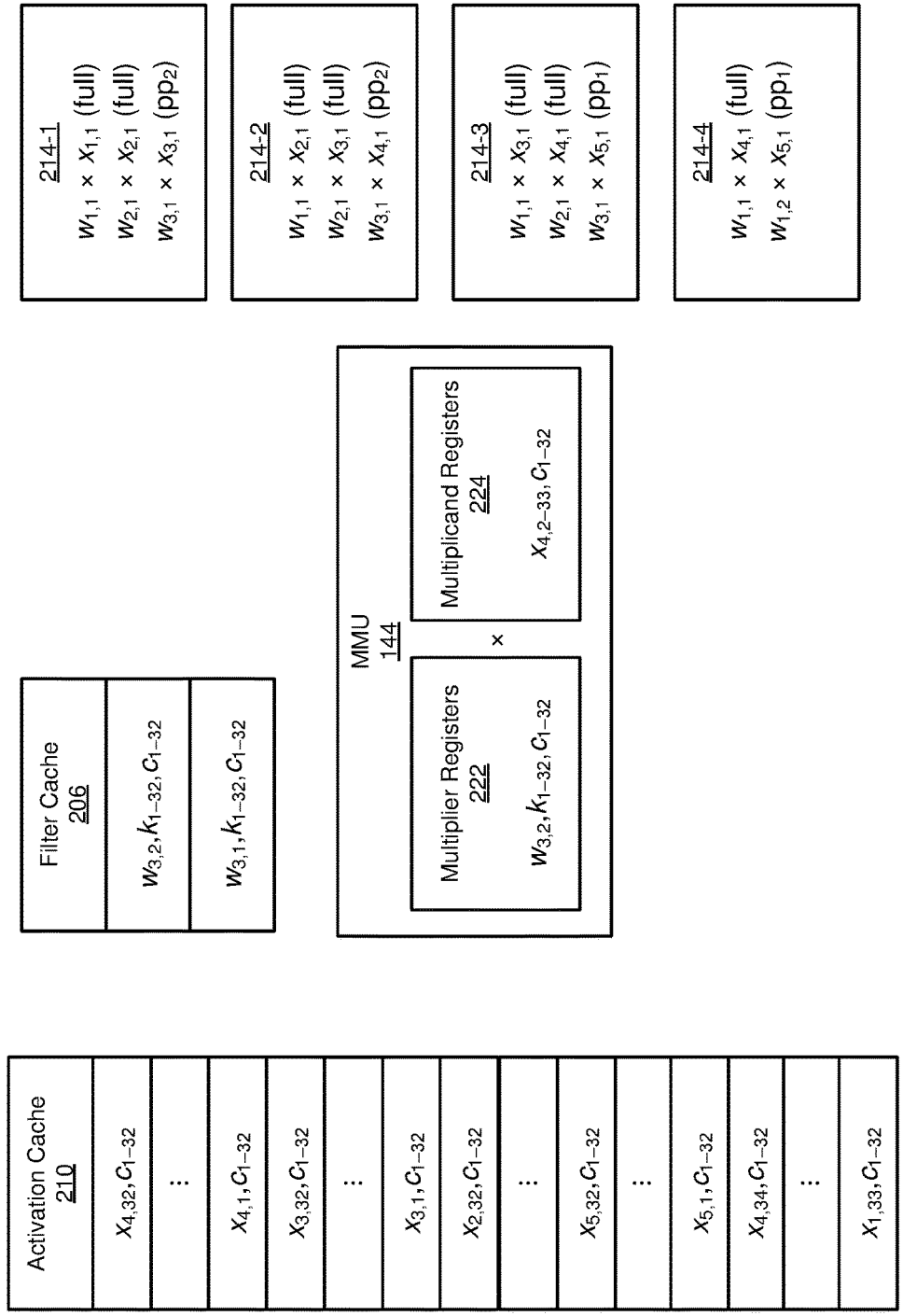

Continuing to FIG. 40, view 4000 shows that executing module 110 may direct MMU 144 to execute an MMO using the filter matrix corresponding to filter location $w_{3,2}$ (i.e., $w_{3,2}$, $k_{1-32}$, $c_{1-32}$) and an activation matrix that includes activation vectors corresponding to activation volume locations $x_{4,2-33}$. Thus, executing module 110 may determine a second set of partial products of output activation values for the second row of the output volume (e.g., $O_{2,1}$ to $O_{2,32}$) that may correspond to a third row of the set of filters (i.e., $w_{3,1}$ to $W_{3,3}$). This second set of partial products may be accumulated with and/or maintained within output activation registers 214-2 and may be denoted in FIG. 40 as $w_{3,1} \times x_{4,1}$ (pp2).

Figure 41:
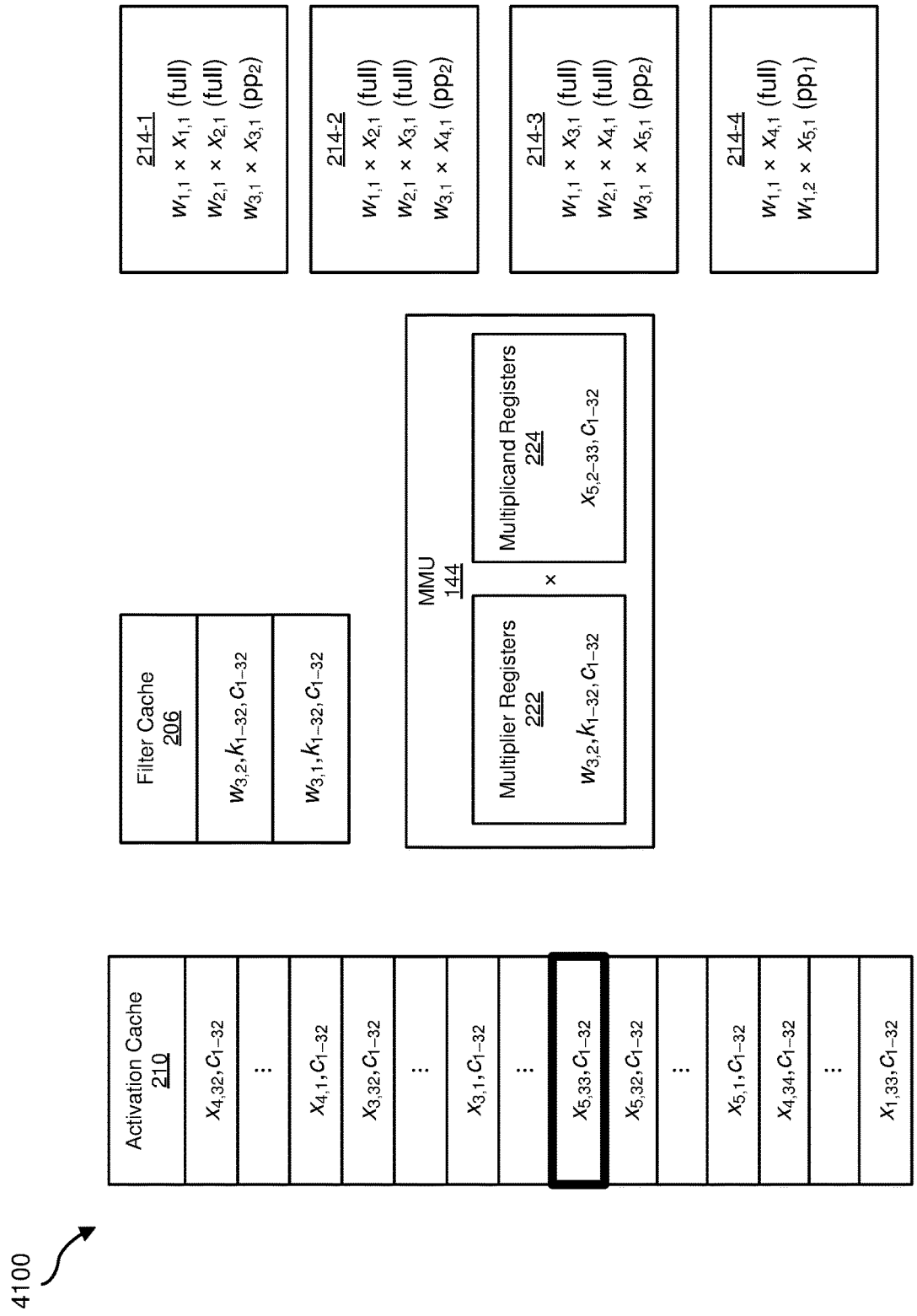

FIG. 41 shows a view 4100 wherein at least one of modules 102 (e.g., loading module 108, executing module 110, etc.) may load activation vectors corresponding to activation volume locations $x_{5,1-32}$ (i.e., $x_{5,1}$, $c_{1-32}$ to $x_{5,32}$, $c_{1-32}$) into activation cache 210. Executing module 110 may direct MMU 144 to execute an MMO using the filter matrix corresponding to filter location $w_{3,2}$ (i.e., $w_{3,2}$, $k_{1-32}$, $c_{1-32}$) and an activation matrix that includes activation vectors corresponding to activation volume locations $x_{5,2-33}$. Thus, executing module 110 may determine a second set of partial products of output activation values for the third row of the output volume (e.g., $O_{3,1}$ to $O_{3,32}$) that may correspond to a third row of the set of filters (i.e., $w_{3,1}$ to $W_{3,3}$). This second set of partial products may be accumulated with and/or maintained within output activation registers 214-3 and may be denoted in FIG. 40 as $w_{3,1} \times x_{5,1}$ (pp2).

Figure 42:
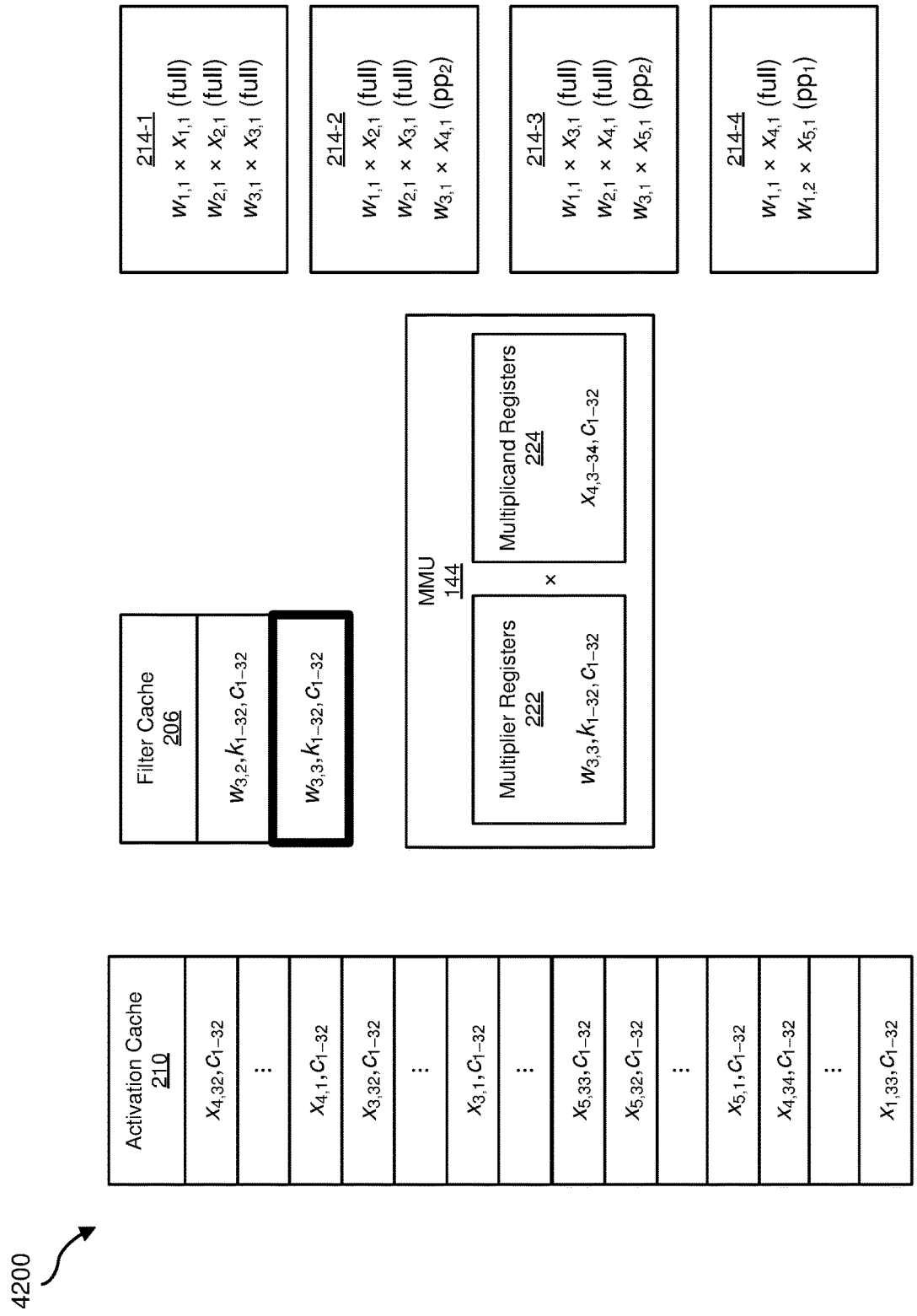

In FIG. 42, view 4200 shows that at least one of modules 102 (e.g., loading module 108, executing module 110, etc.) may load a filter matrix corresponding to filter location $w_{3,3}$ (i.e., $w_{3,3}$, $k_{1-32}$, $c_{1-32}$) into filter cache 206. As filter cache 206 may be sized to maintain only two filter matrices, this filter matrix may replace the filter matrix corresponding to filter location $w_{3,2}$ (i.e., $w_{3,2}$, $k_{1-32}$, $c_{1-32}$). Executing module may direct MMU 144 to execute an MMO using the filter matrix corresponding to filter location $w_{3,3}$ (i.e., $w_{3,3}$, $k_{1-32}$, $c_{1-32}$) and an activation matrix that includes activation vectors corresponding to activation volume locations $x_{3,3-34}$. Thus, executing module 110 may determine a third set of partial products of output activation values for the first row of the output volume (e.g., $O_{1,1}$ to $O_{1,32}$). This third set of partial products may be accumulated with and/or maintained within output activation registers 214-1. As this may be the final set of partial products associated with this row of the set of filter matrices (e.g., $w_{3,1}$ to $w_{3,3}$) and may be accumulated with the first and second sets of partial products, this set of partial products may be denoted in FIG. 42 as $w_{3,1} \times x_{3,1}$ (full).

Figure 43:
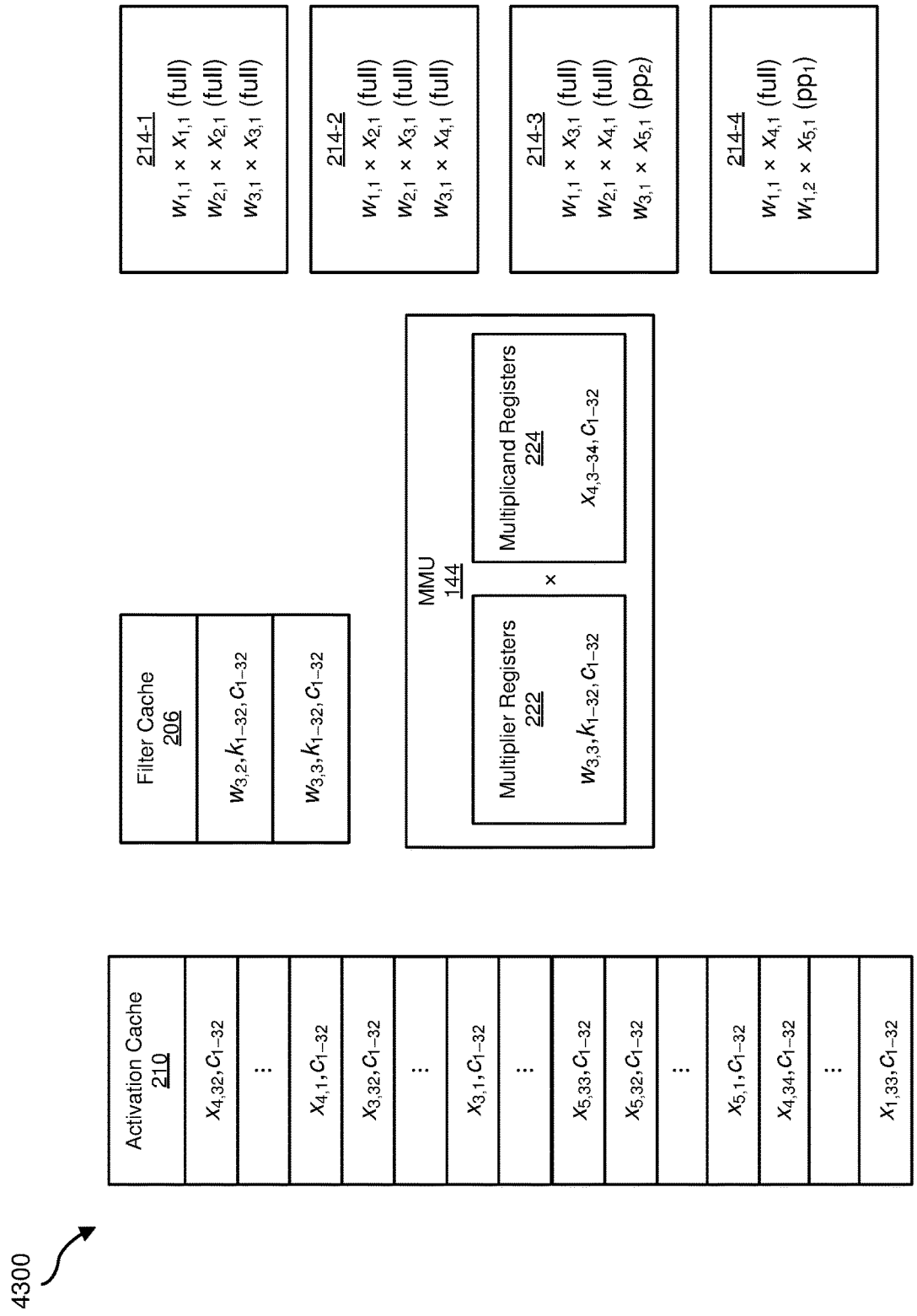

Continuing to FIG. 43, view 4300 shows that executing module may direct MMU 144 to execute an MMO using the filter matrix corresponding to filter location $w_{3,3}$ (i.e., $w_{3,3}$, $k_{1-32}$, $c_{1-32}$) and an activation matrix that includes activation vectors corresponding to activation volume locations $x_{4,3-34}$. Thus, executing module 110 may determine a third set of partial products of output activation values for the second row of the output volume (e.g., $O_{2,1}$ to $O_{2,32}$). This third set of partial products may be accumulated with and/or maintained within output activation registers 214-2. As this may be the final set of partial products associated with this row of the set of filter matrices (e.g., $w_{3,1}$ to $w_{3,3}$) and may be accumulated with the first and second sets of partial products, this set of partial products may be denoted in FIG. 43 as $w_{3,1} \times x_{4,1}$ (full).

Figure 44:
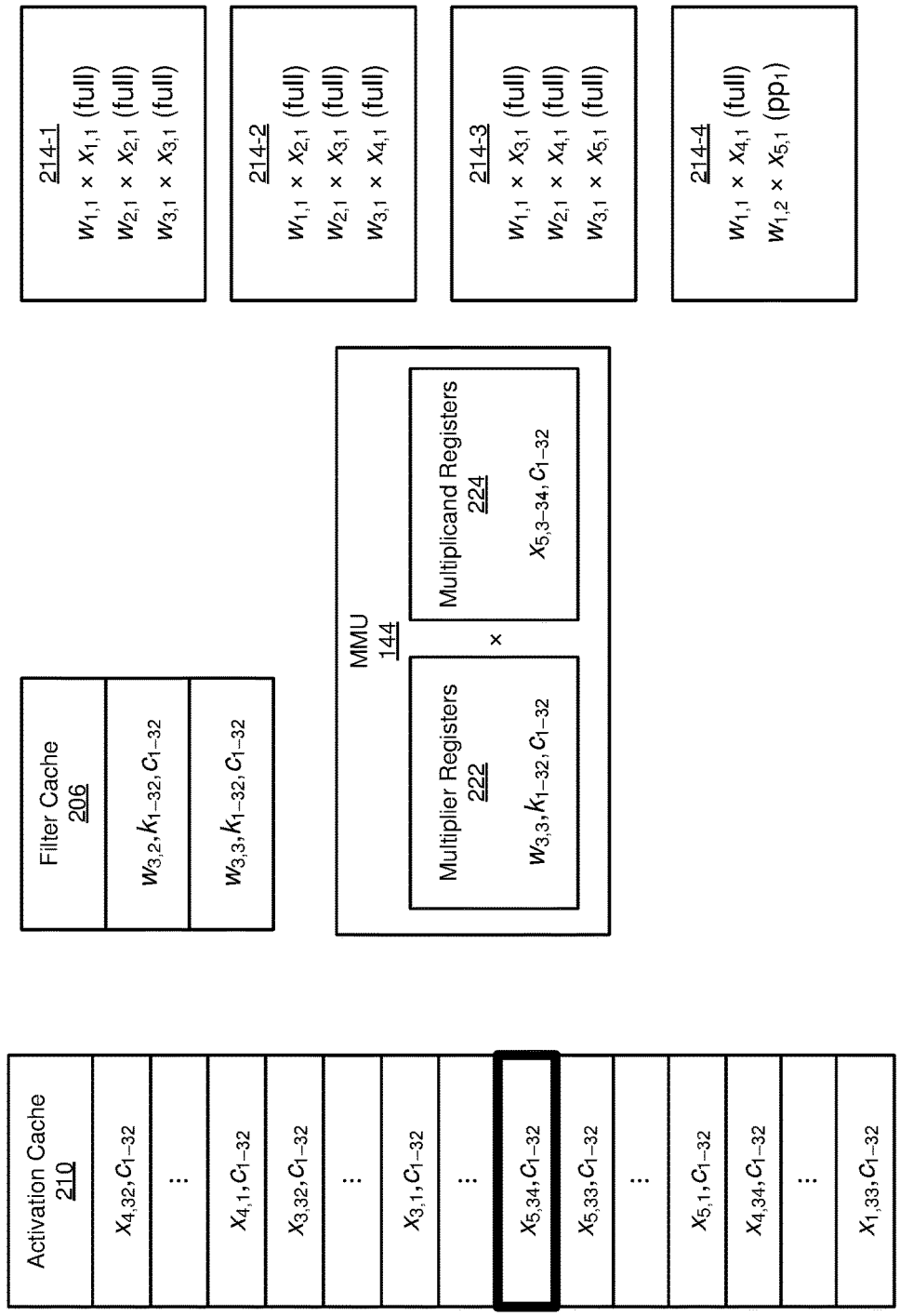

FIG. 44 shows a view 4400 wherein at least one of modules 102 (e.g., loading module 108, executing module 110, etc.) may load activation vectors corresponding to activation volume location $x_{5,34}$ into activation cache 210. Executing module 110 may direct MMU 144 to execute an MMO using the filter matrix corresponding to filter location $w_{3,3}$ (i.e., $w_{3,3}$, $k_{1-32}$, $c_{1-32}$) and an activation matrix that includes activation vectors corresponding to activation volume locations $x_{5,3-34}$. Thus, executing module 110 may determine a third set of partial products of output activation values for the third row of the output volume (e.g., $O_{3,1}$ to $O_{3,32}$) that may correspond to a third row of the set of filters (i.e., $w_{3,1}$ to $W_{3,3}$). This third set of partial products may be accumulated with and/or maintained within output activation registers 214-3. As this may be the final set of partial products associated with this row of the set of filter matrices (e.g., $w_{3,1}$ to $w_{3,3}$) and may be accumulated with the first and second sets of partial products, this set of partial products may be denoted in FIG. 44 as $w_{3,1} \times x_{5,1}$ (full).

Figure 45:
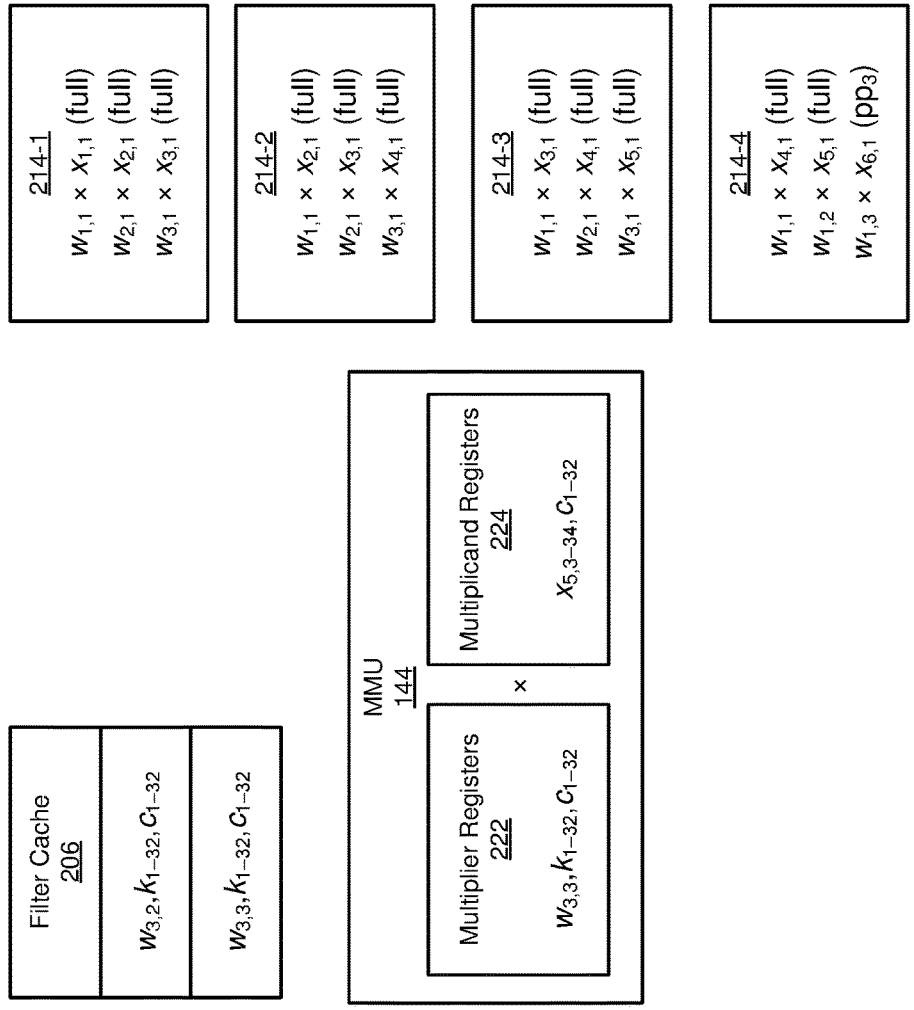

FIG. 45 shows a view 4500 wherein at least one of modules 102 (e.g., loading module 108, executing module 110, etc.) may load activation vectors corresponding to activation volume locations $x_{6,3-34}$ (i.e., $x_{6,3}$, $c_{1-32}$ to $x_{6,34}$, $c_{1-32}$) into activation cache 210. Executing module 110 may execute an MMO using the filter matrix corresponding to filter location $w_{3,3}$ (i.e., $w_{3,3}$, $k_{1-32}$, $c_{1-32}$) and an activation matrix that includes activation vectors corresponding to activation volume locations $x_{6,3-34}$. Thus, executing module 110 may determine a third set of partial products of output activation values for the fourth row of the output volume (e.g., $O_{4,1}$ to $O_{4,32}$) that may correspond to a third row of the set of filters (i.e., $w_{3,1}$ to $W_{3,3}$). This set of partial products may be accumulated with and/or maintained within output activation registers 214-4 and may be denoted in FIG. 45 as $w_{3,1} \times x_{6,1}$ (pp3).

Figure 46:
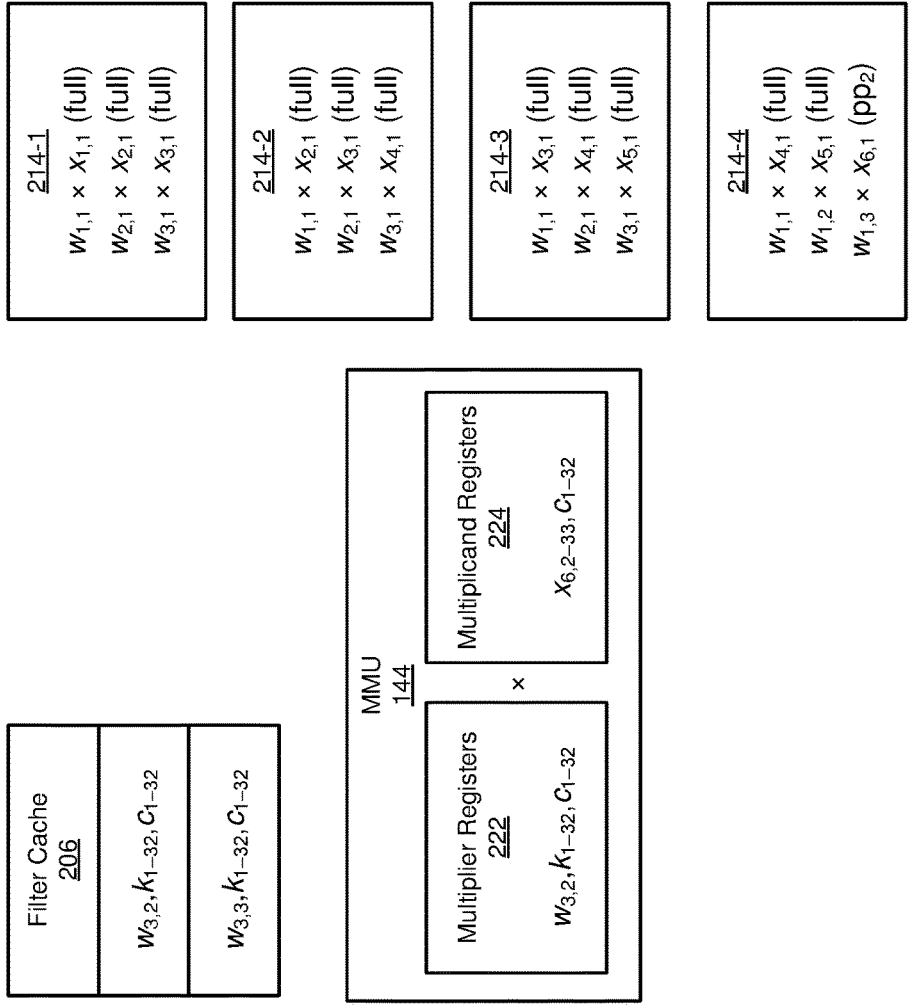

FIG. 46 shows a view 4600 wherein at least one of modules 102 (e.g., loading module 108, executing module 110, etc.) may load an activation vector corresponding to activation volume location $x_{6,2}$ (i.e., $x_{6,2}$, $c_{1-32}$) into activation cache 210. Executing module 110 may execute an MMO using the filter matrix corresponding to filter location $w_{3,2}$ (i.e., $w_{3,2}$, $k_{1-32}$, $c_{1-32}$) and an activation matrix that includes activation vectors corresponding to activation volume locations $x_{6,2-33}$. Thus, executing module 110 may determine a second set of partial products of output activation values for the fourth row of the output volume (e.g., $O_{4,1}$ to $O_{4,32}$) that may correspond to a third row of the set of filters (i.e., $w_{3,1}$ to $W_{3,3}$). This second set of partial products may be accumulated with and/or maintained within output activation registers 214-4 and may be denoted in FIG. 46 as $w_{3,1} \times x_{6,1}$ (pp2).

Figure 47:
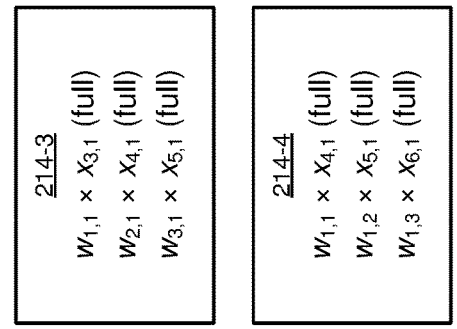
Figure 47:
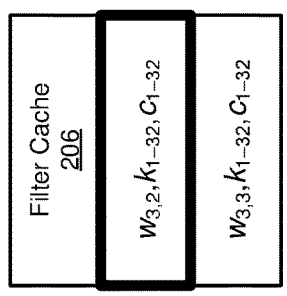
Figure 47:
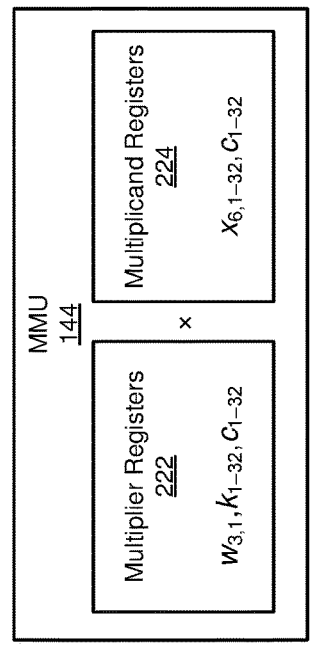
Figure 47:
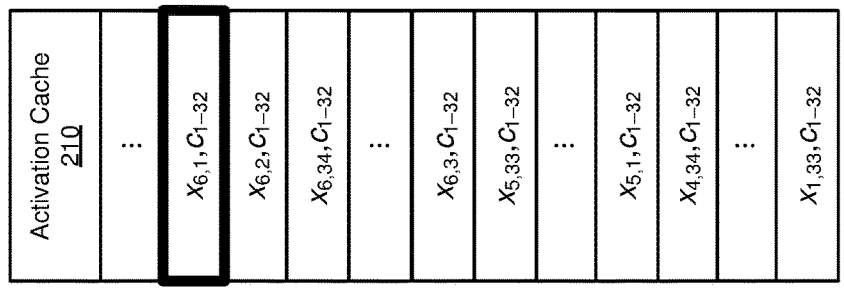

Continuing to FIG. 47, view 4700 shows that at least one of modules 102 (e.g., loading module 108, executing module 110, etc.) may load an activation vector corresponding to activation volume location $x_{6,1}$ (i.e., $x_{6,1}$, $c_{1-32}$) into activation cache 210. Executing module 110 may execute an MMO using the filter matrix corresponding to filter location $w_{3,1}$ (i.e., $w_{3,1}$, $k_{1-32}$, $c_{1-32}$) and an activation matrix that includes activation vectors corresponding to activation volume locations $x_{6,2-33}$. Thus, executing module 110 may determine a first set of partial products of output activation values for the fourth row of the output volume (e.g., $O_{4,1}$ to $O_{4,32}$) that may correspond to a third row of the set of filters (i.e., $w_{3,1}$ to $W_{3,3}$). This first set of partial products may be accumulated with and/or maintained within output activation registers 214-4. As this may be the final set of partial products associated with this row of the set of filter matrices (e.g., $w_{3,1}$ to $w_{3,3}$) and may be accumulated with the second and third set of partial products, this set of partial products may be denoted in FIG. 47 as $w_{3,1} \times x_{5,1}$ (full). At the conclusion of the sequence illustrated by FIGS. 14-47, example embodiments of the systems and methods described herein may have determined (e.g., calculated) output activation values for four rows of a set of output volumes.

Figure 48:
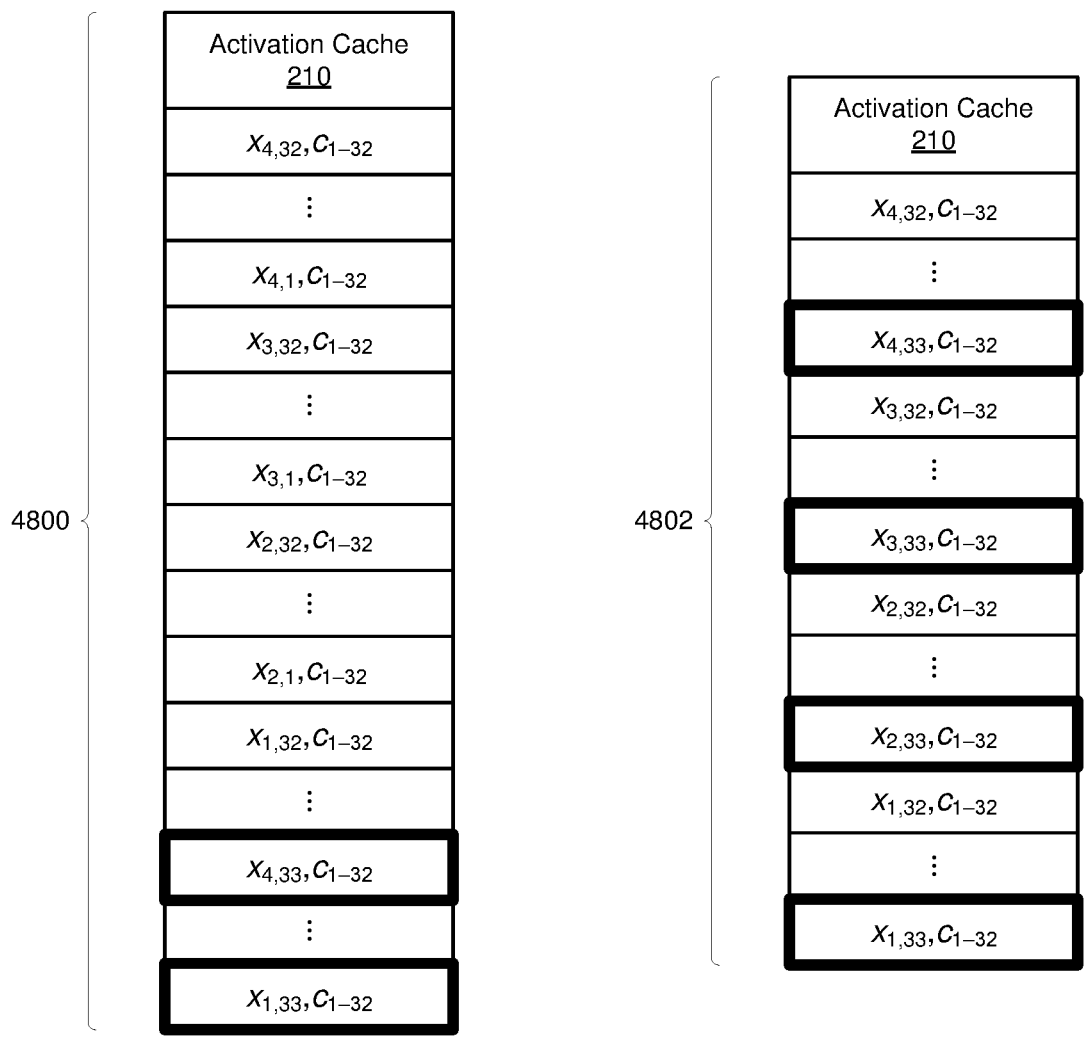
FIG. 48 illustrates replacing activation vectors loaded into an activation cache in accordance with a first-in, first-out (FIFO) replacement policy or a least-recently-used (LRU) replacement policy as described herein.

In some examples, one or more of the systems described herein (e.g., one or more of modules 102) may replace an activation vector loaded into activation cache 210 with one or more additional activation vectors. In order to effectively manage activation cache 210, one or more of modules 102 may account for elements (e.g., activation vectors) included in activation cache 210 using a suitable replacement policy. For example, FIG. 48 shows a view 4800 of activation cache 210 wherein one or more of modules 102 (e.g., loading module 108, executing module 110, etc.) may replace activation vectors included in activation cache 210 in accordance with a first-in, first-out (FIFO) replacement policy. Moreover, the example sequence illustrated by FIGS. 14-47 may illustrate the systems and methods described herein replacing various activation vectors included in activation cache 210 in accordance with a FIFO replacement policy.

As an additional example, FIG. 48 also shows a view 4802 of activation cache 210 wherein one or more of modules 102 (e.g., loading module 108, executing module 110, etc.) may replace activation vectors included in activation cache 210 in accordance with a least-recently-used (LRU) replacement policy.

As discussed throughout the instant disclosure, the systems and methods described herein may provide one or more advantages over traditional options for performing convolution operations for ANNs. For example, traditional and/or conventional systems for performing convolution operations may convert convolutional layers to matrix multiplication blocks by rearranging discrete image blocks to columns, such as via an im2col operation. This may require element-wise steering, necessitating elaborate muxing mechanisms that may consume power and complicate designs of such systems.

Additionally, rearranging image blocks via an im2col operation may result in large matrix sizes, leading to large data transfers between system components (e.g., between a CPU and a GPU, between the CPU and a memory device, between a memory device and a data store, etc.). Such large data transfers may further increase power consumption of such systems. Furthermore, such systems may fail to take advantage of spatial reuse that may be available for convolution operations.

By leveraging spatial reuse that exists in convolution operations, the systems and methods described herein may reduce a number of accesses or reads from power-inefficient data storage devices that may be remote from a hardware accelerator. Also, by maximizing reuse of activation values already retrieved from power-inefficient data storage devices, the systems and methods described herein may favor power efficient memory operations and/or memory devices that may be local to an MMU. Moreover, the systems and methods described herein may also increase reuse of filter values across multiple dimensions (e.g., a height dimension and a width dimension) of an input volume, thus providing even more efficiencies than other methods for performing convolution operations for ANNs.

Furthermore, the systems and methods described herein may efficiently perform convolutions involving multiple filters in parallel via the hardware accelerator rather than in sequence and/or in parallel via multiple processors, which may result in more efficient (e.g., in terms of power consumption, execution time, processor usage, memory usage, etc.) computation of convolutions of multiple filters than conventional systems and methods for performing convolution operations involving multiple filters. Hence, the systems and methods described herein may vastly reduce power requirements for performing convolution operations for ANNs when compared to traditional or conventional methods and/or systems.

Example Embodiments

Example 1: A computer-implemented method comprising (1) maintaining (a) a filter matrix in a filter cache included in a local memory device (LMD) included in a hardware accelerator, and (b) a plurality of activation matrices corresponding to different rows of an activation volume in an activation cache included in the LMD, (2) for each activation matrix, directing a matrix multiplication unit (MMU) included in the hardware accelerator to execute a matrix multiplication operation (MMO) using the filter matrix and the activation matrix, (3) loading an additional filter matrix into the filter cache, and (4) directing the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO.

Example 2: The computer-implemented method of example 1, wherein (1) each filter matrix comprises a set of filter vectors corresponding to a filter location included in each of a set of filters of a convolutional layer of an artificial neural network, and (2) each activation matrix comprises a set of activation vectors, each activation vector comprising a set of channel values corresponding to a location within the activation volume.

Example 3: The computer-implemented method of example 2, wherein the filter matrix corresponds to a primary filter location and the additional filter matrix corresponds to a secondary filter location.

Example 4: The computer-implemented method of any of examples 2-3, wherein executing each additional MMO in the plurality of additional MMOs comprises (1) selecting, from a plurality of activation vectors included in the plurality of activation matrices loaded into the activation cache, a selected set of activation vectors associated with a row of the activation volume, and (2) directing the MMU to use the selected set of activation vectors associated with the row of the activation volume as a multiplicand matrix in the additional MMO.

Example 5: The computer-implemented method of any of examples 2-4, further comprising replacing, prior to directing the MMU to execute at least one additional MMO in the plurality of additional MMOs, at least one of (1) at least one activation vector loaded into the activation cache with an additional activation vector, or (2) at least one filter matrix loaded into the filter cache with a supplemental filter matrix.

Example 6: The computer-implemented method of example 5, wherein replacing the at least one activation vector comprises replacing the at least one activation vector in accordance with at least one of (1) a first-in, first-out (FIFO) replacement policy, or (2) a least-recently-used (LRU) replacement policy.

Example 7: The computer-implemented method of any of examples 1-6, wherein (1) the hardware accelerator further comprises a set of output activation registers associated with the MMU, and (2) directing the MMU to execute the MMO using the filter matrix and the activation matrix comprises, for each activation matrix in the activation cache (a) generating a primary result matrix corresponding to the activation matrix by directing the MMU to execute the MMO using the filter matrix as a multiplier matrix and the activation matrix as a multiplicand matrix, and (b) storing the primary result matrix within the set of output activation registers.

Example 8: The computer-implemented method of example 7, wherein directing the MMU to execute the plurality of additional MMOs comprises, for each additional MMO in the plurality of additional MMOs (1) designating a set of activation vectors loaded into the activation cache and associated with a row of the activation volume as an intermediate activation matrix, (2) producing a secondary result matrix by directing the MMU to execute an additional MMO using the intermediate activation matrix as a multiplicand matrix and a selected filter matrix loaded into the filter cache as a multiplier matrix, and (3) accumulating the secondary result matrix with at least one primary result matrix included in the set of output activation registers.

Example 9: The computer-implemented method of example 8, further comprising determining, based on a result of accumulating the secondary result matrix and the at least one primary result matrix, a set of output activation values for a convolutional layer of an artificial neural network.

Example 10: The computer-implemented method of any of examples 1-9, wherein the LMD comprises (1) a set of multiplier registers associated with the MMU, and (2) a set of multiplicand registers associated with the MMU.

Example 11: The computer-implemented method of example 10, wherein directing the MMU to execute the MMO using the filter matrix and the activation matrix comprises (1) loading (a) the filter matrix from the filter cache into the set of multiplier registers, and (b) the activation matrix from the activation cache into the set of multiplicand registers, and (2) directing the MMU to execute the MMO using the filter matrix as a multiplier matrix and the activation matrix as a multiplicand matrix.

Example 12: The computer-implemented method of any of examples 10 and 11, wherein directing the MMU to execute the plurality of additional MMOs comprises, for each additional MMO included in the plurality of additional MMOs (1) selecting (a) at least one filter matrix loaded into the filter cache as a selected filter matrix, (b) a set of activation vectors from a plurality of activation vectors loaded into the activation cache as a selected activation matrix, and (2) loading (a) the selected filter matrix from the filter cache into the set of multiplier registers, and (b) the selected activation matrix from the activation cache into the set of multiplicand registers, and (3) directing the MMU to execute an additional MMO using the selected filter matrix as a multiplier matrix and the selected activation matrix as a multiplicand matrix.

Example 13: The computer-implemented method of any of examples 1-12, wherein (1) the activation volume comprises a digital image comprising (a) at least one row of activation values, (b) at least one column of activation values, and (c) at least one channel of activation values, and (2) each activation matrix included in the plurality of activation matrices corresponds to at least a portion of a different row of activation values included in the digital image.

Example 14: The computer-implemented method of any of examples 1-13, wherein directing the MMU to execute an MMO comprises directing the MMU to execute a generalized matrix multiplication (GEMM) operation.

Example 15: A system comprising (1) a hardware accelerator comprising (a) a matrix multiplication unit (MMU), and (b) a local memory device (LMD), (2) a maintaining module, stored in memory, that maintains (a) a filter matrix in a filter cache included in the LMD, and (b) a plurality of activation matrices corresponding to different rows of an activation volume in an activation cache included in the LMD, (3) a directing module, stored in memory, that, for each activation matrix, directs the MMU to execute a matrix multiplication operation (MMO) using the filter matrix and the activation matrix, (4) a loading module, stored in memory, that loads an additional filter matrix corresponding to a secondary filter location into the filter cache, (5) an executing module, stored in memory, that directs the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO, and (6) at least one physical processor that executes the maintaining module, the directing module, the loading module, and the executing module.

Example 16: The system of example 15, wherein the loading module replaces, prior to the executing module directing the MMU to execute at least one additional MMO in the plurality of additional MMOs, at least one of (1) at least one filter matrix loaded into the filter cache with a supplemental filter matrix, or (2) at least one activation vector loaded into the activation cache with an additional activation vector.

Example 17: The system of any of examples 15 and 16, wherein (1) the hardware accelerator further comprises a set of output activation registers associated with the MMU, and (2) the directing module directs the MMU to execute the MMO using the filter matrix and the activation matrix by, for each activation matrix in the activation cache (a) generating a primary result matrix corresponding to the activation matrix by directing the MMU to execute the MMO using the filter matrix as a multiplier matrix and the activation matrix as a multiplicand matrix, and (b) storing the primary result matrix within the set of output activation registers.

Example 18: The system of example 17, wherein the executing module directs the MMU to execute the plurality of additional MMOs by (1) designating a set of activation vectors loaded into the activation cache and associated with a row of the activation volume as an intermediate activation matrix, (2) producing a secondary result matrix by directing the MMU to execute an additional MMO using the intermediate activation matrix as a multiplicand matrix and one of the filter matrix and the additional filter matrix as a multiplier matrix, and (3) accumulating the secondary result matrix and at least one primary result matrix included in the set of output activation registers.

Example 19: The system of example 18, wherein the executing module further determines, based on a result of accumulating the secondary result matrix and the at least one primary result matrix, a set of output activation values for a convolutional layer of an artificial neural network.

Example 20: A non-transitory, computer-readable medium comprising computer-readable instructions that, when executed by at least one processor of a computing device, cause the computing device to (1) maintain (a) a filter matrix in a filter cache included in a local memory device (LMD) included in a hardware accelerator, and (b) a plurality of activation matrices corresponding to different rows of an activation volume in an activation cache included in the LMD, (2) for each activation matrix, direct a matrix multiplication unit (MMU) included in the hardware accelerator to execute a matrix multiplication operation (MMO) using the filter matrix and the activation matrix, (3) load an additional filter matrix corresponding to a secondary filter location into the filter cache, and (4) direct the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive filter data and/or activation (e.g., image) data to be transformed, transform the filter data and/or activation data, output a result of the transformation to perform a convolution operation for a convolutional layer of an ANN, use the result of the transformation to provide input to one or more additional layers of the ANN, and store the result of the transformation to make predictions regarding additional inputs to the ANN. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   maintaining, by a maintaining module stored in memory and executed by at least one physical processor:
   a filter matrix in a filter cache included in a local memory device (LMD) included in a hardware accelerator; and
   a plurality of activation matrices corresponding to different rows of an activation volume in an activation cache included in the LMD;
   for each activation matrix, directing, by a directing module stored in memory and executed by the physical processor, a matrix multiplication unit (MMU) included in the hardware accelerator to execute a matrix multiplication operation (MMO) using the filter matrix and the activation matrix;
   loading, by a loading module stored in memory and executed by the physical processor, an additional filter matrix into the filter cache; and
   directing, by a directing module stored in memory and executed by the physical processor, the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO.

2. The computer-implemented method of claim 1, wherein:
   each filter matrix comprises a set of filter vectors corresponding to a filter location included in each of a set of filters of a convolutional layer of an artificial neural network; and
   each activation matrix comprises a set of activation vectors, each activation vector comprising a set of channel values corresponding to a location within the activation volume.

3. The computer-implemented method of claim 2, wherein the filter matrix corresponds to a primary filter location and the additional filter matrix corresponds to a secondary filter location.

4. The computer-implemented method of claim 2, wherein executing each additional MMO in the plurality of additional MMOs comprises:
selecting, from a plurality of activation vectors included in the plurality of activation matrices loaded into the activation cache, a selected set of activation vectors associated with a row of the activation volume; and
directing the MMU to use the selected set of activation vectors associated with the row of the activation volume as a multiplicand matrix in the additional MMO.

5. The computer-implemented method of claim 2, further comprising replacing, by the loading module prior to directing the MMU to execute at least one additional MMO in the plurality of additional MMOs, at least one of:
at least one activation vector loaded into the activation cache with an additional activation vector; or
at least one filter matrix loaded into the filter cache with a supplemental filter matrix.

6. The computer-implemented method of claim 5, wherein replacing the at least one activation vector comprises replacing the at least one activation vector in accordance with at least one of:
a first-in, first-out (FIFO) replacement policy; or
a least-recently-used (LRU) replacement policy.

7. The computer-implemented method of claim 1, wherein:
the hardware accelerator further comprises a set of output activation registers associated with the MMU; and
directing the MMU to execute the MMO using the filter matrix and the activation matrix comprises, for each activation matrix in the activation cache:
generating a primary result matrix corresponding to the activation matrix by directing the MMU to execute the MMO using the filter matrix as a multiplier matrix and the activation matrix as a multiplicand matrix; and
storing the primary result matrix within the set of output activation registers.

8. The computer-implemented method of claim 7, wherein directing the MMU to execute the plurality of additional MMOs comprises, for each additional MMO in the plurality of additional MMOs:
designating a set of activation vectors loaded into the activation cache and associated with a row of the activation volume as an intermediate activation matrix;
producing a secondary result matrix by directing the MMU to execute an additional MMO using the intermediate activation matrix as a multiplicand matrix and a selected filter matrix loaded into the filter cache as a multiplier matrix; and
accumulating the secondary result matrix with at least one primary result matrix included in the set of output activation registers.

9. The computer-implemented method of claim 8, further comprising determining, based on a result of accumulating the secondary result matrix and the at least one primary result matrix, a set of output activation values for a convolutional layer of an artificial neural network.

10. The computer-implemented method of claim 1, wherein the LMD comprises:
a set of multiplier registers associated with the MMU; and
a set of multiplicand registers associated with the MMU.

11. The computer-implemented method of claim 10, wherein directing the MMU to execute the MMO using the filter matrix and the activation matrix comprises:
loading:
the filter matrix from the filter cache into the set of multiplier registers; and
the activation matrix from the activation cache into the set of multiplicand registers; and
directing the MMU to execute the MMO using the filter matrix as a multiplier matrix and the activation matrix as a multiplicand matrix.

12. The computer-implemented method of claim 10, wherein directing the MMU to execute the plurality of additional MMOs comprises, for each additional MMO included in the plurality of additional MMOs:
selecting:
at least one filter matrix loaded into the filter cache as a selected filter matrix;
a set of activation vectors from a plurality of activation vectors loaded into the activation cache as a selected activation matrix; and
loading:
the selected filter matrix from the filter cache into the set of multiplier registers; and
the selected activation matrix from the activation cache into the set of multiplicand registers; and
directing the MMU to execute an additional MMO using the selected filter matrix as a multiplier matrix and the selected activation matrix as a multiplicand matrix.

13. The computer-implemented method of claim 1, wherein:
the activation volume comprises a digital image comprising:
at least one row of activation values;
at least one column of activation values; and
at least one channel of activation values; and
each activation matrix included in the plurality of activation matrices corresponds to at least a portion of a different row of activation values included in the digital image.

14. The computer-implemented method of claim 1, wherein directing the MMU to execute an MMO comprises directing the MMU to execute a generalized matrix multiplication (GEMM) operation.

15. A system comprising:
a hardware accelerator comprising:
a matrix multiplication unit (MMU); and
a local memory device (LMD);
a maintaining module, stored in memory, that maintains:
a filter matrix in a filter cache included in the LMD; and
a plurality of activation matrices corresponding to different rows of an activation volume in an activation cache included in the LMD;
a directing module, stored in memory, that, for each activation matrix, directs the MMU to execute a matrix multiplication operation (MMO) using the filter matrix and the activation matrix;
a loading module, stored in memory, that loads an additional filter matrix corresponding to a secondary filter location into the filter cache;
an executing module, stored in memory, that directs the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO; and
at least one physical processor that executes the maintaining module, the directing module, the loading module, and the executing module.

16. The system of claim 15, wherein the loading module replaces, prior to the executing module directing the MMU to execute at least one additional MMO in the plurality of additional MMOs, at least one of:
- at least one filter matrix loaded into the filter cache with a supplemental filter matrix; or
- at least one activation vector loaded into the activation cache with an additional activation vector.

17. The system of claim 15, wherein:
- the hardware accelerator further comprises a set of output activation registers associated with the MMU; and
- the directing module directs the MMU to execute the MMO using the filter matrix and the activation matrix by, for each activation matrix in the activation cache:
    - generating a primary result matrix corresponding to the activation matrix by directing the MMU to execute the MMO using the filter matrix as a multiplier matrix and the activation matrix as a multiplicand matrix; and
    - storing the primary result matrix within the set of output activation registers.

18. The system of claim 17, wherein the executing module directs the MMU to execute the plurality of additional MMOs by:
- designating a set of activation vectors loaded into the activation cache and associated with a row of the activation volume as an intermediate activation matrix;
- producing a secondary result matrix by directing the MMU to execute an additional MMO using the intermediate activation matrix as a multiplicand matrix and one of the filter matrix and the additional filter matrix as a multiplier matrix; and
- accumulating the secondary result matrix and at least one primary result matrix included in the set of output activation registers.

19. The system of claim 18, wherein the executing module further determines, based on a result of accumulating the secondary result matrix and the at least one primary result matrix, a set of output activation values for a convolutional layer of an artificial neural network.

20. A non-transitory, computer-readable medium comprising computer-readable instructions that, when executed by at least one processor of a computing device, cause the computing device to:
maintain:
- a filter matrix in a filter cache included in a local memory device (LMD) included in a hardware accelerator; and
- a plurality of activation matrices corresponding to different rows of an activation volume in an activation cache included in the LMD;

for each activation matrix, direct a matrix multiplication unit (MMU) included in the hardware accelerator to execute a matrix multiplication operation (MMO) using the filter matrix and the activation matrix;
load an additional filter matrix corresponding to a secondary filter location into the filter cache; and
direct the MMU to execute a plurality of additional MMOs, each additional MMO using one filter matrix included in the filter cache and an activation matrix included in the activation cache, such that the MMU reuses the filter matrix for at least one additional MMO and uses the additional filter matrix for a different additional MMO.

* * * * *